US010805378B2

(12) United States Patent
Koren

(10) Patent No.: US 10,805,378 B2
(45) Date of Patent: *Oct. 13, 2020

(54) MECHANISM FOR SHARING OF INFORMATION ASSOCIATED WITH EVENTS

(71) Applicant: Dov Koren, New York, NY (US)

(72) Inventor: Dov Koren, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/675,208

(22) Filed: Nov. 5, 2019

(65) Prior Publication Data

US 2020/0076872 A1  Mar. 5, 2020

Related U.S. Application Data

(63) Continuation of application No. 16/384,873, filed on Apr. 15, 2019, now Pat. No. 10,476,932, which is a
(Continued)

(51) Int. Cl.
*G06F 17/00* (2019.01)
*H04L 29/08* (2006.01)
(Continued)

(52) U.S. Cl.
CPC .......... *H04L 67/02* (2013.01); *G06F 3/0484* (2013.01); *G06F 11/3438* (2013.01);
(Continued)

(58) Field of Classification Search
CPC ... H04L 67/02; H04L 67/2842; G06F 3/0484; G06F 11/3438; G06F 40/134; G06Q 10/10; G06T 11/206
(Continued)

(56) References Cited

U.S. PATENT DOCUMENTS

| 4,484,826 A | 11/1984 | Horn et al. |
| 4,520,457 A | 5/1985 | Hagler et al. |

(Continued)

FOREIGN PATENT DOCUMENTS

| WO | WO 97/42728 | 11/1997 |
| WO | WO 00/60433 | 10/2000 |

(Continued)

OTHER PUBLICATIONS

Challenger et al., A Publishing System for Efficiently Creating Dynamic Web Content, IEEE 2000, pp. 844-853. (Year: 2000).*
(Continued)

*Primary Examiner* — Cong-Lac Huynh
(74) *Attorney, Agent, or Firm* — Hickman Palermo Becker Bingham LLP

(57) ABSTRACT

Techniques are provided that allow users to collaborate in relationship to data views, application displays, applications or events. A user can type in a text view related to a specific view in an application display, and the information is shared with other users that take part in sharing that view. A user that expresses an interest in an event is notified about the event and has the capability to interact, in relation to the event, with other users (e.g. by text). The particular form of interaction (and sharing) can be selectively specified. This interaction is comparable to a dynamic bulletin board where the subject is event driven. In the case of an event interest(s), users specify their interest (e.g. in other user application events or system events) and the system automatically alerts them to the occurrence of the event.

25 Claims, 64 Drawing Sheets

Related U.S. Application Data continuation of application No. 16/030,562, filed on Jul. 9, 2018, now Pat. No. 10,270,838, which is a continuation of application No. 15/803,371, filed on Nov. 3, 2017, now Pat. No. 10,033,792, which is a continuation of application No. 15/391,560, filed on Dec. 27, 2016, now Pat. No. 9,813,481, which is a continuation of application No. 14/958,433, filed on Dec. 3, 2015, now Pat. No. 9,535,582, which is a continuation of application No. 13/154,316, filed on Jun. 6, 2011, now Pat. No. 9,208,469, which is a continuation of application No. 11/746,547, filed on May 9, 2007, now Pat. No. 8,255,791, which is a continuation of application No. 09/998,517, filed on Nov. 29, 2001, now Pat. No. 7,231,596.

(60) Provisional application No. 60/259,488, filed on Jan. 3, 2001, provisional application No. 60/293,413, filed on May 24, 2001, provisional application No. 60/250,035, filed on Nov. 29, 2000.

(51) Int. Cl.

| | | |
|---|---|---|
| *G06F 11/34* | (2006.01) | |
| *G06F 40/134* | (2020.01) | |
| *G06Q 10/10* | (2012.01) | |
| *G06F 3/0484* | (2013.01) | |
| *G06T 11/20* | (2006.01) | |

(52) U.S. Cl.
CPC ........... *G06F 40/134* (2020.01); *G06Q 10/10* (2013.01); *G06T 11/206* (2013.01); *H04L 67/2842* (2013.01); *G06F 2221/2119* (2013.01); *G06F 2221/2149* (2013.01); *H04L 67/22* (2013.01)

(58) Field of Classification Search
USPC ....................................................... 715/738
See application file for complete search history.

(56) References Cited

U.S. PATENT DOCUMENTS

| | | |
|---|---|---|
| 5,253,362 A | 10/1993 | Nolan et al. |
| 5,272,628 A | 12/1993 | Koss |
| 5,388,196 A | 2/1995 | Pajak et al. |
| 5,420,695 A | 5/1995 | Ohta |
| 5,425,138 A | 6/1995 | Kumakawa |
| 5,440,678 A | 8/1995 | Elsen et al. |
| 5,537,525 A | 7/1996 | Gotoh et al. |
| 5,537,618 A | 7/1996 | Boulton et al. |
| 5,583,993 A | 12/1996 | Foster et al. |
| 5,588,099 A | 12/1996 | Mogilevsky et al. |
| 5,664,207 A | 9/1997 | Crumpler et al. |
| 5,671,428 A | 9/1997 | Muranaga et al. |
| 5,701,453 A | 12/1997 | Maloney et al. |
| 5,724,508 A | 3/1998 | Harple et al. |
| 5,748,930 A | 5/1998 | Prakash |
| 5,790,818 A | 8/1998 | Martin |
| 5,799,151 A | 8/1998 | Hoffer |
| 5,801,757 A | 9/1998 | Saulsbury |
| 5,809,317 A | 9/1998 | Kogan et al. |
| 5,819,274 A | 10/1998 | Jackson, Jr. |
| 5,826,051 A | 10/1998 | Porter et al. |
| 5,835,916 A | 11/1998 | Inaki et al. |
| 5,838,917 A | 11/1998 | Paolini |
| 5,859,974 A | 1/1999 | McArdle et al. |
| 5,872,924 A | 2/1999 | Nakayama et al. |
| 5,873,088 A | 2/1999 | Hayashi et al. |
| 5,874,958 A | 2/1999 | Ludolph |
| 5,877,757 A | 3/1999 | Baldwin et al. |
| 5,881,285 A | 3/1999 | DeLeeuw |
| 5,884,299 A | 3/1999 | Ramesh et al. |
| 5,890,175 A | 3/1999 | Wong et al. |
| 5,913,032 A | 6/1999 | Schwartz et al. |
| 5,915,258 A | 6/1999 | Toyokura |
| 5,917,537 A | 6/1999 | Lightfoot et al. |
| 5,918,010 A | 6/1999 | Appleman et al. |
| 5,926,816 A | 7/1999 | Bauer et al. |
| 5,941,945 A | 8/1999 | Aditham et al. |
| 5,963,208 A | 10/1999 | Dolan et al. |
| 5,974,446 A | 10/1999 | Sonnenreich |
| 5,978,828 A | 11/1999 | Greer |
| 5,987,422 A | 11/1999 | Buzsaki |
| 6,011,537 A * | 1/2000 | Slotznick .................. G06F 3/14 715/733 |
| 6,026,410 A | 2/2000 | Allen et al. |
| 6,038,601 A | 3/2000 | Lambert et al. |
| 6,044,383 A | 3/2000 | Suzuki et al. |
| 6,055,550 A | 4/2000 | Wallack |
| 6,055,570 A | 4/2000 | Nielsen |
| 6,078,741 A | 6/2000 | Ma et al. |
| 6,078,921 A | 6/2000 | Kelley |
| 6,088,708 A | 7/2000 | Burch et al. |
| 6,094,684 A | 7/2000 | Pallmann |
| 6,105,055 A | 8/2000 | Pizano et al. |
| 6,108,800 A | 8/2000 | Asawa |
| 6,119,147 A | 9/2000 | Toomey et al. |
| 6,138,128 A | 10/2000 | Perkowitz et al. |
| 6,141,010 A | 10/2000 | Hoyle |
| 6,151,643 A | 11/2000 | Cheng et al. |
| 6,161,200 A | 12/2000 | Rees et al. |
| 6,178,432 B1 | 1/2001 | Cook et al. |
| 6,192,396 B1 | 2/2001 | Kohler |
| 6,192,407 B1 | 2/2001 | Smith et al. |
| 6,212,534 B1 | 4/2001 | Lo et al. |
| 6,219,818 B1 | 4/2001 | Freivald |
| 6,236,989 B1 | 5/2001 | Mandyam et al. |
| 6,240,444 B1 | 5/2001 | Fin et al. |
| 6,243,722 B1 | 6/2001 | Day et al. |
| 6,263,507 B1 | 7/2001 | Ahmad et al. |
| 6,269,369 B1 | 7/2001 | Robertson |
| 6,278,965 B1 | 8/2001 | Glass et al. |
| 6,289,362 B1 | 9/2001 | Van Der Meer |
| 6,295,551 B1 | 9/2001 | Roberts et al. |
| 6,295,639 B1 | 9/2001 | Van Der Meer |
| 6,324,654 B1 | 11/2001 | Wahl et al. |
| 6,330,592 B1 | 12/2001 | Makuch et al. |
| 6,336,124 B1 | 1/2002 | Alam et al. |
| 6,341,292 B1 | 1/2002 | Cho et al. |
| 6,342,906 B1 | 1/2002 | Kumar et al. |
| 6,353,596 B1 | 3/2002 | Grossglauser et al. |
| 6,377,991 B1 | 4/2002 | Smith et al. |
| 6,405,224 B1 | 6/2002 | Van Der Meer |
| 6,408,330 B1 | 6/2002 | DelaHuerga |
| 6,415,316 B1 | 7/2002 | Van Der Meer |
| 6,430,567 B2 | 8/2002 | Burridge |
| 6,434,536 B1 | 8/2002 | Geiger |
| 6,434,599 B1 | 8/2002 | Porter |
| 6,437,812 B1 | 8/2002 | Giles et al. |
| 6,438,579 B1 | 8/2002 | Hosken |
| 6,442,575 B2 | 8/2002 | Pratley et al. |
| 6,446,111 B1 | 9/2002 | Lowery |
| 6,446,113 B1 | 9/2002 | Ozzie et al. |
| 6,463,460 B1 | 10/2002 | Simonoff |
| 6,473,752 B1 | 10/2002 | Fleming, III |
| 6,480,885 B1 | 11/2002 | Olivier |
| 6,487,583 B1 | 11/2002 | Harvey et al. |
| 6,489,980 B1 | 12/2002 | Scott et al. |
| 6,490,614 B1 | 12/2002 | Shaffer et al. |
| 6,493,703 B1 | 12/2002 | Knight et al. |
| 6,507,865 B1 | 1/2003 | Hanson et al. |
| 6,515,681 B1 | 2/2003 | Knight |
| 6,519,629 B2 | 2/2003 | Harvey et al. |
| 6,525,747 B1 | 2/2003 | Bezos |
| 6,532,462 B2 | 3/2003 | Balaban |
| 6,539,403 B2 | 3/2003 | Cho et al. |
| 6,560,620 B1 | 5/2003 | Ching |
| 6,564,246 B1 | 5/2003 | Varma et al. |
| 6,571,234 B1 | 5/2003 | Knight et al. |
| 6,571,285 B1 | 5/2003 | Groath et al. |
| 6,584,466 B1 | 6/2003 | Serbinis et al. |

(56) References Cited

U.S. PATENT DOCUMENTS

| | | |
|---|---|---|
| 6,606,657 B1 | 8/2003 | Zilberstein et al. |
| 6,609,126 B1 | 8/2003 | Smith et al. |
| 6,611,822 B1 | 8/2003 | Beams et al. |
| 6,617,969 B2 | 9/2003 | Tu et al. |
| 6,626,959 B1 | 9/2003 | Moise et al. |
| 6,628,314 B1 | 9/2003 | Hoyle |
| 6,629,143 B1 | 9/2003 | Pang |
| 6,631,363 B1 | 10/2003 | Brown et al. |
| 6,636,242 B2 | 10/2003 | Bowman-Amuah |
| 6,640,241 B1 | 10/2003 | Ozzie et al. |
| 6,651,086 B1 | 11/2003 | Manber et al. |
| 6,671,714 B1 | 12/2003 | Weyer et al. |
| 6,674,992 B2 | 1/2004 | Helmick et al. |
| 6,675,197 B1 | 1/2004 | Satoh et al. |
| 6,675,351 B1 | 1/2004 | Leduc |
| 6,681,369 B2 | 1/2004 | Meunier et al. |
| 6,687,875 B1 | 2/2004 | Suzuki |
| 6,687,878 B1 | 2/2004 | Eintracht et al. |
| 6,691,281 B1 | 2/2004 | Sorge et al. |
| 6,697,810 B2 | 2/2004 | Kumar et al. |
| 6,714,916 B1 | 3/2004 | Robertson et al. |
| 6,721,729 B2 | 4/2004 | Nguyen et al. |
| 6,721,740 B1 * | 4/2004 | Skinner ................. G06F 9/542 |
| 6,721,921 B1 | 4/2004 | Altman |
| 6,738,770 B2 | 5/2004 | Gorman |
| 6,754,693 B1 | 6/2004 | Roberts et al. |
| 6,757,682 B1 | 6/2004 | Naimark et al. |
| 6,763,386 B2 | 7/2004 | Davis et al. |
| 6,763,403 B2 | 7/2004 | Cheng |
| 6,775,664 B2 | 8/2004 | Lang et al. |
| 6,779,152 B1 | 8/2004 | Conner et al. |
| 6,845,448 B1 | 1/2005 | Chaganti et al. |
| 6,850,917 B1 | 2/2005 | Hom et al. |
| 6,857,074 B2 | 2/2005 | Bobo, II |
| 6,859,807 B1 | 2/2005 | Knight et al. |
| 6,859,821 B1 | 2/2005 | Ozzie et al. |
| 6,859,907 B1 | 2/2005 | McGarry |
| 6,865,268 B1 | 3/2005 | Matthews et al. |
| 6,865,713 B1 | 3/2005 | Bates et al. |
| 6,874,123 B1 | 3/2005 | DeStefano |
| 6,879,994 B1 | 4/2005 | Matsliach et al. |
| 6,883,136 B1 | 4/2005 | Weinberg et al. |
| 6,885,874 B2 | 4/2005 | Grube et al. |
| 6,889,359 B1 | 5/2005 | Conner et al. |
| 6,892,240 B1 | 5/2005 | Nakajima |
| 6,907,568 B1 | 6/2005 | Meyers |
| 6,917,965 B2 | 7/2005 | Gupta et al. |
| 6,934,945 B1 | 8/2005 | Ogilvy |
| 6,941,345 B1 | 9/2005 | Kapil et al. |
| 6,970,849 B1 | 11/2005 | DeMello et al. |
| 6,981,061 B1 | 12/2005 | Sakakura |
| 6,983,266 B1 | 1/2006 | Goldschmidt |
| 6,986,099 B2 | 1/2006 | Todd |
| 6,988,241 B1 | 1/2006 | Guttman et al. |
| 6,993,137 B2 | 1/2006 | Fransdonk |
| 7,003,546 B1 | 2/2006 | Cheah |
| 7,003,550 B1 | 2/2006 | Cleasby et al. |
| 7,007,041 B2 | 2/2006 | Multer et al. |
| 7,016,939 B1 | 3/2006 | Rothwell et al. |
| 7,025,209 B2 | 4/2006 | Hawkins |
| 7,032,030 B1 | 4/2006 | Codignotto |
| 7,043,526 B1 | 5/2006 | Wolfe |
| 7,050,185 B1 | 5/2006 | Sawada |
| 7,058,892 B1 | 6/2006 | MacNaughton et al. |
| 7,062,532 B1 | 6/2006 | Sweat et al. |
| 7,076,736 B2 | 7/2006 | Hugh |
| 7,082,407 B1 | 7/2006 | Bezos et al. |
| 7,107,315 B1 | 9/2006 | Rodriguez et al. |
| 7,111,060 B2 | 9/2006 | Araujo et al. |
| 7,155,612 B2 | 12/2006 | Licis |
| 7,174,364 B1 | 2/2007 | Aravamudan et al. |
| 7,185,285 B2 | 2/2007 | Van Dok et al. |
| 7,194,419 B2 | 3/2007 | Robertson et al. |
| 7,194,505 B2 | 3/2007 | Yano |
| 7,216,290 B2 | 5/2007 | Goldstein et al. |
| 7,246,164 B2 | 7/2007 | Lehmann et al. |
| 7,257,604 B1 | 8/2007 | Wolfe |
| 7,260,777 B2 | 8/2007 | Fitzsimons et al. |
| 7,260,849 B1 | 8/2007 | Frazier et al. |
| 7,275,207 B2 | 9/2007 | Aureglia et al. |
| 7,277,911 B2 | 10/2007 | Cheah |
| 7,287,257 B2 | 10/2007 | Meza |
| 7,296,219 B1 | 11/2007 | Guttman et al. |
| 7,299,403 B1 | 11/2007 | Cleasby et al. |
| 7,305,381 B1 * | 12/2007 | Poppink ............... G06Q 10/107 |
| 7,346,841 B2 | 3/2008 | Kuruoglu et al. |
| 7,370,047 B2 | 5/2008 | Gorman |
| 7,370,269 B1 | 5/2008 | Prabhu et al. |
| 7,386,464 B2 | 6/2008 | Robertson et al. |
| 7,418,431 B1 | 8/2008 | Nies et al. |
| 7,424,543 B2 | 9/2008 | Rice, III |
| 7,433,832 B1 | 10/2008 | Bezos et al. |
| 7,434,166 B2 | 10/2008 | Acharya et al. |
| 7,441,250 B2 | 10/2008 | Katz et al. |
| 7,447,691 B2 | 11/2008 | Doliov |
| 7,464,122 B1 | 12/2008 | Basko |
| 7,478,054 B1 | 1/2009 | Adams et al. |
| 7,506,357 B1 | 3/2009 | Moriconi |
| 7,574,474 B2 | 8/2009 | Thornton et al. |
| 7,587,484 B1 | 9/2009 | Smith et al. |
| 7,587,504 B2 | 9/2009 | Adams et al. |
| 7,596,606 B2 | 9/2009 | Codignotto |
| 7,607,148 B2 | 10/2009 | Feinberg et al. |
| 7,610,233 B1 | 10/2009 | Leong et al. |
| 7,644,122 B2 | 1/2010 | Weyer et al. |
| 7,644,361 B2 | 1/2010 | Wu et al. |
| 7,669,123 B2 | 2/2010 | Zuckerberg et al. |
| 7,685,247 B2 | 3/2010 | Codignotto |
| 7,685,276 B2 | 3/2010 | Konig et al. |
| 7,689,658 B2 | 3/2010 | Codignotto |
| 7,693,810 B2 | 4/2010 | Donoho et al. |
| 7,698,372 B2 | 4/2010 | Codignotto |
| 7,739,139 B2 | 6/2010 | Robertson et al. |
| 7,743,100 B2 | 6/2010 | Cheah |
| 7,778,890 B1 | 8/2010 | Bezos et al. |
| RE41,754 E | 9/2010 | Knight |
| 7,802,207 B2 | 9/2010 | Agboatwalla et al. |
| 7,822,812 B2 | 10/2010 | Mathur |
| 7,826,603 B1 | 11/2010 | Denman et al. |
| 7,836,141 B2 | 11/2010 | Bobo, II |
| 7,885,977 B2 | 2/2011 | Baker |
| 7,895,306 B2 | 2/2011 | Bobo, II |
| 7,895,313 B2 | 2/2011 | Bobo, II |
| 7,953,087 B1 | 5/2011 | Bollay et al. |
| RE42,509 E | 6/2011 | Nagashima et al. |
| 7,991,637 B1 | 8/2011 | Guiheneuf et al. |
| 8,005,896 B2 | 8/2011 | Cheah |
| 8,005,905 B2 | 8/2011 | Doan et al. |
| 8,112,511 B2 | 2/2012 | Sim |
| 8,150,913 B2 | 4/2012 | Cheah |
| 8,161,081 B2 | 4/2012 | Kaufman et al. |
| 8,229,782 B1 | 7/2012 | Adams et al. |
| 8,321,499 B2 | 11/2012 | Reisman |
| 8,352,352 B2 | 1/2013 | Harris |
| 8,428,618 B2 | 4/2013 | Fano et al. |
| 8,732,048 B2 | 5/2014 | Marynowski et al. |
| 8,990,678 B2 * | 3/2015 | Bedingfield, Sr. ................ G06F 16/9535 715/234 |
| 9,015,803 B1 | 4/2015 | Chaganti et al. |
| 9,058,416 B2 | 6/2015 | Angeles |
| 9,202,202 B2 | 12/2015 | Beaven |
| 2001/0001858 A1 | 5/2001 | Kido |
| 2001/0011235 A1 | 8/2001 | Kim et al. |
| 2001/0018694 A1 | 8/2001 | Iwamoto et al. |
| 2001/0027446 A1 | 10/2001 | Metcalfe |
| 2001/0028364 A1 | 10/2001 | Fredell et al. |
| 2001/0032257 A1 | 10/2001 | Wells et al. |
| 2001/0042098 A1 | 11/2001 | Gupta et al. |
| 2001/0054059 A1 | 12/2001 | Marks et al. |
| 2002/0010671 A1 | 1/2002 | Tsai |
| 2002/0010760 A1 | 1/2002 | Armenta |
| 2002/0016821 A1 | 2/2002 | Son et al. |
| 2002/0026478 A1 | 2/2002 | Rodgers et al. |

(56) References Cited

U.S. PATENT DOCUMENTS

| | | |
|---|---|---|
| 2002/0042769 A1 | 4/2002 | Gujral et al. |
| 2002/0042830 A1 | 4/2002 | Bose et al. |
| 2002/0046076 A1 | 4/2002 | Baillargeon et al. |
| 2002/0057285 A1 | 5/2002 | Nicholas, III |
| 2002/0059075 A1 | 5/2002 | Schick et al. |
| 2002/0063733 A1 | 5/2002 | Franke et al. |
| 2002/0069203 A1 | 6/2002 | Dar et al. |
| 2002/0069221 A1 | 6/2002 | Rao et al. |
| 2002/0069226 A1 | 6/2002 | Thierschmidt |
| 2002/0073152 A1 | 6/2002 | Andrew et al. |
| 2002/0075303 A1 | 6/2002 | Thompson et al. |
| 2002/0082911 A1 | 6/2002 | Dunn et al. |
| 2002/0087496 A1 | 7/2002 | Stirpe et al. |
| 2002/0087798 A1 | 7/2002 | Perincherry |
| 2002/0091729 A1 | 7/2002 | Gang et al. |
| 2002/0091733 A1 | 7/2002 | Chen et al. |
| 2002/0099812 A1 | 7/2002 | Davis et al. |
| 2002/0116417 A1 | 8/2002 | Weinberg et al. |
| 2002/0138582 A1 | 9/2002 | Chandra et al. |
| 2002/0143809 A1 | 10/2002 | Bennett |
| 2002/0156799 A1 | 10/2002 | Markel et al. |
| 2002/0161685 A1 | 10/2002 | Dwinnell |
| 2002/0161733 A1 | 10/2002 | Grainger |
| 2002/0169826 A1 | 11/2002 | Yano et al. |
| 2002/0174142 A1 | 11/2002 | Demers et al. |
| 2002/0188632 A1 | 12/2002 | Su |
| 2002/0194372 A1 | 12/2002 | Elmaliach et al. |
| 2003/0004916 A1 | 1/2003 | Lewis |
| 2003/0009459 A1 | 1/2003 | Chastain et al. |
| 2003/0023679 A1 | 1/2003 | Johnson et al. |
| 2003/0023718 A1 | 1/2003 | Smith, II |
| 2003/0028610 A1 | 2/2003 | Pearson |
| 2003/0033205 A1 | 2/2003 | Nowers et al. |
| 2003/0033212 A1 | 2/2003 | Sandhu et al. |
| 2003/0041076 A1 | 2/2003 | Lucovsky et al. |
| 2003/0055666 A1 | 3/2003 | Roddy et al. |
| 2003/0065608 A1 | 4/2003 | Cutler |
| 2003/0074204 A1 | 4/2003 | Krothapalli et al. |
| 2003/0093403 A1 | 5/2003 | Upton |
| 2003/0097384 A1 | 5/2003 | Hu et al. |
| 2003/0099337 A1 | 5/2003 | Lord |
| 2003/0110228 A1 | 6/2003 | Xu et al. |
| 2003/0120741 A1* | 6/2003 | Wu .................... G06F 16/9574 709/213 |
| 2003/0145277 A1 | 7/2003 | Neal et al. |
| 2003/0154135 A1 | 8/2003 | Covington et al. |
| 2003/0163598 A1 | 8/2003 | Wilson et al. |
| 2003/0163784 A1 | 8/2003 | Daniel et al. |
| 2003/0172380 A1 | 9/2003 | Kikinis |
| 2003/0188261 A1 | 10/2003 | Smith et al. |
| 2003/0204517 A1 | 10/2003 | Skinner et al. |
| 2003/0221167 A1 | 11/2003 | Goldstein et al. |
| 2003/0229848 A1 | 12/2003 | Arend et al. |
| 2004/0015582 A1 | 1/2004 | Pruthi |
| 2004/0039781 A1 | 2/2004 | LaVallee et al. |
| 2004/0049537 A1 | 3/2004 | Titmuss |
| 2004/0071273 A1 | 4/2004 | Booton |
| 2004/0107405 A1 | 6/2004 | Schein |
| 2004/0205493 A1 | 10/2004 | Simpson et al. |
| 2004/0213283 A1 | 10/2004 | Ohkubo et al. |
| 2004/0249885 A1 | 12/2004 | Petropoulakis et al. |
| 2004/0260575 A1 | 12/2004 | Massey |
| 2005/0004977 A1 | 1/2005 | Roberts et al. |
| 2005/0021643 A1 | 1/2005 | Watanabe et al. |
| 2005/0065950 A1 | 3/2005 | Chaganti |
| 2005/0097008 A1 | 5/2005 | Ehring et al. |
| 2005/0183021 A1 | 8/2005 | Allen et al. |
| 2005/0193339 A1 | 9/2005 | Meyers |
| 2005/0204276 A1 | 9/2005 | Hosea et al. |
| 2005/0210061 A1 | 9/2005 | Chang et al. |
| 2005/0210393 A1 | 9/2005 | Maeng |
| 2005/0216847 A1 | 9/2005 | Zhu et al. |
| 2005/0251452 A1 | 11/2005 | Roever et al. |
| 2005/0262164 A1 | 11/2005 | Guiheneuf et al. |
| 2005/0267870 A1 | 12/2005 | Everett-Church et al. |
| 2006/0005202 A1 | 1/2006 | Tanaka |
| 2006/0015405 A1 | 1/2006 | Bala et al. |
| 2006/0036756 A1 | 2/2006 | Driemeyer et al. |
| 2006/0095366 A1 | 5/2006 | Sheth et al. |
| 2006/0143560 A1 | 6/2006 | Gupta et al. |
| 2006/0242583 A1 | 10/2006 | MacNaughton et al. |
| 2007/0083552 A1 | 4/2007 | Allen et al. |
| 2007/0168871 A1 | 7/2007 | Jenkins |
| 2007/0186157 A1 | 8/2007 | Walker et al. |
| 2007/0299701 A1 | 12/2007 | Boyer et al. |
| 2008/0082903 A1 | 4/2008 | McCurdy et al. |
| 2008/0091667 A1 | 4/2008 | Nair |
| 2008/0134018 A1 | 6/2008 | Kembel et al. |
| 2008/0147736 A1 | 6/2008 | Dane et al. |
| 2008/0168138 A1 | 7/2008 | Simpson |
| 2008/0208787 A1 | 8/2008 | Luchene |
| 2008/0215528 A1 | 9/2008 | Sedlar |
| 2008/0229217 A1 | 9/2008 | Kembel |
| 2008/0294544 A1 | 11/2008 | Harrington et al. |
| 2009/0030774 A1 | 1/2009 | Rothschild et al. |
| 2009/0031006 A1 | 1/2009 | Johnson |
| 2010/0023890 A1 | 1/2010 | Paalasmaa et al. |
| 2010/0070387 A1 | 3/2010 | Anderson et al. |
| 2010/0070542 A1 | 3/2010 | Feinsmith |
| 2010/0094976 A1 | 4/2010 | Kanefsky et al. |
| 2011/0047487 A1 | 2/2011 | DeWeese et al. |
| 2011/0055673 A1 | 3/2011 | Teng et al. |
| 2011/0099108 A1 | 4/2011 | Fung et al. |
| 2011/0113427 A1 | 5/2011 | Dotan |
| 2011/0197159 A1 | 8/2011 | Chaganti |
| 2011/0238651 A1 | 9/2011 | Glazer et al. |
| 2012/0096490 A1 | 4/2012 | Barnes |
| 2012/0110426 A1 | 5/2012 | Ran et al. |
| 2012/0278740 A1 | 11/2012 | Robinson |
| 2013/0080595 A1 | 3/2013 | MacNaughton et al. |
| 2013/0117086 A1 | 5/2013 | Mesaros |
| 2013/0151390 A1 | 6/2013 | Ginsberg et al. |
| 2013/0282527 A1 | 10/2013 | Mannik et al. |
| 2013/0346895 A1 | 12/2013 | Selgas et al. |
| 2014/0032540 A1 | 1/2014 | Lim et al. |
| 2015/0195222 A1 | 7/2015 | Bedingfield |
| 2015/0256616 A1 | 9/2015 | Puthenkulam |

FOREIGN PATENT DOCUMENTS

| | | |
|---|---|---|
| WO | WO 01/33362 | 5/2001 |
| WO | WO 03/007151 | 1/2003 |

OTHER PUBLICATIONS

Budzik et al., User Interactions with Everyday Applications as Context for Just-in-time Information Access, ACM 2000, pp. 44-51.

Anupam et al., "Personalizing the Web Using SIte Description," IEEE, 1999 (7 pages).

Carchiolo et al., "Structuring the Web," IEEE, 1999 (6 pages).

Diegerger, "Supporting Social Navigation on the World Wide Web" Google 1997, pp. 1-6.

Siciu, "Managing Web Data", ACM, 1999 (1 page), filed in U.S. Appl. No. 11/746,547.

Yang et al., "Developing Integrated Web and Database Applications Using Jave Applets and JDBC Drievers," ACM 1998, pp. 302-306.

Leland, M. et al., "Collaborative Document Production Using Quilt" ACM 1988, pp. 206-215.

Malone, T. et al., Intelligent Information Sharing Systems Communications of the ACM, May 1987, vol. 30, No. 5 (13 pages).

Bentley et al., Supporting Collaborative Information Sharing with the World Wide Web: The BSCW Shared Workspace System, Google 1995, pp. 1-12.

Chen et al., Information Visualization for Collaborative Computing, IEEE 1998, pp. 75-82.

Bolcer et al., Peer-to-Peer Architecture and the Magi Open-Source Infrastructure, Google Dec. 6, 2000, pp. 1-37.

Oonk et al., Evaluating the Usage, Utility and Usability of Web Technologies to Facilitate Knowledge Sharing, Google 2001, pp. 1-15.

(56) References Cited

OTHER PUBLICATIONS

Carzaniga et al., Achieving Scalability and Expressiveness in an Internet-scale Event Notification Service, ACM 2000, pp. 219-227.
Amato et al., "User Profile Modeling and Applications to Digital Libraries", Springer 1999 (pp. 184-197).
RSS 0.90 Specification [online], Mar. 15, 1999 http://www.rssboard.org/r-ss-0-9-0.
RSS 0.91 Specification [online], Jul. 10, 1999 http://www.rssboard.org/rss-0-9-1-netscape.
RDF Site Summary (RSS) 1.0 [online], Dec. 12, 2000 http://web.resource.org/rss/1.0/spec.
RDF Site Summary 1.0 Modules [online], Dec. 12, 2000 http://web.resource.org/rss/1.0/modules/.
Cimino, Beyond the Superhighway: Exploiting the Internet with Medical Informatics, Google 1997, pp. 279-285.
Fagg et al., Scalable Networked Information Processing Environment (SNIPE), Google 1999, pp. 595-605.
Kindberg Mushroom: A Framework for Collaboration and Interaction across the Internet, Google 1996, pp. 1-11.
Huang et al., A General Purpose Virtual Collaboration Room, IEEE 1999, pp. 1-9.
Chalmers et al., The Order of Things: Activity-Centered Information Access, Computer Networks 1998, pp. 359-367.
Greif et al., Data Sharing in Group Work, ACM 1987, pp. 187-211.
Parameswaran et al., P2P Networking: An Information-Sharing Alternative, IEEE 2001, pp. 31-38.
Anderson et al., Adaptive Web Navigation for Wireless Devices, Google 2001, pp. 1-6.
Liu et al., Continual Queries for Internet Scale Event-Driven Information Delivery, IEEE 1999, pp. 610-628.
International Search Report for PCT/US01/44906 dated Jul. 11, 2002 (6 pages).
Search and Examination Report under Sections 17 and 18(3) as received in corresponding UK International application No. GB0315235.2 (4 pages).
"BugsEye Search Tutorial," Pantellos (2004) 19 pages.
Chen et al., "Missing Tables form Large Scale HTML Texts," ACM Jul. 2000, pp. 166-172.
"Insight Online" Outlook 98 Tips retrieved on Nov. 3, 2005 from the Internet <URL: http://www.co.monterey.ca.us/iss/insight/Ins9811/ins9811h.htm>.
Lo et al., "TabSum: A Flexible and Dynamic Table Summarization Approach," Apr. 10-13, 2000, IEEE, pp. 628-635.
Maglio et al., SUITOR: An Attentive Information System, ACM 2000, pp. 169-176.
Moran et al., Document Presence Notification Services for Collaborative Writing, IEEE 2001, pp. 125-133.
Douglis et al., The AT&T Internet Difference Engine: Tracking and Viewing Changes on the Web, Springer 1998, pp. 27-44. (Year: 1998).

* cited by examiner

| Portfolio | Trades | Markets | Trade Entry | Logout |

Views: Indices     Override

Portfolio Analysis Instrument Override Account Equities 3 As Of 11/06/2000 Copyright 2000 Unilogic, Inc.

| Instrument | Description | Bid | Ask | Last | LocalPrice Override |
|---|---|---|---|---|---|
| AAPL | Apple Computer | 21.1875 | 21.3125 | 21.4375 | 25.0000 [X] |
| IBM | IBM | 0.0000 | 0.0000 | 100.3125 | [X] |

[ Portfolio ] [ Trades ] [ Markets ] [ Trade Entry ] [ Logout ]

Account Trader Fund

Account [ Equities 1 ▼ ] [ Go ]

Views: Blotter – DailyBlotter – Expiration

Trade Blotter Account Equities1 As Of 11/29/2000 Copyright 2000 Unilogic, Inc.

902 — [ Modify Trade ] [ Cancel Trade ] — 803

| TradeID | Security Name | Description | Trade Type | Trade Status | Trade Dividend | Trade Quantity | Trade Price | Security Type | Counterparty | Trade Date | Maturity |
|---|---|---|---|---|---|---|---|---|---|---|---|
| ⇔ 2641 | IBM | IBM | Buy | Open | 0.00 | 1000.00 | 99.000 | Common Stock | Bank Of America | 11/06/2000 | |
| Total | | | | | | | | | | | |

FIG. 8B

[ Portfolio ] [ Trades ] [ Markets ] [ Trade Entry ] [ Logout ]

Are you sure to Modify trade 2641?

[ Yes ] [ No ]

FIG. 9

[ Portfolio ] [ Trades ] [ Markets ] [ Trade Entry ] [ Logout ]

Choose Security Type [Equity ▼] [Go]

Equity Trade Entry

⦿ Buy  ○ Sell  ○ Sell Short  ○ Buy To Cover

| | |
|---|---|
| Account | [Equities1 ▼] |
| Amount | 1000.00 |
| Equity | IBM |
| Trade Price | 99.000 |
| Counterparty | [BankOfAmerica ▼] |
| Commission | 50.00 |
| Trade Date | 11/06/2000 |
| Hedge | ☐ |
| Trade ID | 2641 |

[submit]

FIG. 10

Detail Portfolio Analysis (By Country-Japan) Account Currencies1 As Of 11/26/2000 Copyright 2000 Unilogic, Inc.

| Instrument | Local Price | Currency | Maturity | Position | PosValue | UnrealizedP/L OTD | RealizedP/L OTD |
|---|---|---|---|---|---|---|---|
| EWJ | 11.75 | USD | | 2,000.00 | 23,500.00 | -4,760.00 | 0.00 |
| Japanese Yen | 112.00 | Japanese Yen | | 1,000,000.00 | 8,928.57 | -161.43 | 0.00 |
| Total | | | | | 32,428.57 | -4,911.43 | 0.00 |

Refresh Detail    Back To Aggregate View

FIG. 12

[ Portfolio ] [ Trades ] [ Curves ] [ Markets ] [ Trade Entry ] [ Configure ]

[ Logout ]

Account Trader Fund

Account [Currencies1 ▼] [Go]

Views: Fundamentals - ProfitLoss - Risk - By Allocation - By AssetClass - By Counterparty - By Country - By Currency - By Industry - By Instrument - By LongShort - By Greeks 600 — Portfolio Analysis (By AssetClass) Account Currencies1 As Of 05/22/2001

| AssetClass | ShortPosValue | LongPosValue | PosValue | %PosValue | UnrealizedP/L | RealizedP/L |
|---|---|---|---|---|---|---|
| | | | | | OTD | OTD |
| ☐ Currencies | -884,642.60 | 0.00 | -884,642.60 | 25.53 | -44,642.60 | 0.00 |
| ☐ Options | 0.00 | 55,000.00 | 55,000.00 | 1.59 | 29,000.00 | 0.00 |
| ☐ Equities | -490,350.00 | 2,082,630.00 | 1,592,280.00 | 72.89 | 1,179,175.00 | 0.00 |
| Total | -1,374,992.60 | 2,137,630.00 | 762,637.40 | 100.00 | 1,163,532.40 | 0.00 |

FIG. 15

[ Portfolio ] [ Trades ] [ Curves ] [ Markets ] [ Trade Entry ] [ Configure ]

[ Logout ]

Account Trader Fund

Account [Currencies1 ▼] [Go]

Views: Fundamentals - ProfitLoss - Risk - By Allocation - By AssetClass - By Counterparty - By Country - By Currency - By Industry - By Instrument - By LongShort - By Greeks Portfolio Analysis (By AssetClass) Account Currencies1 As Of 05/22/2001

| ▽ AssetClass | ShortPosValue | LongPosValue | PosValue | %PosValue | UnrealizedP/L OTD | RealizedP/L OTD |
|---|---|---|---|---|---|---|
| ☐ Currencies | -884,897.02 | 0.00 | -884,897.02 | 25.53 | 44,897.02 | 0.00 |
| ☐ Options | 0.00 | 55,000.00 | 55,000.00 | 1.59 | 29,000.00 | 0.00 |
| ☐ Equities | -490,350.00 | 2,082,630.00 | 1,592,280.00 | 72.88 | 1,179,175.00 | 0.00 |
| Total | -1,375,247.02 | 2,137,630.00 | 762,382.98 | 100.00 | 1,163,277.98 | 0.00 |

630 — 632 — 640 (column indicators)

(Selected Column)

FIG. 17

[ Portfolio ] [ Trades ] [ Curves ] [ Markets ] [ Trade Entry ] [ Configure ]

[ Logout ]

Account Trader Fund

Account [ Currencies1 ▼ ] [ Go ]

Views: Fundamentals - ProfitLoss - Risk - By Allocation - By AssetClass - By Counterparty - By Country - By Currency - By Industry - By Instrument - By LongShort - By Greeks Portfolio Analysis (By AssetClass) Account Currencies1 As Of 05/22/2001

| AssetClass | LongPosValue | PosValue | ShortPosValue | %PosValue | UnrealizedP/L | RealizedP/L |
|---|---|---|---|---|---|---|
| | | | | | OTD | OTD |
| ☐ Currencies | 0.00 | -884,779.58 | -884,779.58 | 25.53 | -44,779.58 | 0.00 |
| ☐ Options | 55,000.00 | 55,000.00 | 0.00 | 1.59 | 29,000.00 | 0.00 |
| ☐ Equities | 2,082,630.00 | 1,592,280.00 | -490,350.00 | 72.88 | 1,179,175.00 | 0.00 |
| Total | 2,137,630.00 | 762,500.42 | -1,375,129.58 | 100.00 | 1,163,395.42 | 0.00 |

(Selected Column)

FIG. 18

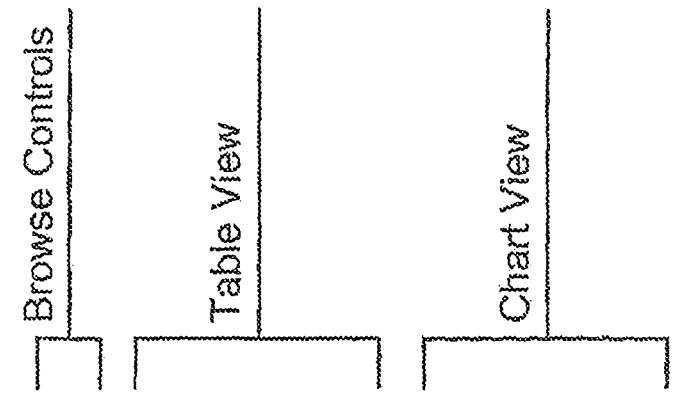
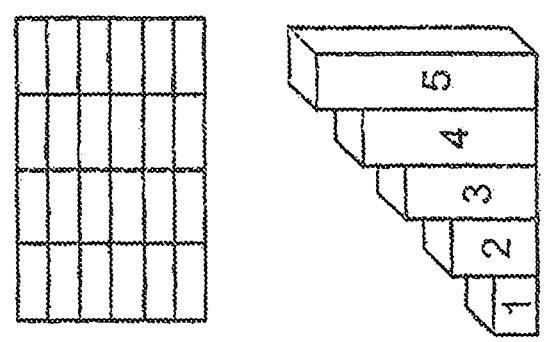
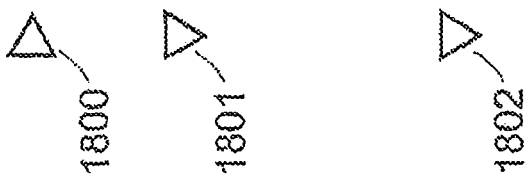
FIG. 20B

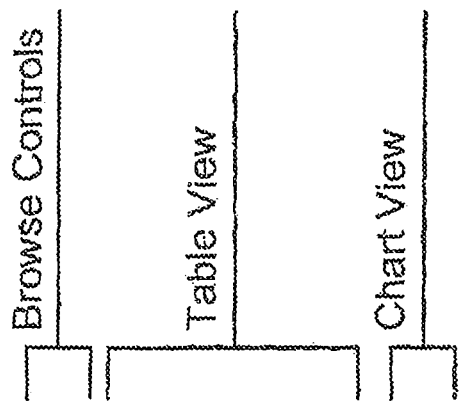
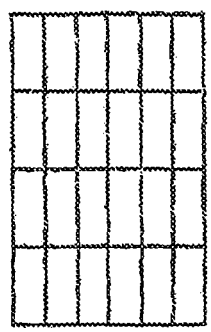
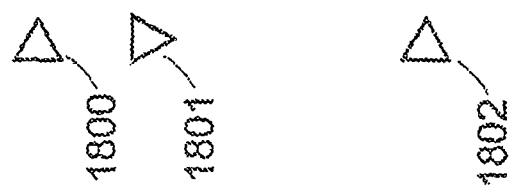
FIG. 20C

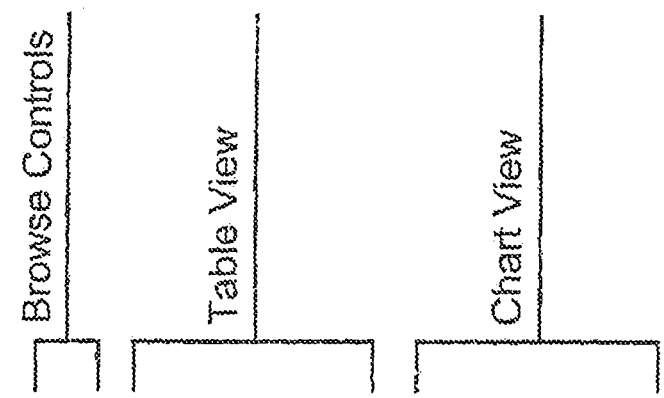
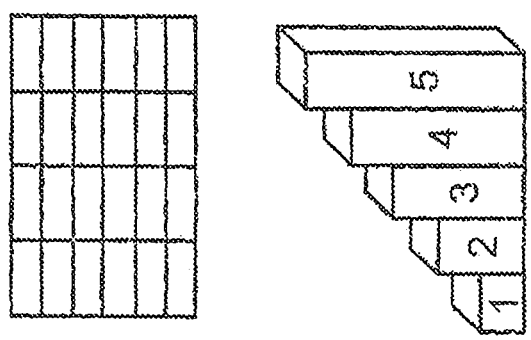
FIG. 20D

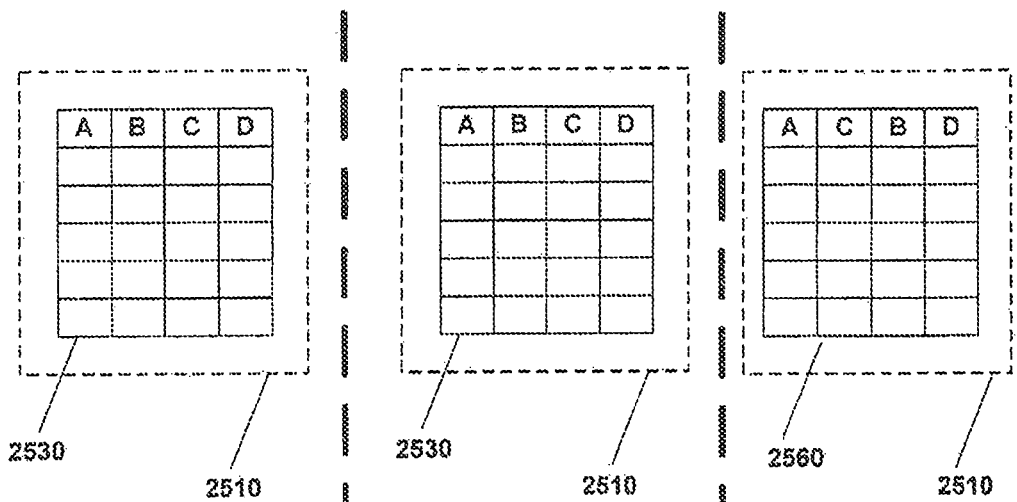
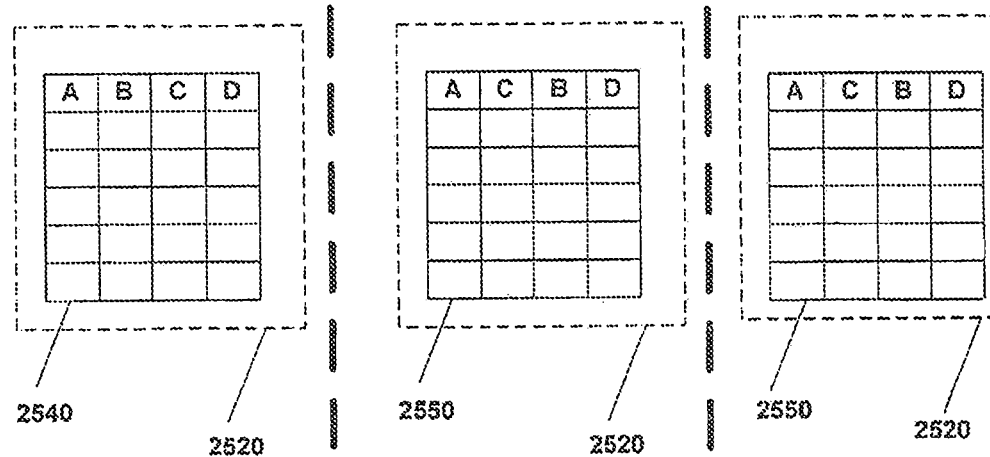
FIG. 25A  FIG. 25B  FIG. 25C

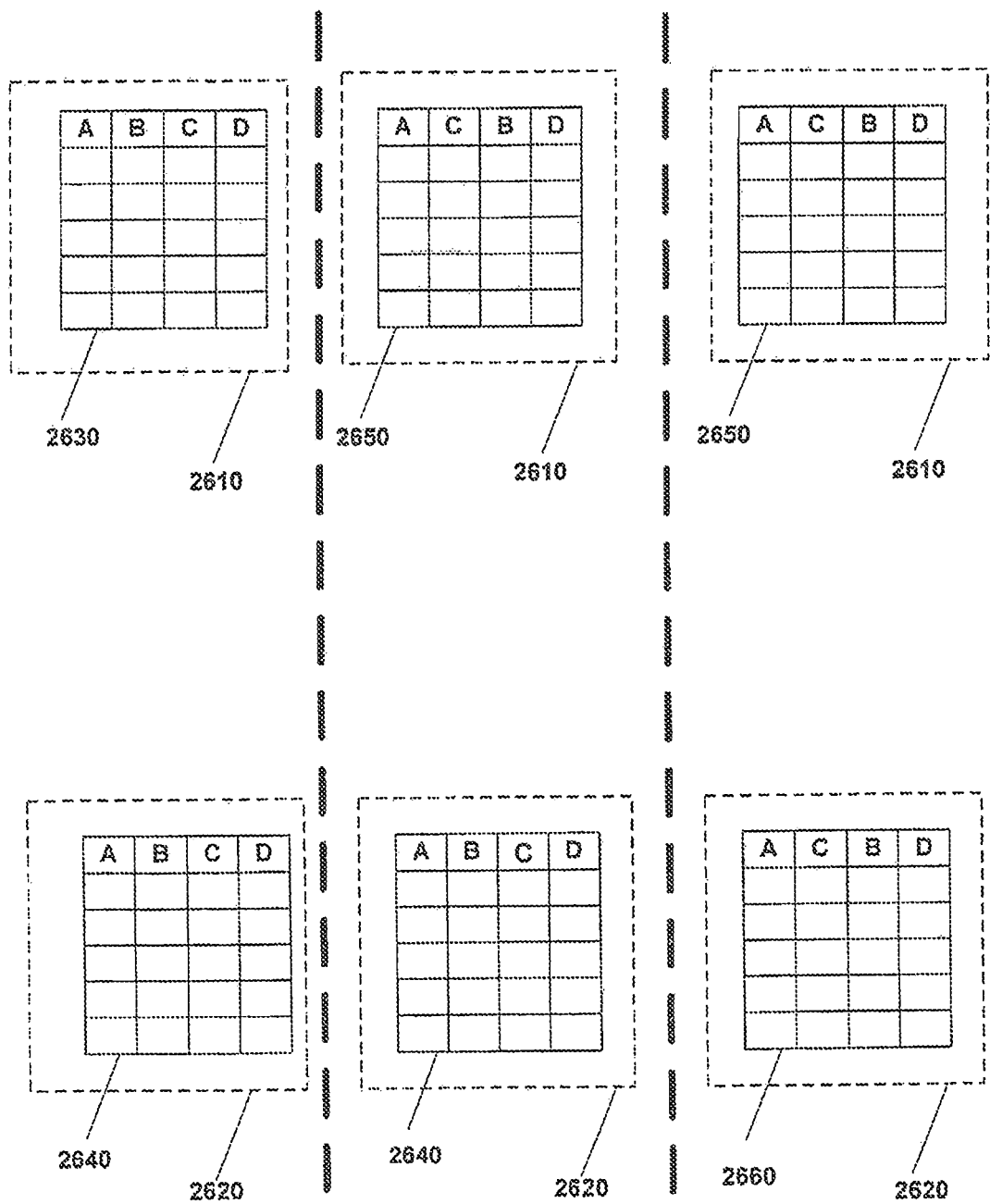

Standalone application service

Multi-service applications

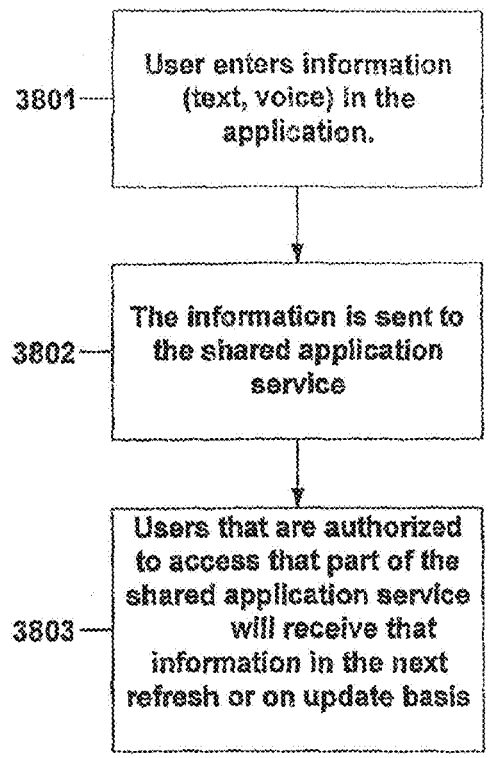
FIG. 38
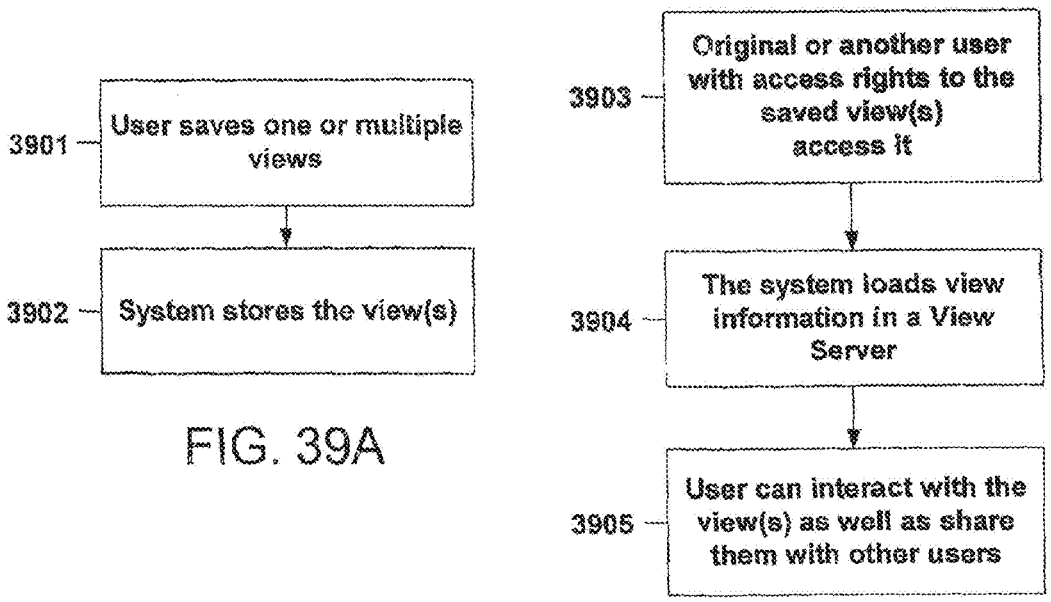
FIG. 39A
FIG. 39B

4001

| A | B | C | D |
|---|---|---|---|
| Text1 | 1100 | 200 | 150 |
| Text2 | 500 | 100 | 200 |
| Text3 | 1100 | 300 | 450 |
| Text4 | 700 | 500 | 100 |
| Text5 | 800 | 700 | 250 |
| Text6 | 850 | 900 | 600 |
| Text7 | 800 | 400 | 200 |
| TOTAL | 5850 | 3100 | 1950 |

| B | C | D | |
|---|---|---|---|
| 500 | 100 | 200 | |
| 700 | 500 | 100 | |
| 800 | 1100 | 450 | |
| 850 | 900 | 600 | |
| 1100 | 500 | 600 | |
| TOTAL | 3100 | 1950 | |

| B | C avg | D | |
|---|---|---|---|
| 500 | 100 | 200 | |
| 700 | 500 | 100 | |
| 800 | 550 | 450 | |
| 850 | 900 | 600 | |
| 1100 | 250 | 600 | |
| TOTAL | 3100 | 1950 | |

| A | B | C | D |
|---|---|---|---|
| Text1 | 1100 | 200 | 150 |
| Text3 | 1100 | 300 | 450 |
| | | | |
| TOTAL | 2200 | 500 | 600 |

| D | B | C |
|---|---|---|
| 100 | 700 | 500 |
| 150 | 1100 | 200 |
| 200 | 1300 | 500 |
| 250 | 800 | 700 |
| 450 | 1100 | 300 |
| 600 | 850 | 900 |
| | | |
| TOTAL | 5850 | 3100 |

| A | B | C | D |
|---|---|---|---|
| Text1 | 1100 | 200 | 150 |
| Text2 | 500 | 100 | 200 |
| Text3 | 1100 | 300 | 450 |
| Text4 | 700 | 500 | 100 |
| Text5 | 800 | 700 | 250 |
| Text6 | 850 | 900 | 600 |
| Text7 | 800 | 400 | 200 |
| TOTAL | 5850 | 3100 | 1950 |

FIG. 41A

| B | C | D |
|---|---|---|
| 500-750 | 600 | 300 |
| 750-1000 | 2000 | 1050 |
| 1000-1250 | 500 | 600 |
| TOTAL | 3100 | 1950 |

FIG. 41B

| B | C avg | D |
|---|---|---|
| 500-750 | 300 | 300 |
| 750-1000 | 666.67 | 1050 |
| 1000-1250 | 250 | 600 |
| TOTAL | 3100 | 1950 |

FIG. 41C

| *     | * 4201 | *     | *     |
|-------|--------|-------|-------|
| A     | B      | C     | D     |
| Text1 | 1100   | 200   | 150   |
| Text2 | 500    | 100   | 200   |
| Text3 | 1100   | 300   | 450   |
| Text4 | 700    | 500   | 100   |
| Text5 | 800    | 700   | 250   |
| Text6 | 850    | 900   | 600   |
| Text7 | 800    | 400   | 200   |
|       |        |       |       |
| TOTAL | 5850   | 3100  | 1950  |

| *     | * 4202 | *     | *     |
|-------|--------|-------|-------|
| A     | B      | C     | D     |
| Text2 | 500    | 100   | 200   |
| Text4 | 700    | 500   | 100   |
| Text5 | 800    | 700   | 250   |
| Text6 | 850    | 900   | 600   |
| Text7 | 800    | 400   | 200   |
|       |        |       |       |
| TOTAL | 3650   | 2600  | 1350  |

| *     | *     | *     | * 4203 |
|-------|-------|-------|--------|
| A     | B     | C     | D      |
| Text2 | 500   | 100   | 200    |
| Text4 | 700   | 500   | 100    |
| Text5 | 800   | 700   | 250    |
| Text7 | 800   | 400   | 200    |
|       |       |       |        |
| TOTAL | 2800  | 1700  | 750    |

FIG. 45A
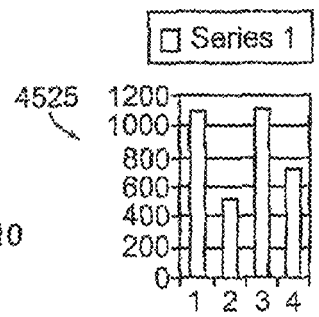
FIG. 45B
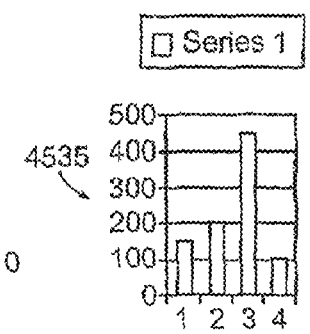
FIG. 45C

| A | B | C |
|---|---|---|
| Text1 | 2/15/99 | 1000 |
| Text1 | 2/15/99 | 1000 |
| Text1 | 2/15/99 | 1500 |
| Text1 | 3/12/99 | 1800 |
| Text1 | 5/20/99 | 500 |
| Text2 | 3/12/99 | 2000 |
| Text2 | 3/12/99 | 3500 |
| Text2 | 3/12/99 | 3500 |
| Text2 | 4/10/99 | 2000 |
| Text2 | 6/8/99 | 1000 |

FIG. 46E

| B | A | C |
|---|---|---|
| 2/15/99 | Text1 | 1000 |
| 2/15/99 | Text1 | 1000 |
| 2/15/99 | Text1 | 1500 |
| 3/12/99 | Text1 | 1800 |
| 3/12/99 | Text2 | 2000 |
| 3/12/99 | Text2 | 3500 |
| 3/12/99 | Text2 | 3500 |
| 4/10/99 | Text2 | 2000 |
| 5/20/99 | Text1 | 500 |
| 6/8/99 | Text2 | 1000 |

FIG. 46F

| B | A | C |
|---|---|---|
| 2/15/99 | Text1 | 1500 |
| 2/15/99 | Text1 | 1000 |
| 2/15/99 | Text1 | 1000 |
| 3/12/99 | Text1 | 1800 |
| 3/12/99 | Text2 | 3500 |
| 3/12/99 | Text2 | 3500 |
| 3/12/99 | Text2 | 2000 |
| 4/10/99 | Text2 | 2000 |
| 5/20/99 | Text1 | 500 |
| 6/8/99 | Text2 | 1000 |

MECHANISM FOR SHARING OF INFORMATION ASSOCIATED WITH EVENTS

RELATED INFORMATION

This application is a continuation under 35 U.S.C. § 120 of U.S. patent application Ser. No. 16/384,873 filed Apr. 15, 2019; which is a continuation of Ser. No. 16/030,562 filed Jul. 9, 2018 (now U.S. Pat. No. 10,270,838 issued Apr. 23, 2019); which is a continuation of Ser. No. 15/803,371 filed Nov. 3, 2017 (now U.S. Pat. No. 10,033,792 issued Jul. 24, 2018); which is a continuation of Ser. No. 15/391,560 filed Dec. 27, 2016 (now U.S. Pat. No. 9,813,481 issued Nov. 7, 2017); which is a continuation of Ser. No. 14/958,433 filed Dec. 3, 2015 (now U.S. Pat. No 9,535,582 issued Jan. 3, 2017), which is a continuation of Ser. No. 13/154,316 filed Jun. 6, 2011 (now U.S. Pat. No. 9,208,469 issued Dec. 8, 2015), which is a continuation under 35 U.S.C. § 120 of U.S. patent application Ser. No. 11/746,547 filed May 9, 2007 (now U.S. Pat. No. 8,255,791 issued Aug. 28, 2012); which is a continuation of U.S. patent application Ser. No. 09/998,517 filed Nov. 29, 2001 (now U.S. Pat. No. 7,231,596 issued Jun. 12, 2007), which in turn claims priority to the following U.S. Provisional Applications: Provisional Application No. 60/250,035 filed Nov. 29, 2000, Provisional Application No. 60/259,488 filed Jan. 3, 2001, and Provisional Application No. 60/293,413 filed May 24, 2001. Each of these U.S. Patent Applications and U.S. Provisional Patent Applications is incorporated herein by reference as if fully set forth herein.

BACKGROUND OF THE INVENTION

The invention relates generally to methods and apparatus for providing scaleable, flexible, and interactive views of dynamically changing data stored in a cache, and more particularly, to a method and apparatus for flexibly interacting, controlling and collaborating, in real-time, the display of data stored at a remote location and provided for interactive display over a network or locally.

The invention relates to many Web-based applications and as one example, to financial fields, such as financial portfolio and market data applications. In particular, in order to function effectively, users need the proper tools to research, monitor, and analyze portfolio and market information, and to communicate with one another, with customers and with suppliers. Existing software systems currently provide only partial solutions to these needs. These systems do not provide a flexible, outsourced, real-time, collaborative, Web-based total solution. It is further important for these professionals to have real-time tools which enable up-to-date data to be effectively displayed, manipulated and shared in order to allow fully informed and current decisions to be undertaken. Flexibility in user presentation can also be important to understanding the data and the relationship between different data points and entities.

BRIEF DESCRIPTION OF DRAWINGS

The present invention is illustrated by way of example, and not by way of limitation, in the figures of the accompanying drawings. Other features and advantages of the invention will be apparent from the following drawings, taken together with the description of the invention, in which:

FIG. 4 is a second screen shot illustrating a tabular presentation of data in accordance with the invention;

FIG. 8B is a fourth screen shot illustrating the next step in modifying or canceling a selected trade;

FIG. 9 is a confirmation screen shot for modifying the selected trade;

FIG. 10 is a screen shot of a tabular presentation enabling the user to modify a selected trade;

FIG. 12 is a screen shot illustrating a tabular presentation of data as a result of "drill down" of the country aggregation illustrated in FIG. 11;

FIGS. 15-19 are screen shots illustrating column operations according to one aspect of the invention;

FIGS. 20A-20D represent a diagram of application display operations, allowing to hide and reveal different areas in the application display;

FIGS. 25 A-C are diagrams showing moving a column in an HTML based shared application;

FIGS. 26 A-C are diagrams showing moving a column in a client-based shared application;

FIGS. 31-1 and 31-2 are a flowchart illustrating a connection to the shared application;

FIG. 38 is a flowchart illustrating the process of sharing media messages in the system;

FIGS. 39A-B illustrate flowchart of the process of saving and subsequently restoring views for further interaction;

FIGS. 40A-E are diagrams showing dynamic basic aggregation of a table;

FIGS. 41A-C are diagrams showing dynamic parameterized aggregation of a table;

FIGS. 42A-C are diagrams showing dynamic filtering of a table;

FIGS. 45A-H are diagrams showing various column charting operations;

FIGS. 46A-F are diagrams showing multi-column sort operations;

FIGS. 48-1 and 48-2 are a flowchart illustrating the MatrixClick methodology;

DESCRIPTION OF PARTICULAR
EMBODIMENTS

Overall Architecture

Figure 1:
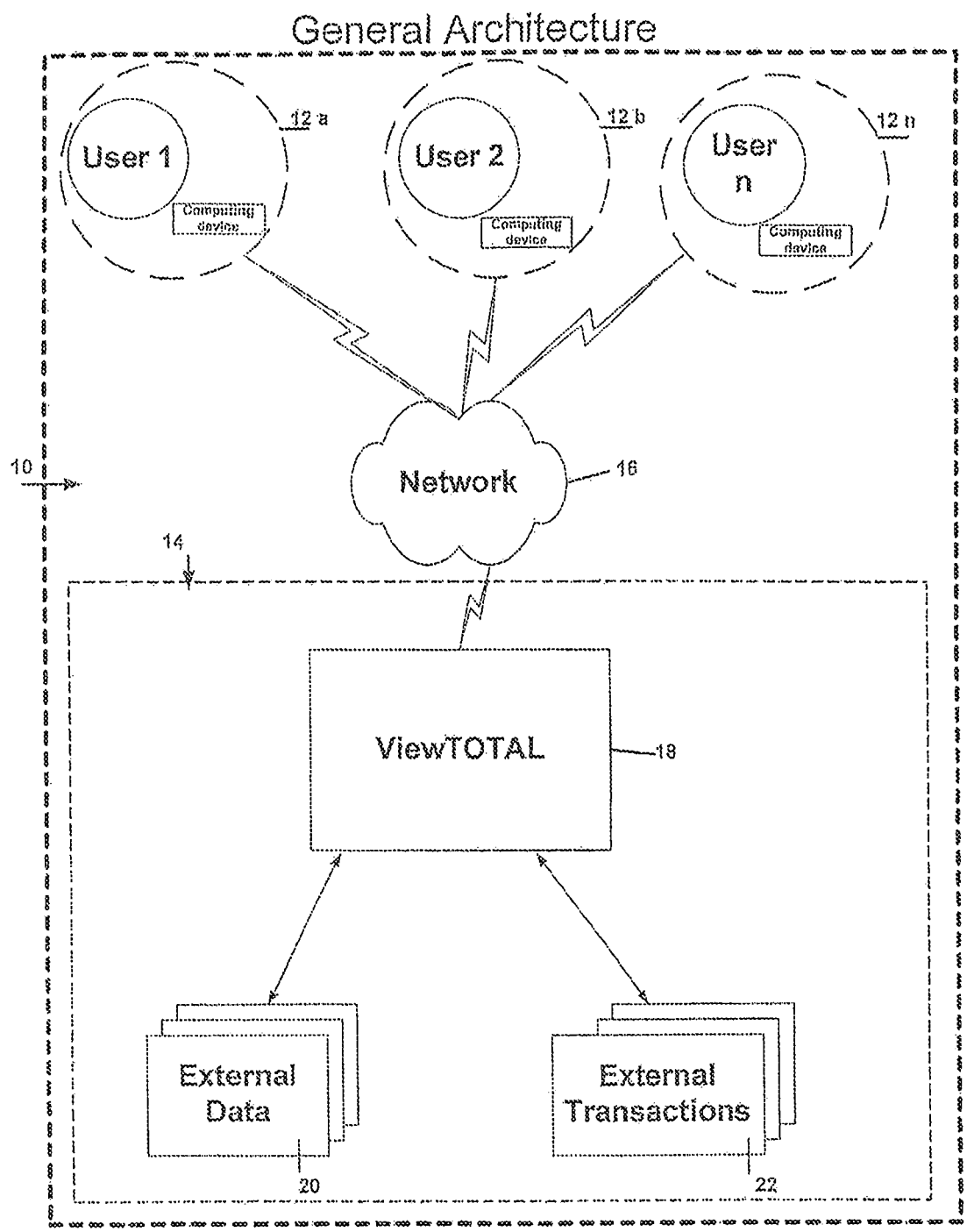
FIG. 1 is a general architectural description in accordance with the invention.

Referring to FIG. 1, according to the invention, a general architecture of the system 10 includes a plurality of users 12a, ... 12n connecting to the display generation system 14 over a communication network 16, here the Internet. The users 12 typically employ computing devices having a CPU, memory, storage, display, input devices, networking devices, etc., for communications with network 16. Other networks can include, for example an intranet or wireless network, local or with area networks, other public networks, etc. While other networks can be employed, the ubiquitous nature of the Internet, and the ability to connect to it make it an ideal communications medium with which to provide user access to the interactive display generation system 14. The display generation system 14 has a data processing, acquisition, and caching system 18 (here designated View-TOTAL), which obtains; data from external data sources 20 and which further obtains transactional information from external transaction data sources 22. The users obtain, with this architecture, in accordance with the invention, a flexible, scaleable, real-time, interactive and collaborative view of configured data from the system 18 as described in more detail below.

Each of the computing devices is interconnected by a network. For simplicity, it is presumed that the network is a Transmission Control Protocol/Internet Protocol (TCP/IP) network. However, other networking protocols such as the Internet Control Message Protocol (ICMP) extension to TCP/IP, Internetwork Packet eXchange (IPX), Sequenced Packet Exchange (SPX), AppleTalk, or the like can also be used. The network may be a single physical link, or a logical structure crafted from a combination of physical and non-physical data pathways (e.g., analog or digital dialup connections, satellite links, etc.).

In one embodiment, the system employs the combination of web-client software on each user computing device and web server software on the server. For example, the users can utilize web browsers and receive active HTML content (or JavaScript, Java, JScript, Active Server Page (ASP) files, ActiveX, Visual Basic, and the like) to interact with the server; and the web server can be an Apache web server or a Microsoft Internet Information Server.

When the system uses a web server, it is expected that Hypertext Markup Language (HTML) tags (or the equivalent) are used to cause transfer of pages to the client. (HTML is a document format based on the Standard Generalized Markup Language (SMGL) that uses "tags" to flag formatting, structure, data access, etc.)

Figure 2:
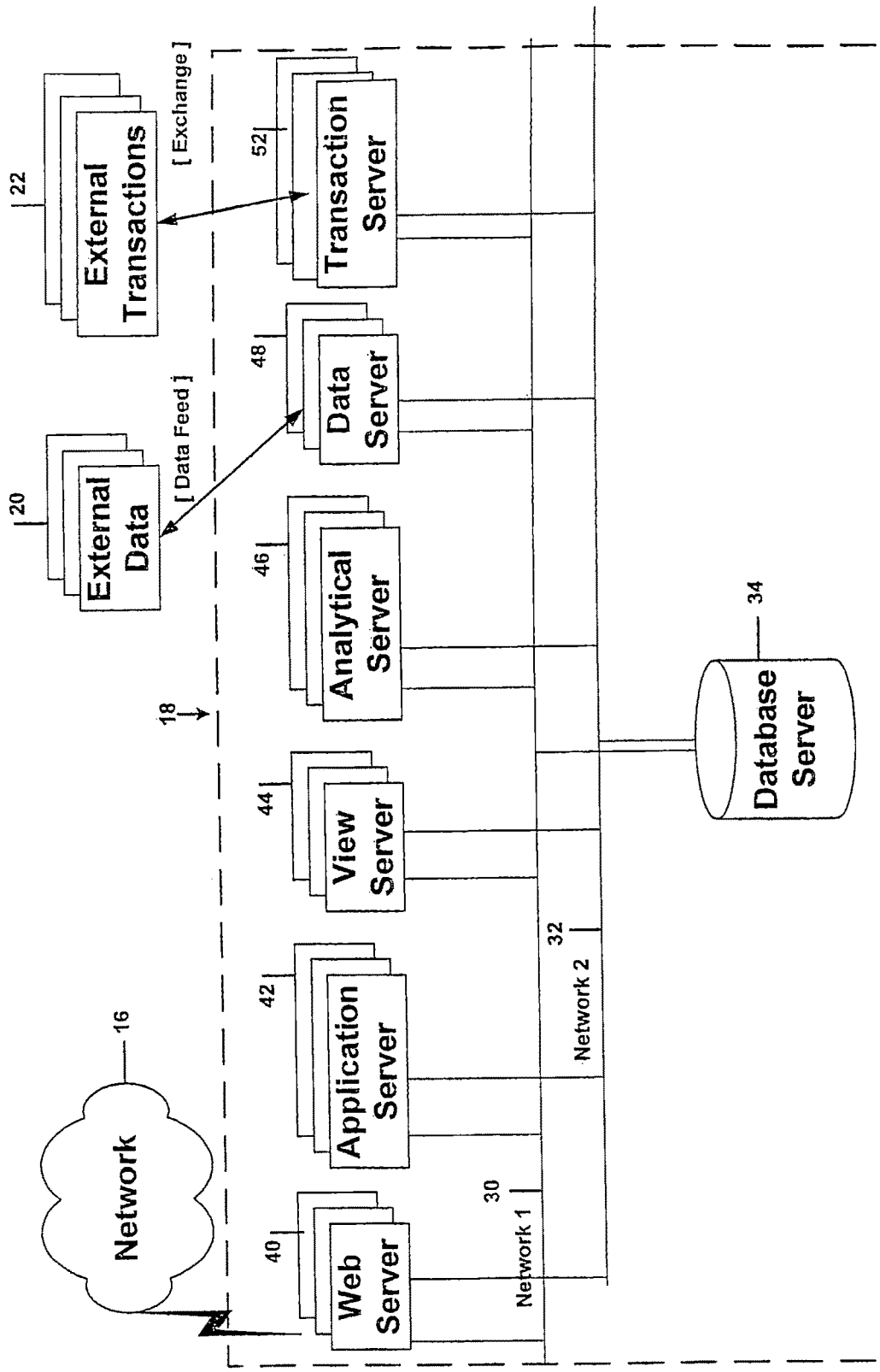
FIG. 2 is a more detailed description of the server architecture in accordance with the invention.

The system 18, referring to FIG. 2, has, in the illustrated embodiment a plurality of independent servers, having their own operating systems, connected to communication networks, for example, private networks 30, 32, and which also connect to a database source 34 which can be either a mass storage system having its own operating system and third party database software, individual disk drives and a controller, or some other form of storage. The plurality of servers, and the private networks 30 and 32, enable the system 18 to be resilient in the case of failure of one of the networks, and enable, as will be seen below, redundancy at the server level.

Other configurations of servers and networks can also be used. The various servers noted above are in essence a set of object-oriented modules that can be implemented in variety of ways such as an operating system process, a thread in an operating system process, or a module in an operating system process, on one or multiple computers. There can be as a little as one instance of each server, or as many as needed system wide. Such a system is usable with one network, or even without the network if the whole system is running on one computing device, but multiple networks can be deployed for the purpose of redundancy.

The distinction between the "servers" are functional, and a variety of server hybrids can be assembled to fit particular needs or circumstances. In general DataServer deals with data gathering, AnalyticalServer deals with computations, TransactionServer deals with transactions and ViewServer deals with keeping displayed views. The servers typically cache the data in memory, therefore allowing quick access to their "clients" to the cached data. The ViewTOTAL can be assembled from any variety of combinations of the servers described above, while also having ApplicationServers for page generations and web servers for communicating with the users over the network. Indeed, it is also possible to have all of the ViewTOTAL functionality implemented on a single server system rather than multiple smaller systems.

Figure 23A:
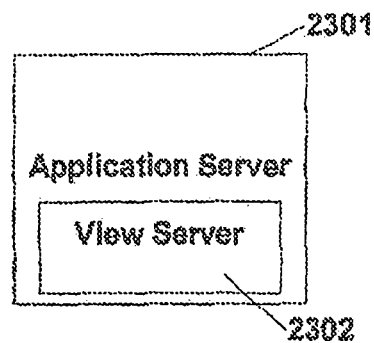
FIG. 23A is a diagram of ViewServer implemented as a part of an ApplicationServer.
Figure 23B:
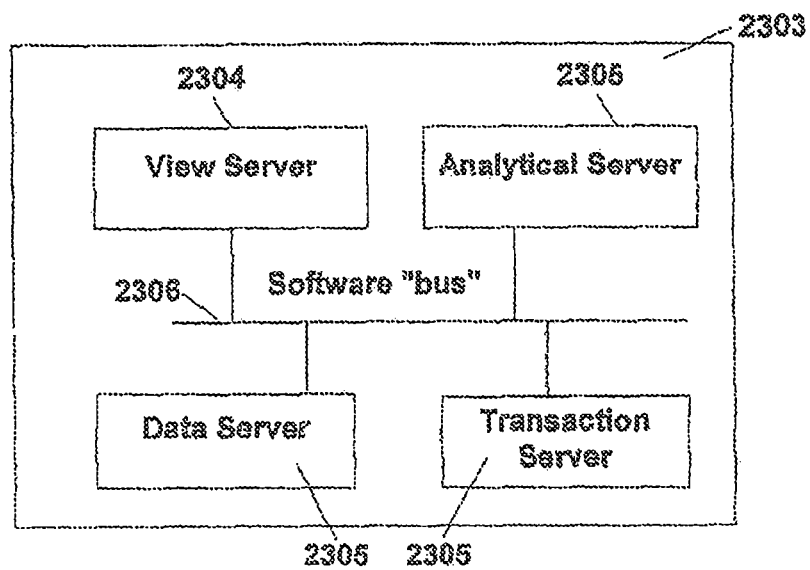
FIG. 23B is a diagram of ViewServer, AnalyticalServer, DataServer and transaction server implemented together as a part of module/thread/process.
Figure 23C:
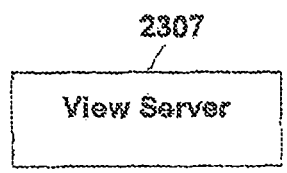
FIG. 23C is a diagram of ViewServer implemented as an operating system process.

For example, ViewServer can be implemented as an operating system process 2307 in FIG. 23C, or as a thread/module 2302 within an ApplicationServer process 2301 in FIG. 23A, or combined as a thread/module 2304 within one process 2303 with additional "servers" 2305, and communicating over a software "bus" 2306 as illustrated in FIG. 23B.

In particular, the illustrated system 18 includes one or more web servers 40, one or more ApplicationServers 42, one or more ViewServers 44, one or more AnalyticalServers 46, one or more DataServers 48 which can receive data from external data sources 20, and one or more transaction servers 52 which can receive external transactions from any of plurality of sources, such as external transaction sources 22, user input, uploaded data (such as through FTP or the Web), as well as other sources.

The system architecture enables provision of real-time shared views with the capability of interacting and manipulating application displays bi-directionally between systems connected through a Web to Web connection, a Web to local program connection, and a local program to Web connection, as well as a local program to local program connection through the Web.

Figure 7:
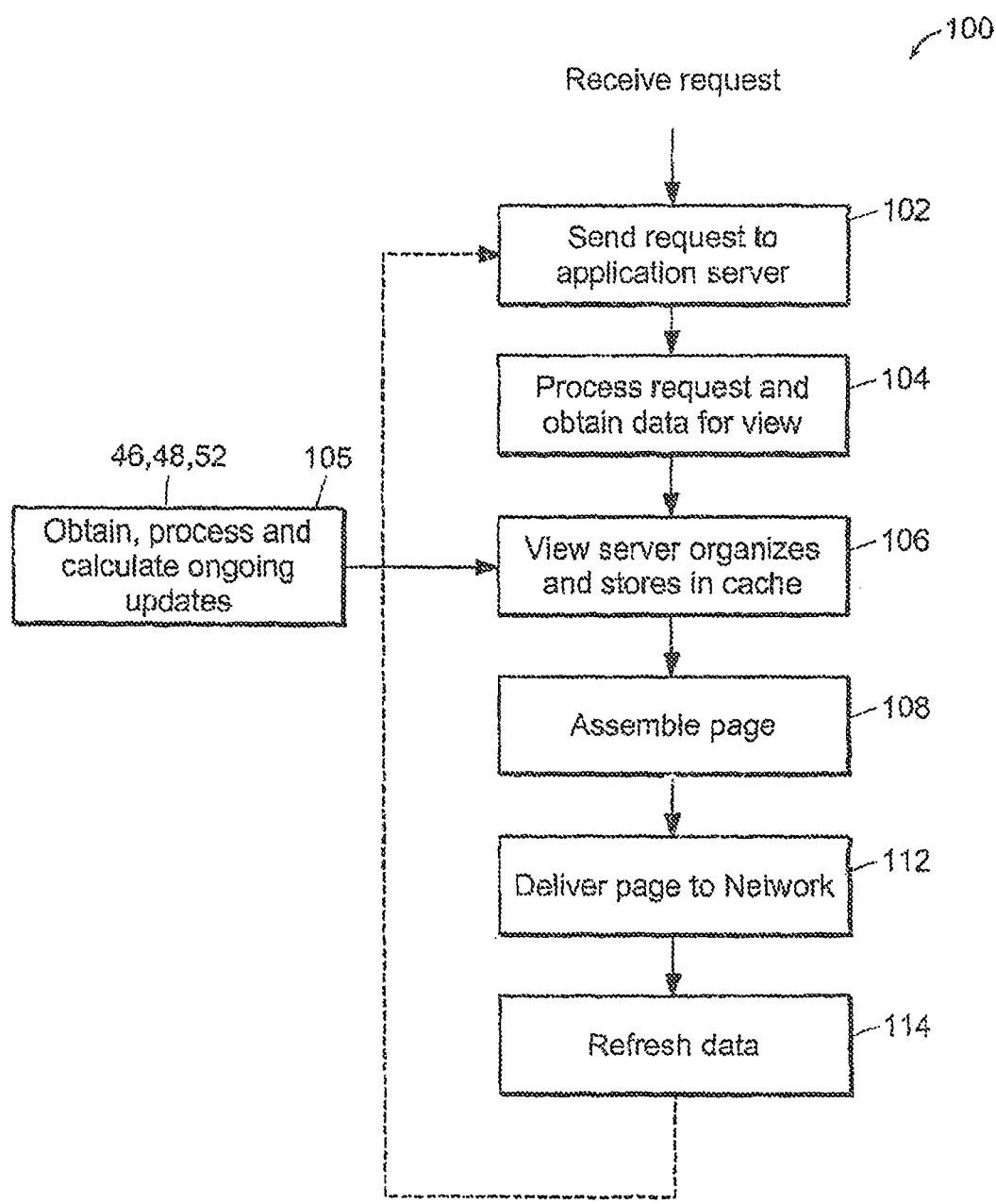
FIG. 7 is a flow chart describing the general operation in accordance with the operating method of the invention.

In operation, referring to FIG. 7, the system 18 receives a request at 100 from the network 16 at the web server 40. The web server receives the typically html page request and sends, at 102, the request to the ApplicationServer 42 typically over one of the networks 30, 32. The ViewServers subscribe to updates from DataServer 48, transaction server 52, and Analytical Server 46 as well as using data from the database server 34.

The Analytical Server 46 asynchronously takes the information, processes, etc. and "calculates" the necessary data at 105, and delivers the data necessary for assembling the page (at 106) which will be organized and stored by the ViewServer in its cache (step 106) returned to the user over the networks 30, 32 through the ViewServer 44.

The Analytical Server 46 asynchronously takes the information, processes, etc. and "calculates" the necessary data at 105. It publishes the resulting data over the networks 30, 32. ViewServer receives the data to which it subscribed, and organizes and stores the data in its cache (step 106). The ApplicationServer assembles the page from the ViewServer data (at 108) and the page is returned to the user over the networks 30, 32 through the web server 40 at 112.

Figure 21:
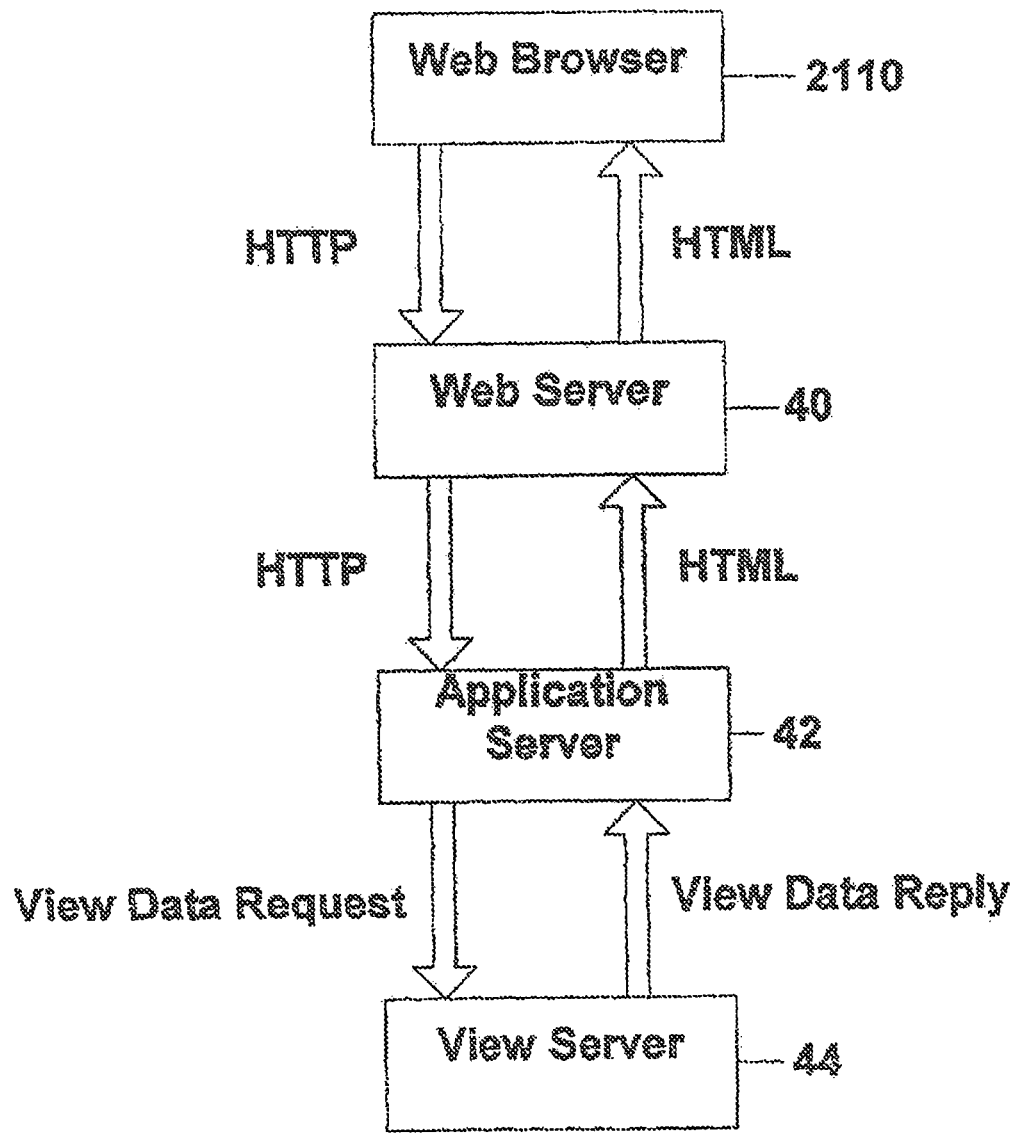
FIG. 21 is a diagram of an HTML based application.

The Analytical Server recalculates only the changes in the received data, and the interval for recalculation is configurable, in the illustrated embodiment. Thus, for example, when the Analytical Server operates in a "HotCache" mode, it recalculates everything in real-time; when it operates in a "WarmCache" mode, it recalculates in the timeout period; and when it operates in a "ColdCache" mode, it recalculates only when requested. It is the user decision or an automated priority configuration system which decides which mode of operation to use. The DataServer receives data updates from subscribed data sources. Once received, the DataServer sends the data to its own subscribers and keeps a copy in its memory. The transaction server loads transactions from available sources, aggregates them, and keeps them in memory. It also subscribes to new transactions, modifications and cancellations and notifies its subscribers of the "updates" in stored data. The ViewServer subscribes to updates of the combination of data, analytics, and transactions, and when the information is received, it organizes and stores it in cache. The information that ViewServer subscribes to is either configurable globally (same information for all the users) or configurable as a per-user or per access identifier (see below). These and other configurations are kept by the system in a configuration database. Referring to FIG. 21, in the case of HTML-based applications, the ViewServer 44 operates in a request-reply mode—it receives update requests from the user application (for example a web browser 2110) on the client side and will automatically return an updated version of the web data or "view" through the ApplicationServer 42 and web server 40.

Figure 22:
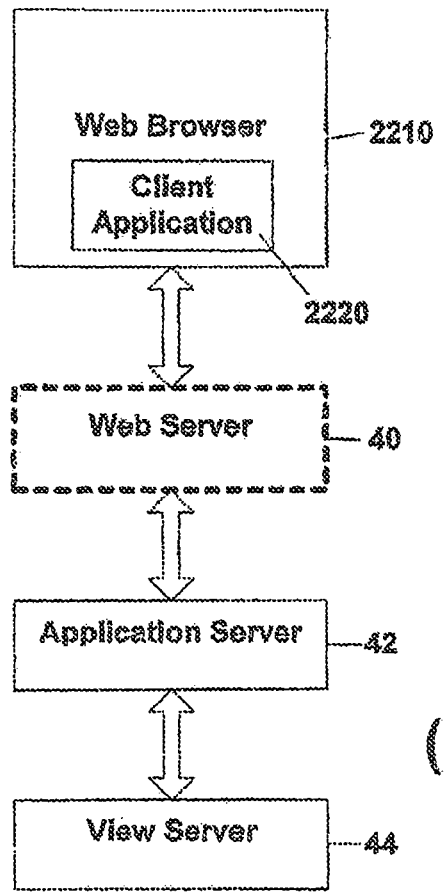
FIG. 22 is a diagram of a browser based client application.

Referring to FIG. 22, in the case of a client-based application, the ViewServer 44 can operate either in a request—reply mode or in a publish-subscribe mode. In the publish-subscribe mode, client-based application 2210 subscribes to receive updates through its associated web browser, and the ViewServer 44 publishes the updates through the ApplicationServer 42 (since the client is, for example Java based, the web server 40 may not needed). While commonly using the HTTP protocol to communicate with the client through the web server and/or ApplicationServer, ViewServer can do it through other apparatus, without using the web server and/or the ApplicationServer. For example, it can be performed by having communication adapters in both ViewServer and the client program that use a common communication protocol.

Figure 22A:
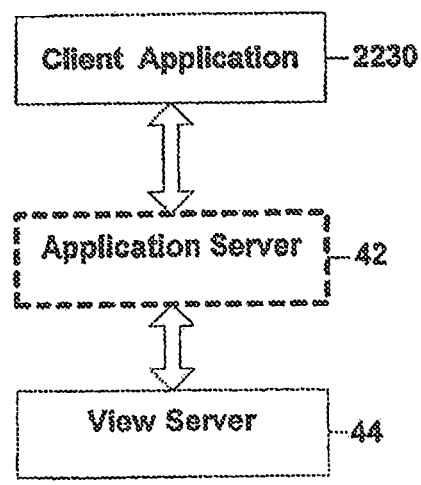
FIG. 22A is a diagram of a local client application.

In any instance, the invention described herein is not dependent upon the client program or how the client and server connect. In fact, referring to FIG. 22A, for a local client application, the locally based application may communicate directly with the ViewServer rather than processing through the ApplicationServer 42.

In the case of a local client-based application, the ViewServer may be implemented as that application. The ViewServer keeps information in its cache memory 70 specifically for speeding the access to the displayed data (at the user's display). When update occurs, the data status, on a cell by cell basis, can be displayed to the user using a color scheme customized for each user. Further, in appropriate circumstances, the ViewServer can communicate directly with the local client-based application.

Figure 3:
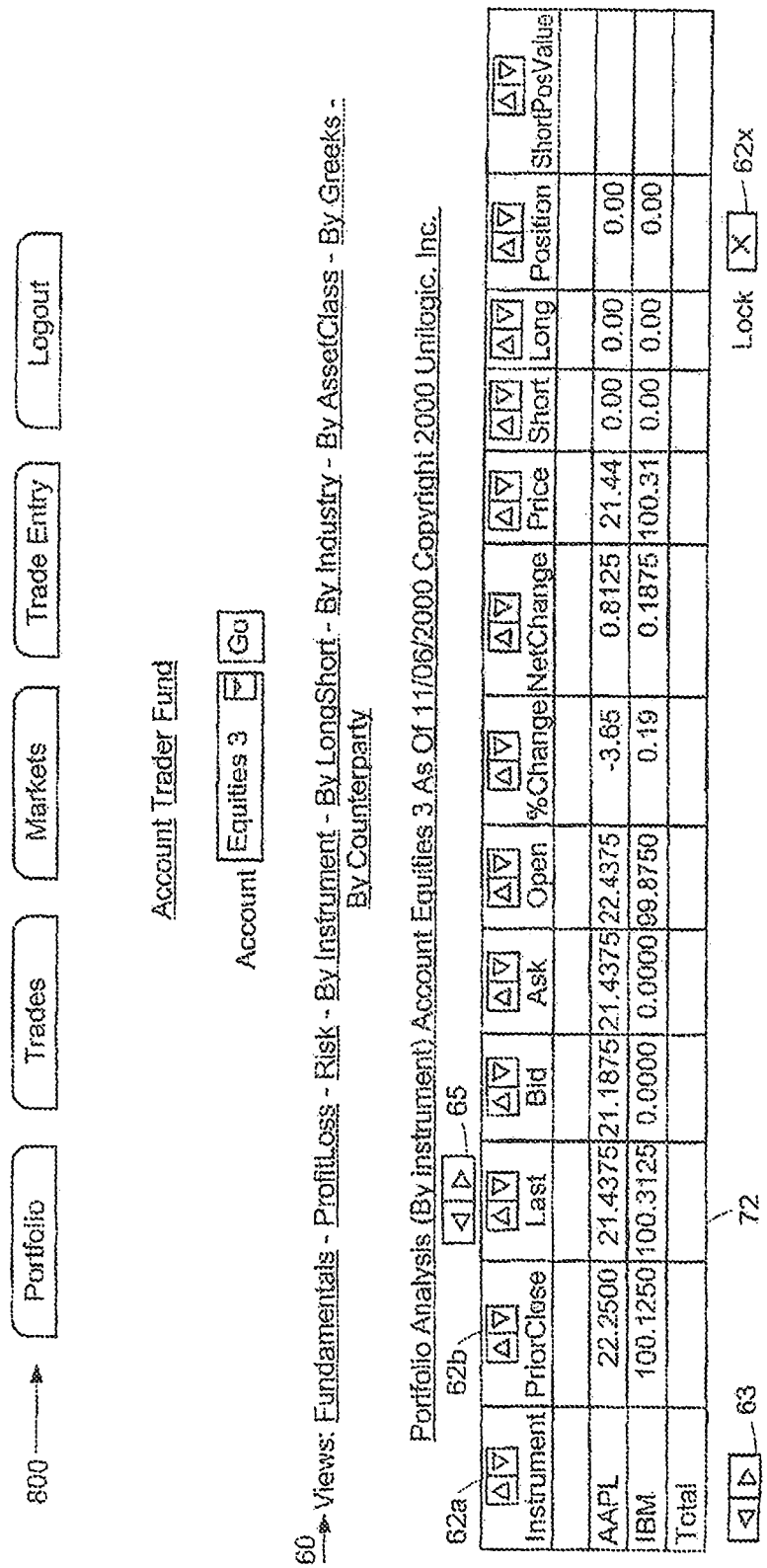
FIG. 3 is a first screen shot illustrating, a tabular view of data in accordance with the invention.

Referring to FIG. 7 again, some of the data processing at 106 can result from a user request, for example, a data override request, while other of the data can be automatically processed at 106 as a result of the addition of new data obtained by the DataServer 48 or the transaction server 52. A client program can provide an automatic update using publish-subscribe paradigm, while HTML provides the data on request. The ViewServer organizes its cache 70 by displayed views of the application, from which it can then be passed, through the ApplicationServer where the web page is assembled at 108, to the web server, for delivery at 112 over the network 16 and then to a user 12. Such an organization of data greatly simplifies the page creation by the ApplicationServer, which serves as a mere "formatter" of the data that is already organized for viewing. Referring to FIG. 3, the data can be presented in a typical tabular format as illustrated by the screen shot of FIG. 3. This shows the data from two instruments being presented, in real time, to the user. The user can, as noted in the "Views" line 60, enable various views to be provided. Clicking on any of these elements will request from the system 18 a new view. The view is automatically refreshed, as noted above, at 114.

Figure 27:
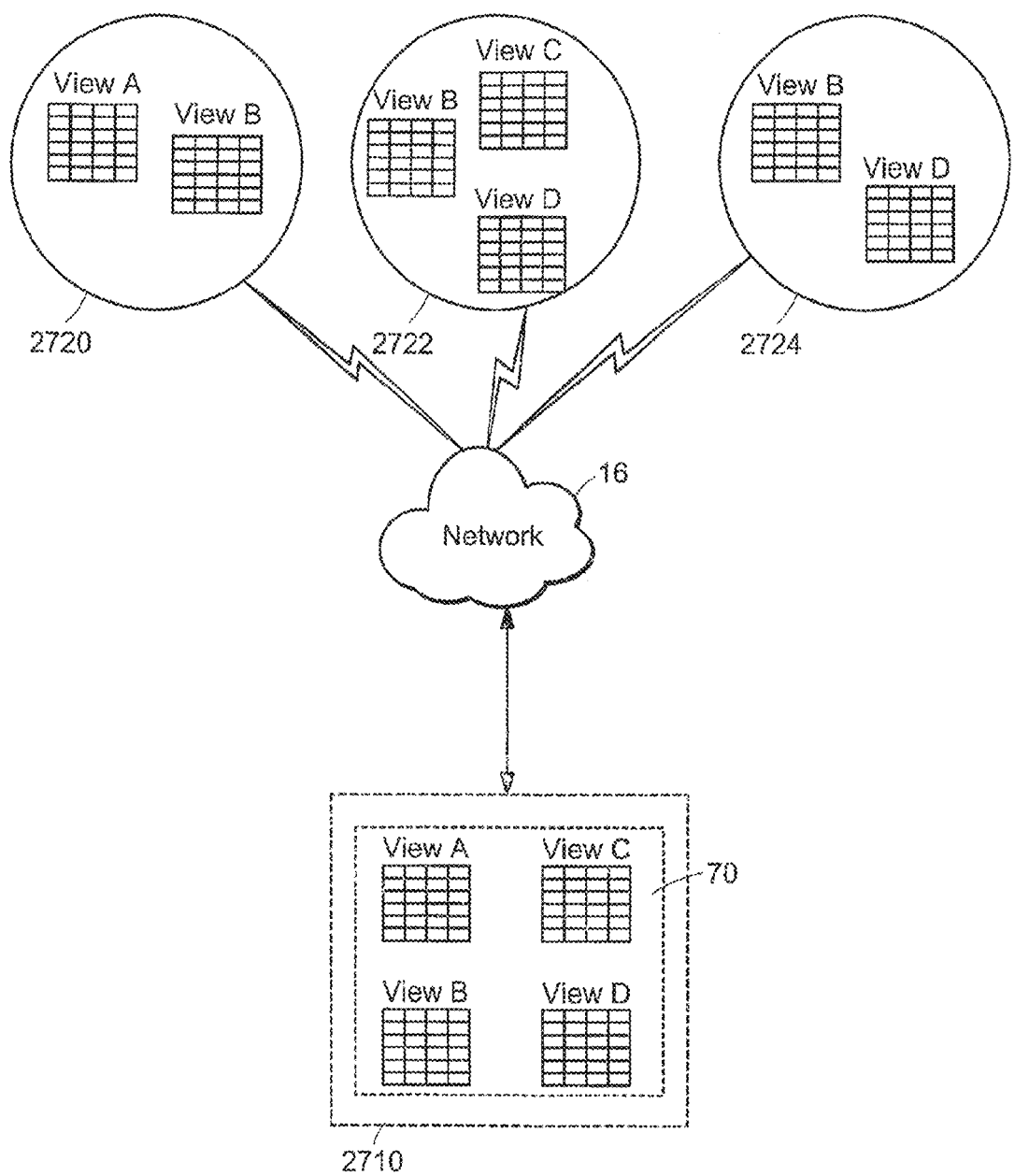
FIG. 27 is a diagram showing the display of different subsets of shared application functionality at the same time.

The ViewServers 44 each have their own cache 70 so that when requesting a currently used data view, it can be obtained without having to perform any further analysis or obtain any further information, again, from the database source 34. In a preferred embodiment, the table view, such as that illustrated in FIG. 3 is efficiently updated by subscribing to and receiving only changed data from relevant published data sources. In the illustrated particular embodiment of the invention, the cache 70 is organized in terms of user requested data views, as illustrated in FIG. 27.

Figure 20A:
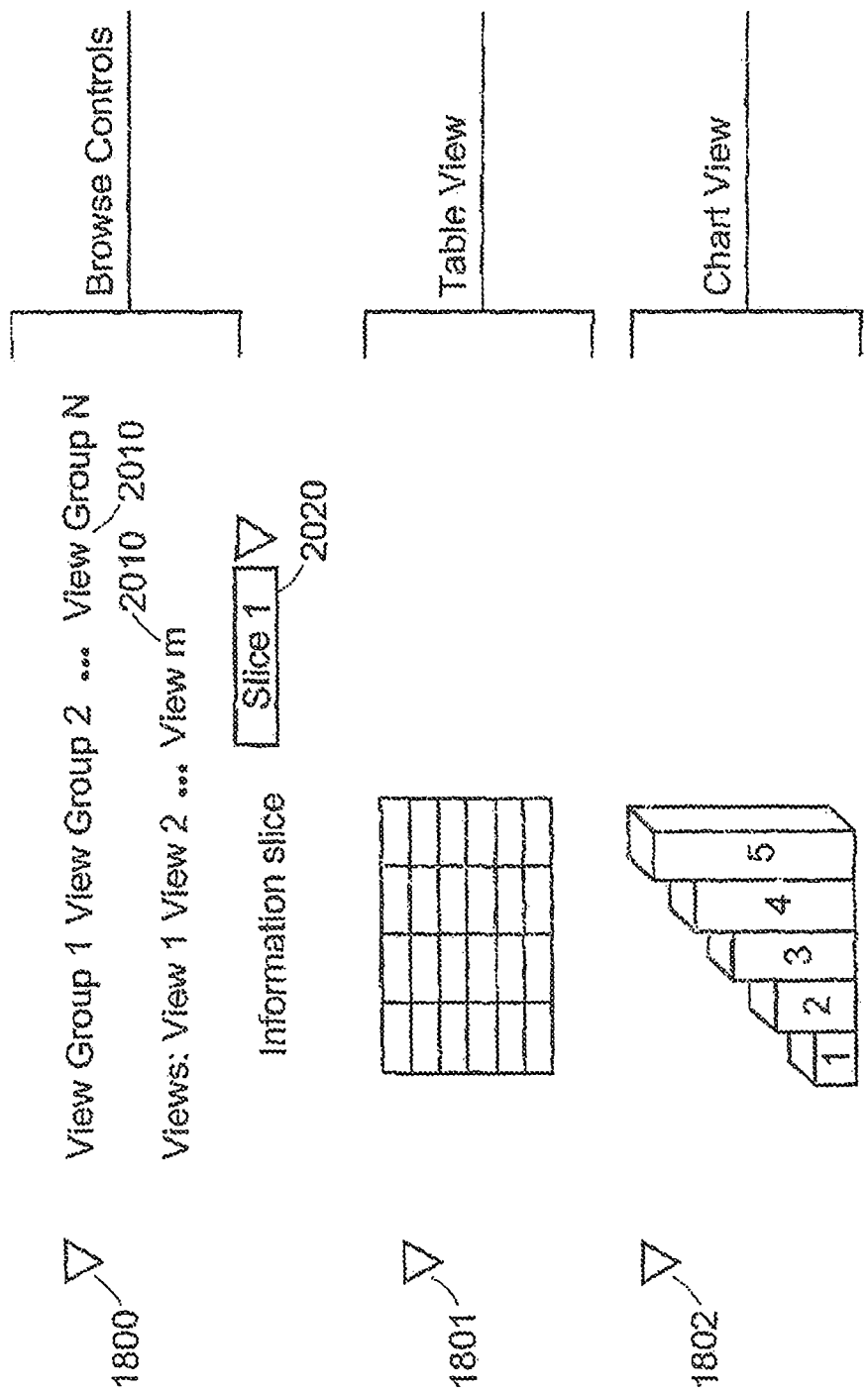

According to the described embodiments, an application display is the display from the application which can be, for example, a Graphical User Interface (GUI) window or an HTML page. Each instance of the application display can have application controls including navigation controls 2010, information slice controls 2020 (See for example FIG. 20A), and a plurality of views such as table 80, graph 82, chart 84, news 86, alert 88, message 90 etc. (See for example FIG. 6). Each application can have one or more application displays as illustrated in FIG. 8A, 8B, 10, 11 and 12.

In a preferred embodiment of the invention, ViewServer will keep a version identifier for each of its views. The view version identifier will separately keep data changes and presentation changes. The ApplicationServer will keep the version identifier of its views as well and will compare its version of a requested view with the version kept in the ViewServer. For each data or presentation change, the view associated version identifier will be updated. If the version identifier for particular view(s) in the ViewServer did not change since the last view request by the application, the ApplicationServer can return its cached page for this view(s) without needing to reassemble the page.

In addition, referring to FIGS. 39A and 39B, views (one or multiple) can be saved at 3901 (for example as reports) and stored by the system at 3902. Later, the original or another user with access rights can access the saved view(s) at 3903. The system loads the saved views into ViewTOTAL, at 3904, and in particular, according to this embodiment of the invention, saved views need to be loaded by a DataServer while updating the AnalyticalServer and the user can interact with them, as well as share them with other users at 3905.

Sharing Mechanism

The system enables sharing information among a group of users communicating through a network, in a way that allows the users to share the application look, feel, interaction and data, in whole or in part.

Figure 24A:
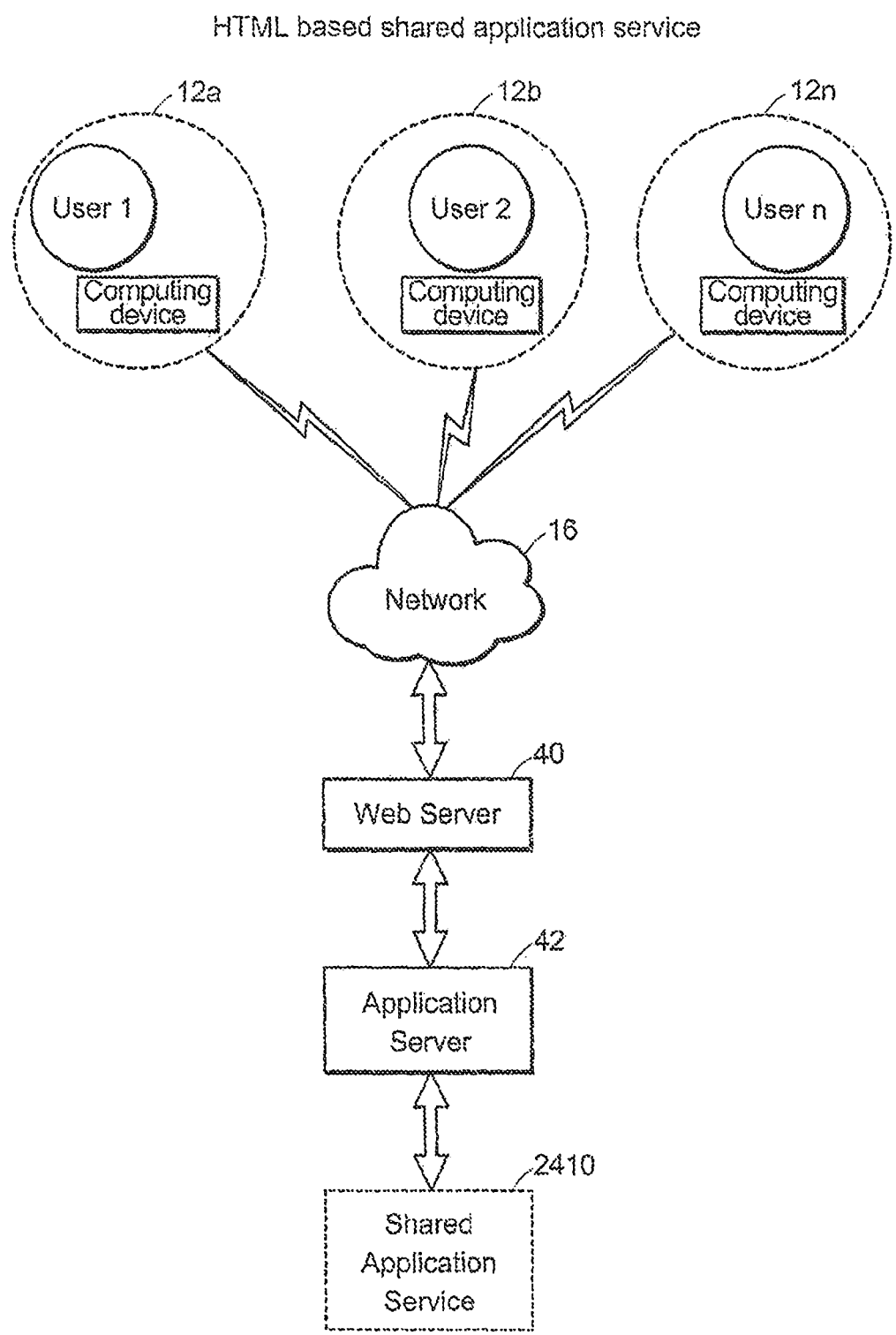
FIG. 24A is a diagram of an HTML based shared application.
Figure 24B:
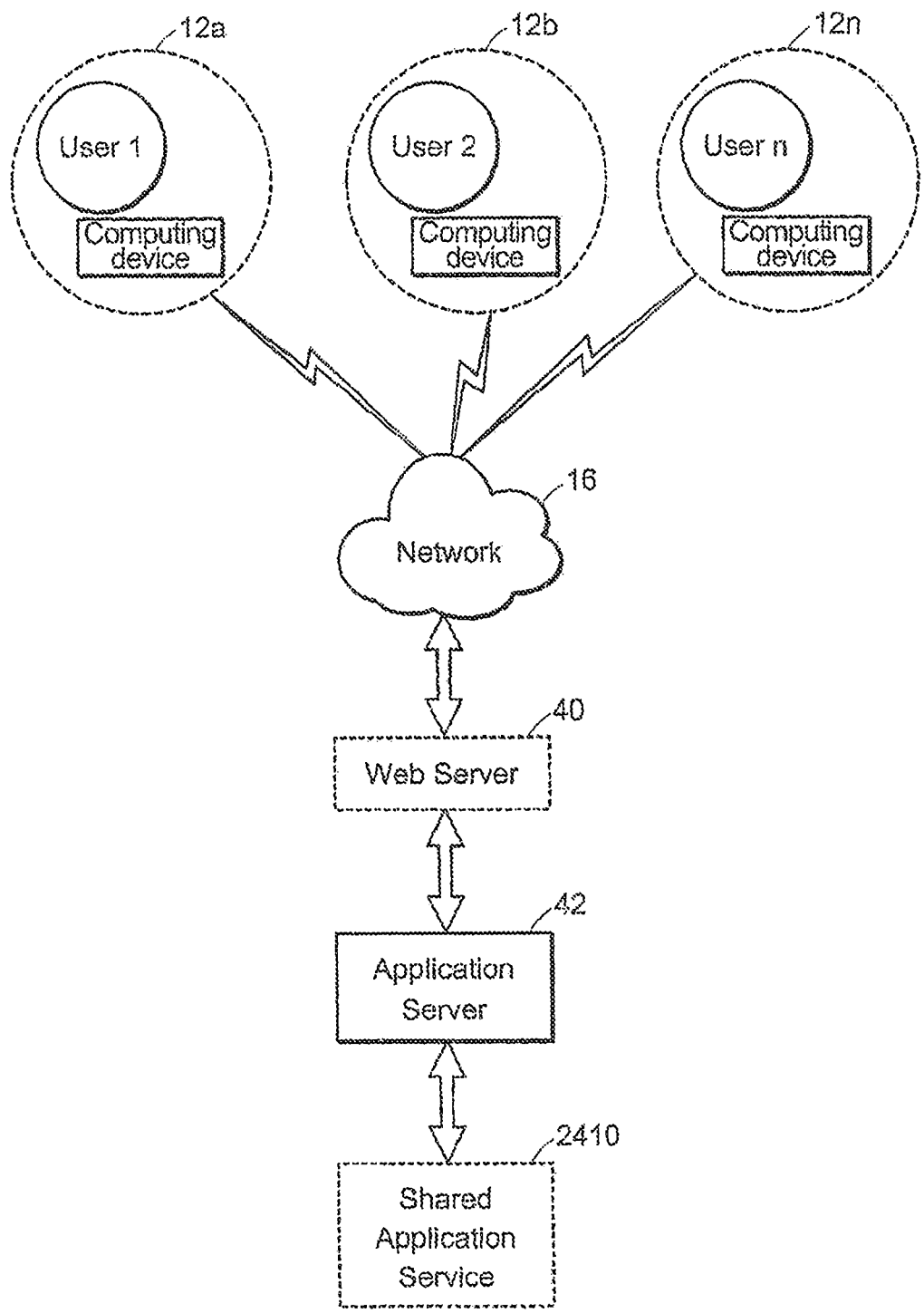
FIG. 24B is a diagram of a browser based client shared application.
Figure 24C:
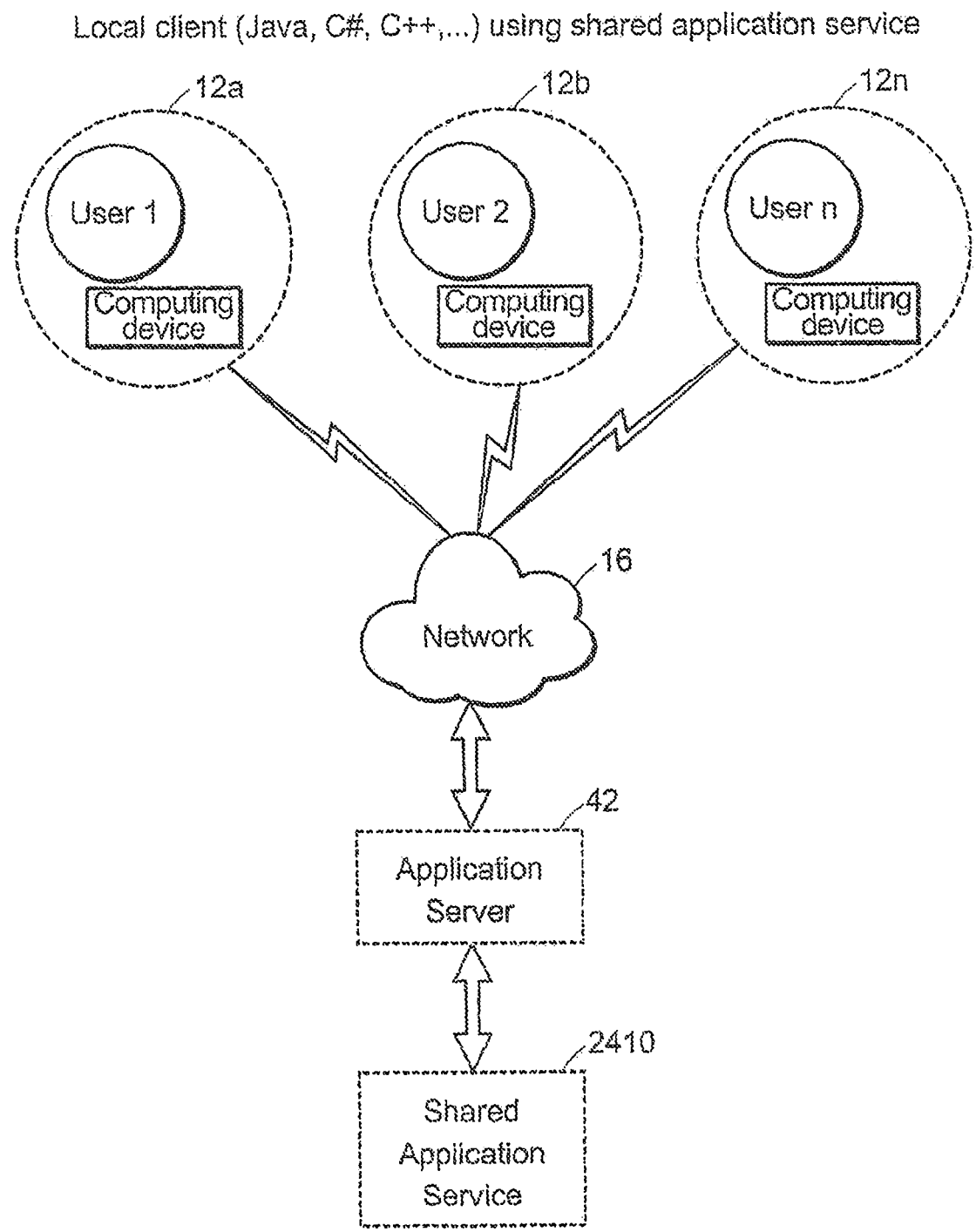
FIG. 24C is a diagram of a local client shared application.

In a particular preferred implementation, according to this aspect of the invention, the system architecture provides shared application displays with a capability of interacting and manipulating such application displays bi-directionally between systems connected through a network. The system implements bi-directional communication between user applications and shared application service 2410 as illustrated in FIG. 24A for HTML based application, in FIG. 24B for a browser client based application, and in FIG. 24C for a local client.

For a client based program like a Java applet, the web server 40 is needed to download its code, but it does not necessarily use a web server, or even an application server 42 for communication. Furthermore, for a local client, even the application server 42 may not be needed.

The shared application service can be for example an operating system process, an operating system thread, or a module within the process/thread. The shared application service can reside on a "server" or it can be downloaded from application storage 3304, in whole or in part to the client, and can be further shared with other users using architecture illustrated in FIG. 33. One shared application can have multiple services and can serve multiple user groups simultaneously. Users can join and leave the sharing group at any time.

There are a number of sharing modes that can be employed, either individually or in combination by a system. A data sharing mode refers to sharing a common set of data, so that when data changes are made by one of the users, or the shared application service data is updated through its internal computations or application external data sources, the change is reflected in the shared application service and will be seen by all other users of the application service when they view any such affected display or displays.

Figures 1, 31:
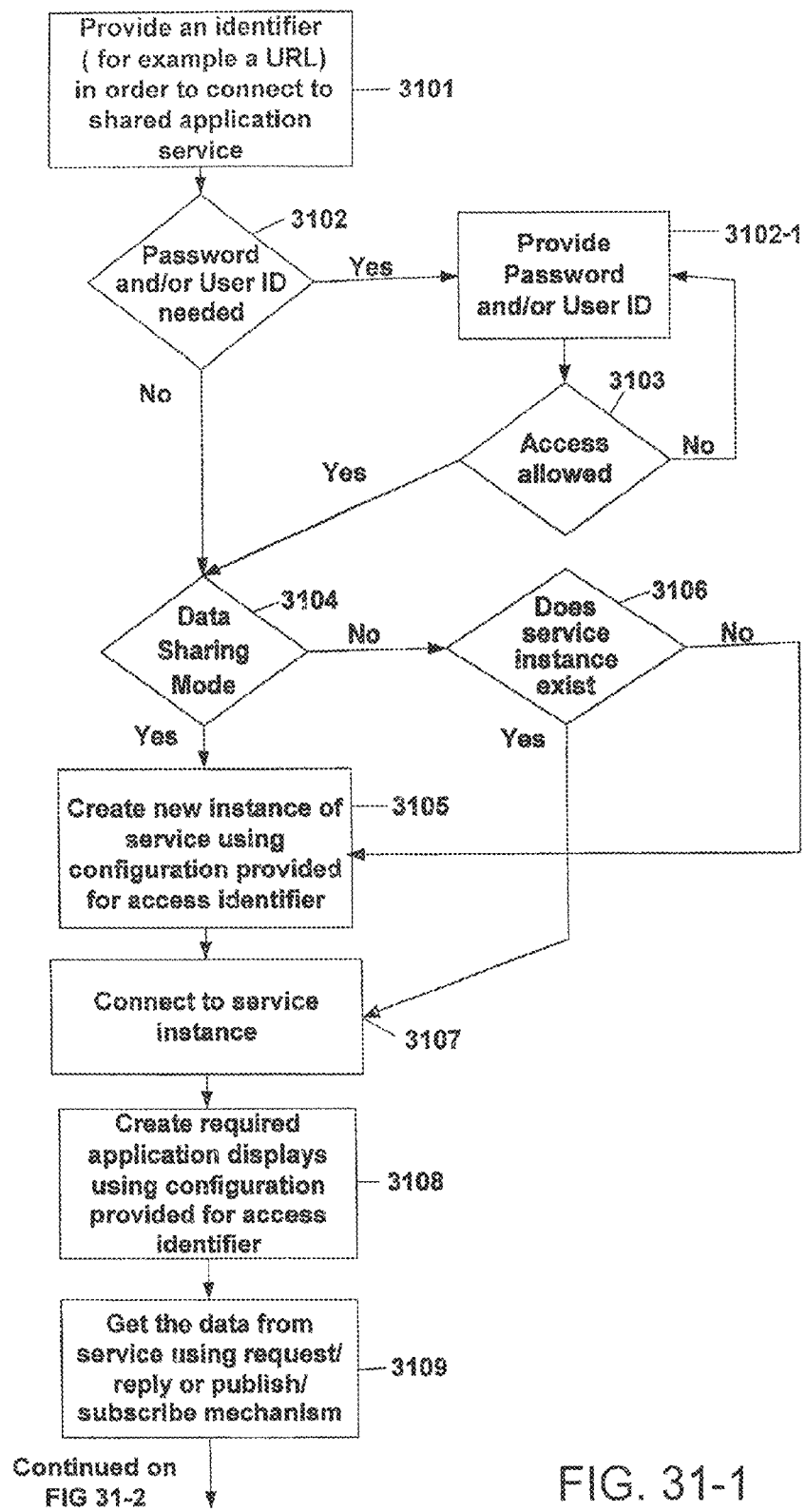
Figures 2, 31:
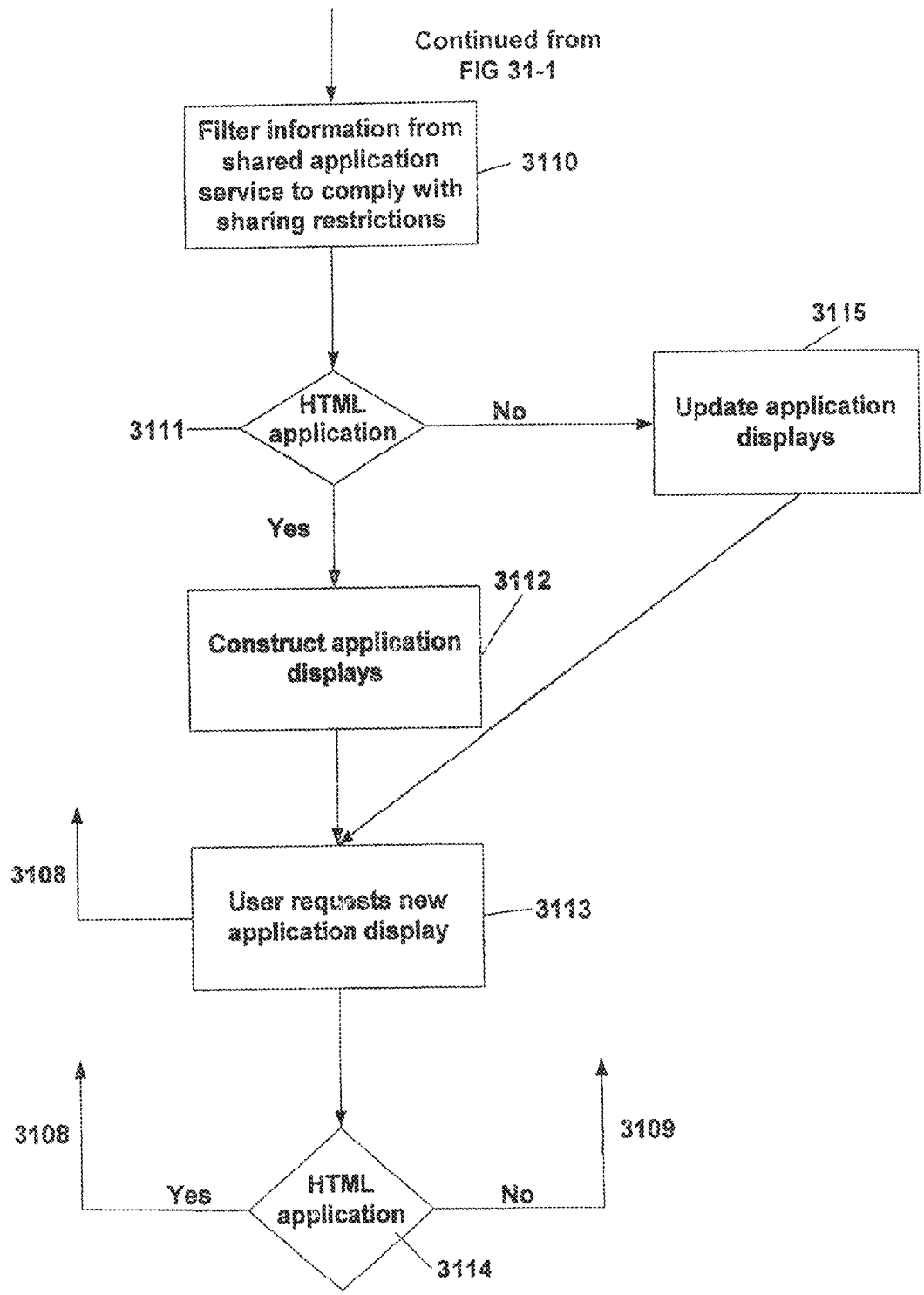

Data sharing allows an independent arrangement of shared data to be viewed by each user. For example, moving a column in a data sharing arrangement will not affect the shared application service or other user views, but an update of underlying shared data will. Typically in the case of data sharing, the system will create a new application service instance for each new user, as illustrated in FIG. 31.

View sharing refers to the way applications look, feel, and interact, and are shared among the users, so if, for example, a column is moved in a shared view, the column will be moved in the shared application and each other users' applications.

Figure 30A:
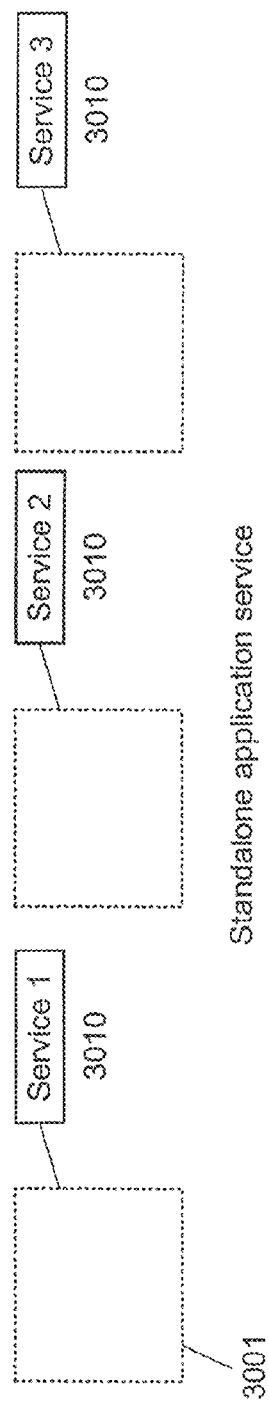
FIG. 30A is a diagram of standalone shared applications.
Figure 30B:
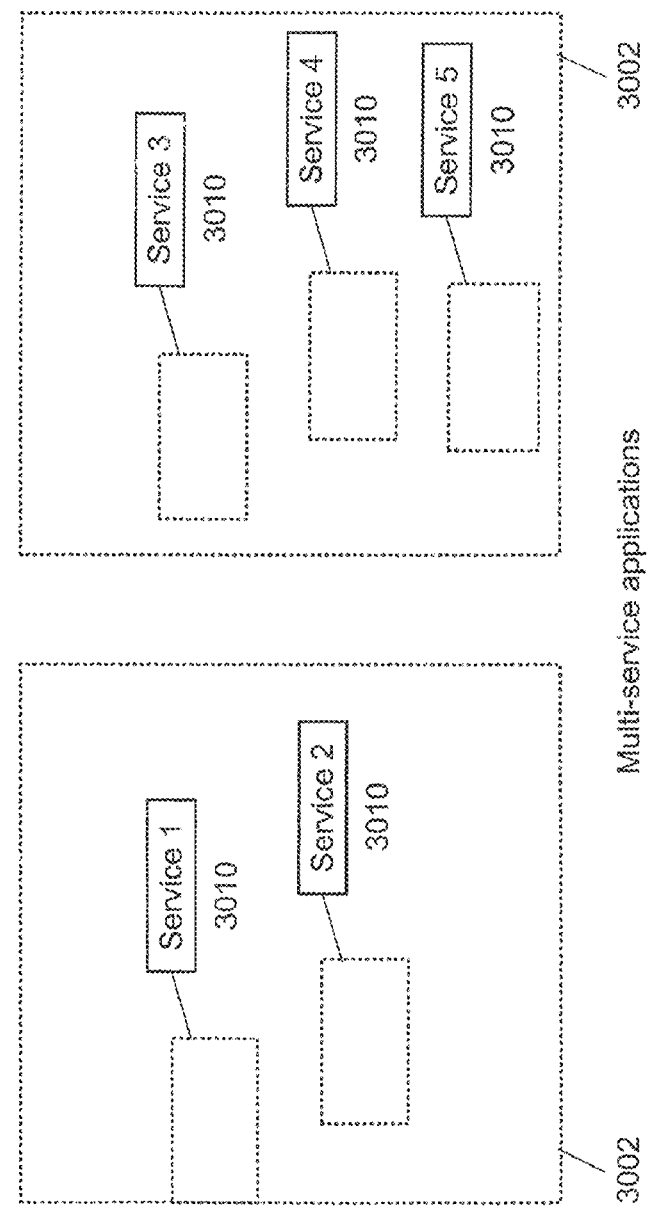
FIG. 30B is a diagram of multi-service shared applications.

Typically, there is only one shared application service instance in the view sharing mode, even if there are multiple users authorized to access this particular service. Referring to FIG. 30A, a shared application service can be implemented as a standalone application 3001 instantiated for each user (or user group in the case of identical sharing within a group) or, referring to FIG. 30B, a multi-service application 3002 that provides configurable application functionality to each user (or user group in case of identical sharing within a group). Each instance of application service (either shared or not) has a unique global identifier 3010 which is used to by other system components, such as an ApplicationServer, to address the service.

A particular embodiment of such a shared application implementation according to the invention, is a ViewServer, which provides information view services to the user applications. The ViewServer organization of its cache, in terms of application views, enables sharing of application displays among multiple users. When a view in a ViewServer changes as a result of an information update or user manipulation, all the users that share this view in a view sharing mode, will receive a new updated view (either in real-time or at the next display refresh). The users that share in a data sharing mode will receive updates only in the case of an information update.

Figure 44A:
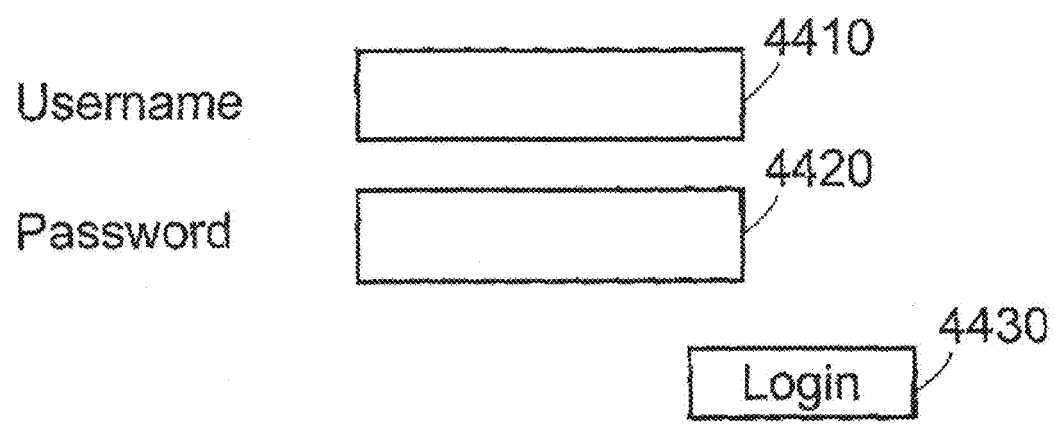
FIGS. 44A-B are diagrams showing a login panel.
Figure 44B:
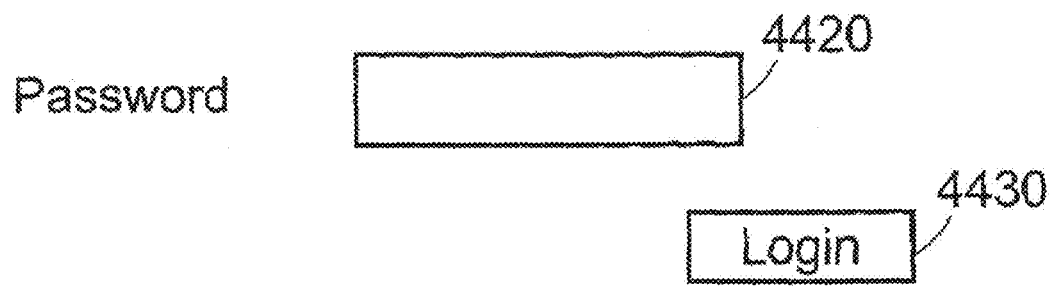

In the case of restricted access to an application the system can provide application access (and potential sharing) in one of two ways: the first method provides a username and or password. For example, as shown in FIG. 44A, the system displays username field 4410, password field 4420 (use of a password field may not be always necessary) and login button 4430. Upon entering these fields, the user activates the login button 4430. If the system authorizes login, the user is allowed to use the application. When using the same username and password, it essentially allows login to the same application, and enable complete sharing of the application. In the second method system create (as a result of a user request or an automatic system initialization) an identifier for such an access (to be called "access identifier") and stores the access identifier with its associated information, which will specify the application services allowed to the user or users of that identifier. An identifier can thus be provided for each user (user identifier) or the whole group (group identifier). The identifier can provide an access to information (that can be static or dynamic) in the system. The accessed application service can be shared with other users (in whole or in part), or be provided on a standalone basis. The access identifier can be implemented, for example, as a URL link. Alternative access identifier implementation could be a username and password combination, in whole or in part. When the identifier is user specific and requires a password, use of that identifier should prompt only for the password field 4420 as shown in FIG. 44B, and save unnecessary typing of user name by the user.

Because of the nature of web based applications, accessing one application may allow access to multiple applications, and the other applications can be accessible through a URL link in the original application.

When implemented by use of a URL (a uniform resource locator), the system sends the access identifier (URL) to the user. The user opens its message (for example email, or a page in his application, appearing as a URL link). The user clicks on the link and brings the page to view. After a successful login (if a link requires authorization), the user enters his login information. If authorized by a system, he is allowed login to the application. The system connects the user to the application service which can be used according to the access identifier.

Figure 32:
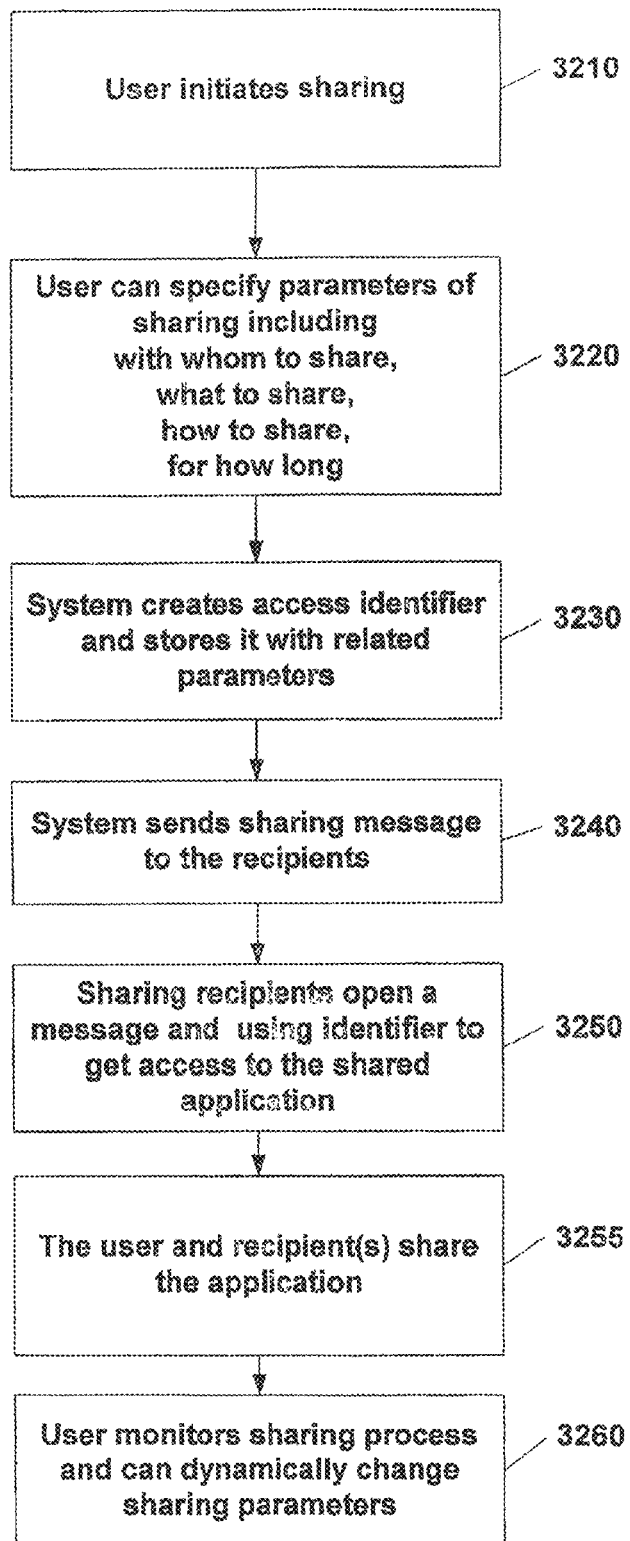
FIG. 32 is a flowchart illustrating a process of application sharing.

Referring to FIG. 32, when a user decides to share his application, in whole or in part, with additional users over the network at 3210, the user can specify which parts of application to share, any restrictions on how the shared application can be used, and for how long to share the application (at 3220). The user also decides who shall have access to the shared application (at 3220). The system then creates access identifier and stores it with related parameters at 3230. The system then sends a sharing message to the specified recipients at 3240. After opening the received message, recipients get access to shared application and can then use it (at 3250). The user and recipients (at 3255) are now sharing the application. In addition, the user can proactively monitor use of the application by other users and dynamically change any attributes associated with sharing the application (at 3260).

The application can provide the user with "shortcuts" which will allow to the user perform sharing more effectively. There are a number of shortcuts, among them a basic shortcut and a parameterized shortcut. The basic shortcut contains all the parameters for sharing and will be activated under control of one action. The parameterized shortcut has some parameters preset, and some parameters that need to be provided.

The user can create the shortcuts and store them in the system for further use. In a preferred embodiment according to the invention, a basic shortcut will contain an access identifier, to eliminate the need to create an access identifier each time, when all the parameters are already known. The parameters for implementing sharing can be provided from a combination of default values, and/or the previous usage history for the parameter, or can be provided by user.

Figure 35:
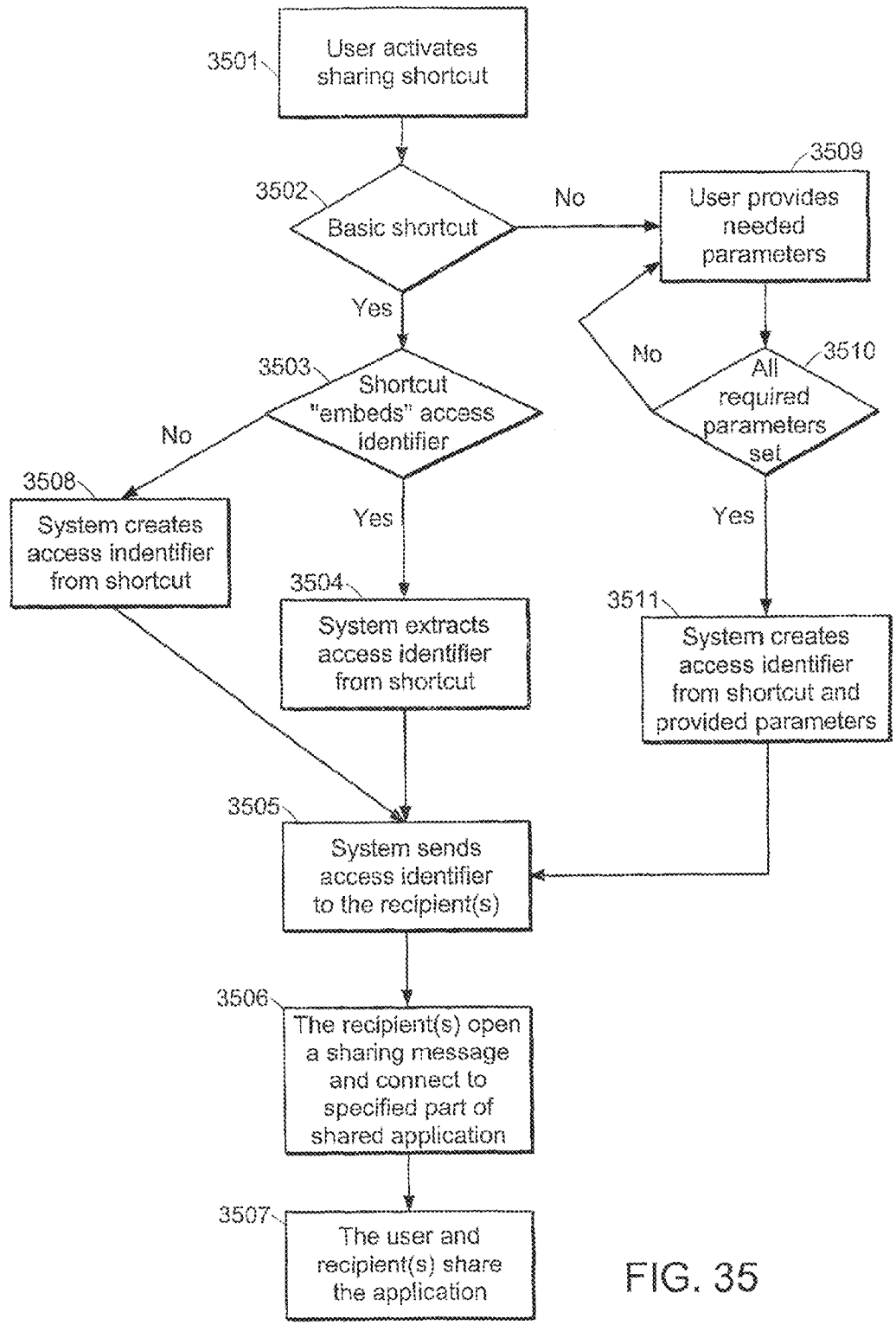
FIG. 35 is a flowchart illustrating the operation of sharing shortcuts.

For example, referring to FIG. 35, the application can have Share View, Share Page, and Share Application shortcuts that allow the user to specify what part of the application to share. In some cases, the user can specify, in one action 3501, what functionality to share and with whom.

More specifically, for example, in the case of technical support, the user can use help "shortcuts" such as View Help, Page Help, and Application Help. The shortcuts can be implemented, for example, as links or voice activated commands. Activating the View Help "shortcut" will cause an access identifier for the current view either to be extracted from shortcut at 3508 or to be created from the shortcut at 3502 and sent automatically at 3505 to technical support.

The technical support person who accesses a message with the access identifier will receive access to the specified user view at 3506 (which can be continuously updated). This will make the support process much more efficient, because the support person can instantly see and share at 3507 (either in the data or the view sharing mode) the information with which the user needs help.

In one particular embodiment of the invention the method for using a shared application can be implemented, as illustrated in FIGS. 31-1 and 31-2 using the following steps:

Connect to the shared application by providing an access identifier (for example a URL) (step 3101);

If the identifier requires either a user identifier and/or password (step 3102), the user enters this information (step 3102-1);

If access granted at 3103, then if the identifier indicates a data sharing mode (step 3104), go to step 3105;

Otherwise the system checks for the existence of an instance of the required application service at step 3106;

If no application service instance exists go to step 3105; otherwise the system connects (step 3107) to an existing application service instance;

In the step 3105 the system creates a new instance of the application service using the configuration associated with the access identifier and connects to the service instance;

The ApplicationServer (in the case of an HTML application), or otherwise the client-based application then creates, in step 3108, required application displays using the configuration associated with the access identifier; (the creation of application displays is affected because there are many displays and only few are required at a time).

The information is acquired from the shared application, in step 3109, using either a request/reply or a publish/subscribe mechanism;

The information is filtered as necessary at 3110;

If the application is an HTML application, the application display, with the information, is constructed at 3112; Otherwise, the application updates its displays with new information at 3115; If the user requests a new application display at 3113 the systems goes to 3108; Otherwise the system then loops to update or refresh, as necessary, the shared display depending upon the user application type as indicated in step 3112 (for example in an HTML implemented application the system loops to step 3108, while in client-based implementation the system loops to the step 3109);

The filtering operation of shared information, applied at 3110 can be performed in either the shared application service or in the ApplicationServer. When the ApplicationServer performs the filtering, the shared application service will provide all of the information for each application display and the ApplicationServer will filter the information for each user. This approach makes it easy to implement the shared application service since it is not aware of the application display filtering. The drawback is that unnecessary information is passed to the ApplicationServer.

Another approach is to implement filtering in the shared application service. This approach minimizes the data transferred to the ApplicationServer but introduces more complexity in the application service. To make data access and manipulation effective and fast, shared applications can store information in terms of user data views, so it can rapidly make updates according to user requests and distribute the updated data to the users. Each user application display, which can be a page (in HTML) or a window (in case of client-based applications), and each view within an application display, will be represented by corresponding objects in the shared application.

In a particular embodiment of the invention, the manipulation actions and parameters which result, for example in the column manipulations described above, will be sent to the ViewServer for further processing.

Referring to FIGS. 25A-C and 26A-C, (and the corresponding flow charts of FIGS. 28, 29) suppose a user wants to move a column in a table. The shared application, in this case, will retain information, in cache, in terms of the user views. The shared application can store the information in a table format, which will make it easier for the application to move specified columns and also to update the views of other users.

Figure 28:
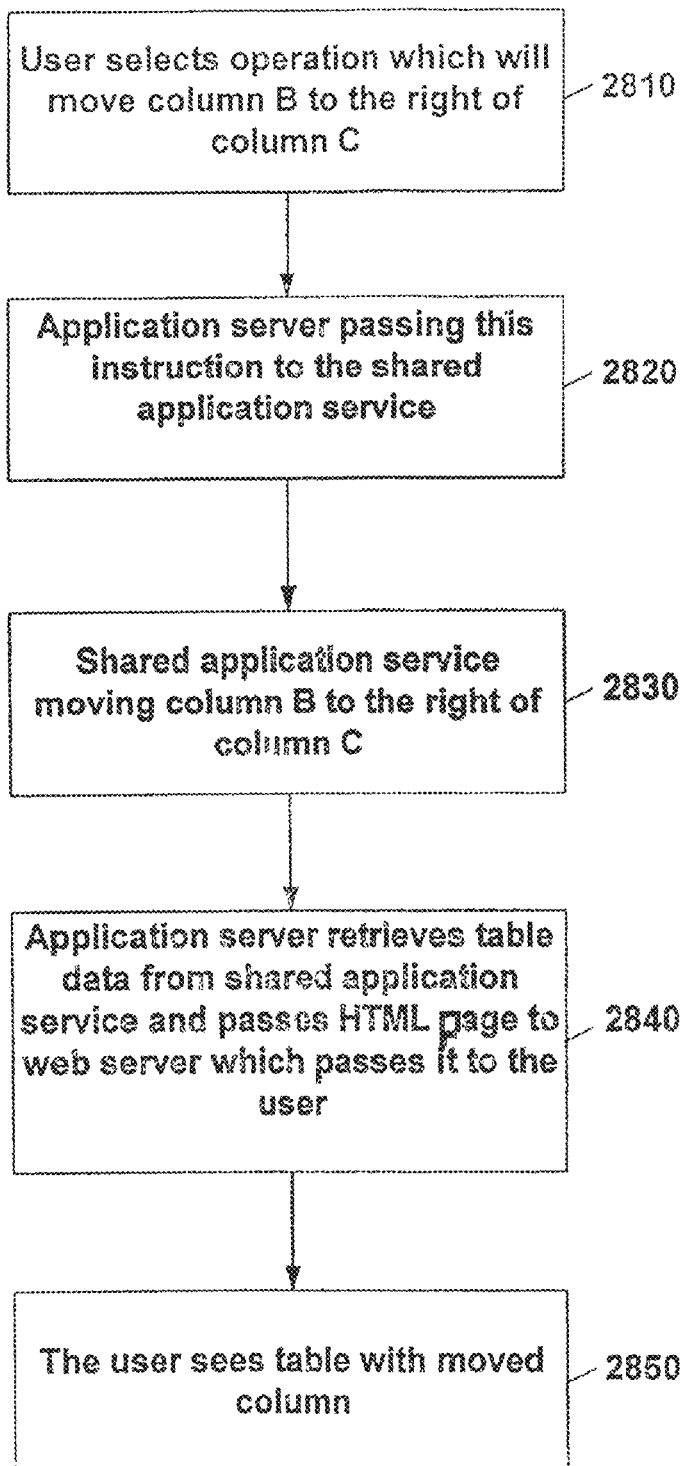
FIG. 28 is a flowchart of the operations performed in FIGS. 25A-C.

For example, in an HTML user application, referring to FIG. 25A and FIG. 28, a table view 2530, in a user application 2510 and a table view 2540 in a shared application 2520 are illustrated, before moving a column. In FIG. 25B, the user selects the operation which will move column B to the right of column C (step 2810), and this instruction is passed to the shared application 2520 (step 2820) which implements the move as shown 2550 (step 2830); The user table view 2530, at this point in time remains the same. Referring to FIG. 25C, the next time the user page is refreshed (step 2840), it will reflect in the new view, shown at 2560, the column move operation, already performed in shared application (step 2850).

Figure 29:
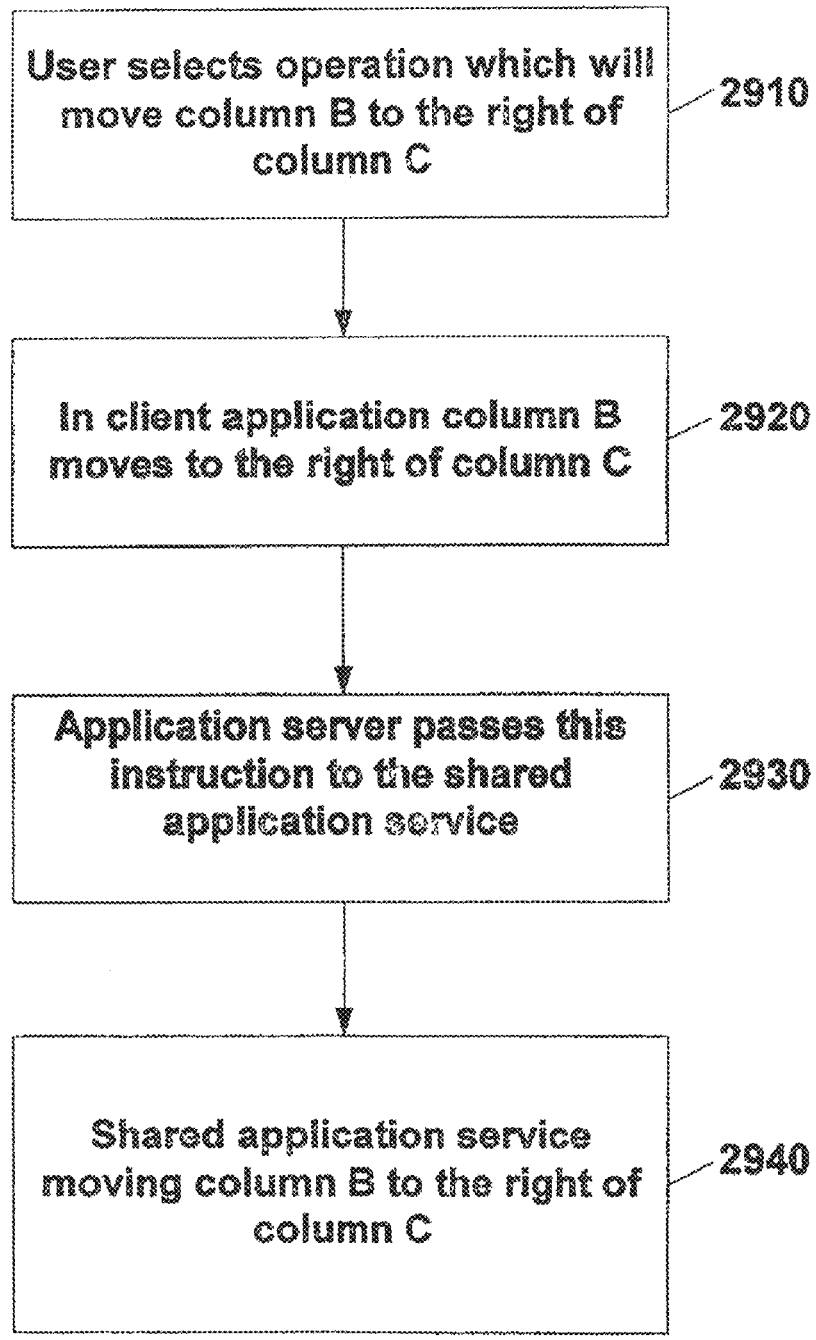
FIG. 29 is a flowchart of the operations performed in of FIGS. 26A-C.

In a client-based user application, now referring to FIG. 26A and FIG. 29, a table view 2630 in a user application 2610 and a table view 2640 in a shared application 2620 show the data presentation before moving a column. Referring to FIG. 26B, a user selects an operation which will move column B to the right of column C (step 2910). This column is moved at the user application 2610 as shown at 2650 (step 2920); while the shared application table view 2640 remains the same. Referring to FIG. 26C, the instruction is then passed to the shared application 2620 (step 2930), which moves its table column B as shown at 2660 (step 2940).

Referring to FIG. 27, different users can be given access to different subsets of shared application functionality (typically the views) at the same time. Thus, as shown in FIG. 27, a shared application 2710 has opened several views A,B,C, D. Three user applications 2720, 2722, 2724 connect to the network 16. In accordance with the invention, different ones of the user applications will typically have access to different views of shared application. Thus, as shown in this example, user application 2720, has access to views A and B; user application 2722 has access to views B, C and D; and user application 2724 has access to views B and D. According to this aspect of the invention, a change made in view B, will be seen by all the user applications; while a change in view D will only be seen by the other user application 2724 or 2722, respectively (typically instantly in a client-based application or at a next refresh in an HTML-based application). Changes in view A will be seen only by user application 2720.

The shared application service also allows users to interactively share information in different media forms such as data views (table, charts/graphs), text-like views (news, alerts, messages), voice and video. Once an application is shared for example, through the data views, the sharing participants can collaborate further through the use of text, voice and/or video. Upon access to the shared application service, then, the user will be able to read and write text, speak and hear using voice, and show and watch video, as well as view the associated application. (When the shared application service is sharing views, it is acting as a shared ViewServer.)

Users can thus collaborate using media such as text, voice and video in relationship to the combination of data views, application displays, the applications themselves, and events, or can collaborate independent of them. For example, in case of a text/data-view relationship, referring to FIG. 38, the user can type in the text view at 3801 related to the specific view in the application display, and the information is sent to the shared application service at 3802, and that text also can be shared with other users that take part in sharing that view at 3803. This way, users can not only share the data and views, but also can include commentary relevant to the shared views.

In another example, in the case of media/event relationship, there is a headline about particular event. A user that expresses an interest to interact about the event will be notified about the event and will have the capability to interact, in relation to the event, with other users (by text, through voice or video). The particular form of interaction (and sharing) can be selectively specified. This is comparable to a dynamic bulletin board, where the subject is event driven, and where the user can specify who are allowed to participate. The interactions can be recorded and replayed later. In the case of an event interest(s), the users specify their interest (which can be in either other user application events or system events) and the system automatically alerts them to the occurrence of the event. Furthermore, the system can provide not just the alert but also additional information (such as the associated view(s)), so that the alert can be related, in context, with that additional information. For example, messages with a corresponding text description can be provided automatically if triggered by conditions that have been specified by the user. In this way, a user can proactively watch a limited number of views, but once there are changes that occur in other views of interest, the user will receive a message that includes an access identifier to such other view or views. The identifier can point to or provide an access to a snapshot of a view at the triggered moment as well real-time views. The view typically contains a combination of table views, chart/graph views, news, etc.

Figure 36:
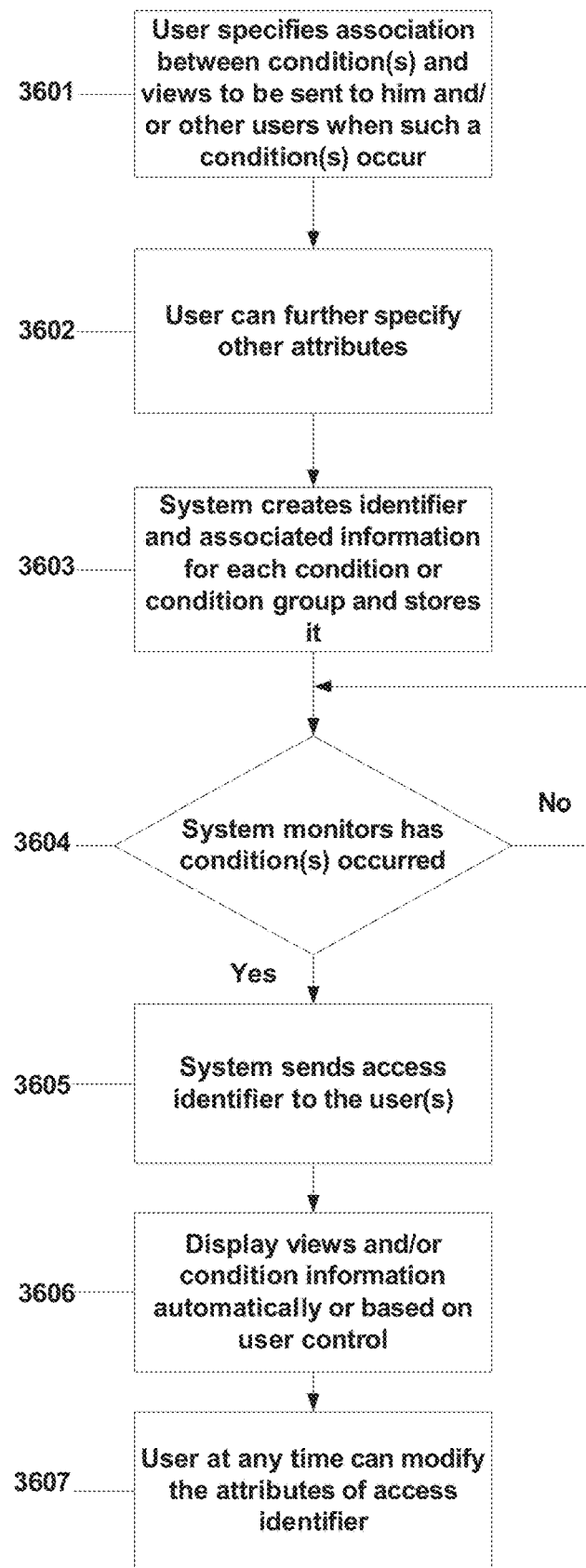
FIG. 36 is a flowchart illustrating a process for alerting a user about changes in monitored conditions associated with the views.

Referring now to FIG. 36, the user specifies, at 3601, any association(s) among one or more conditions (a condition group) and the views to be sent to him and/or other users when such condition(s) occur. The user can further specify other attributes, at 3602, such as the size and location of the views to be displayed, and whether to display these views automatically or under control of the user. The system creates an identifier and the associated information for each condition or condition group (users, views, view size, and location, etc) and stores the identifier and information (at 3603). The system monitors for the occurrence of such condition/condition group at 3604. When condition/condition group occurs, the system sends the access identifier to the user(s) at 3605. The views can then be displayed to the user automatically or manually under user control (at 3606). It should be noted, that the user, at any time, can modify the attributes of an access identifier at 3607.

Figure 37:
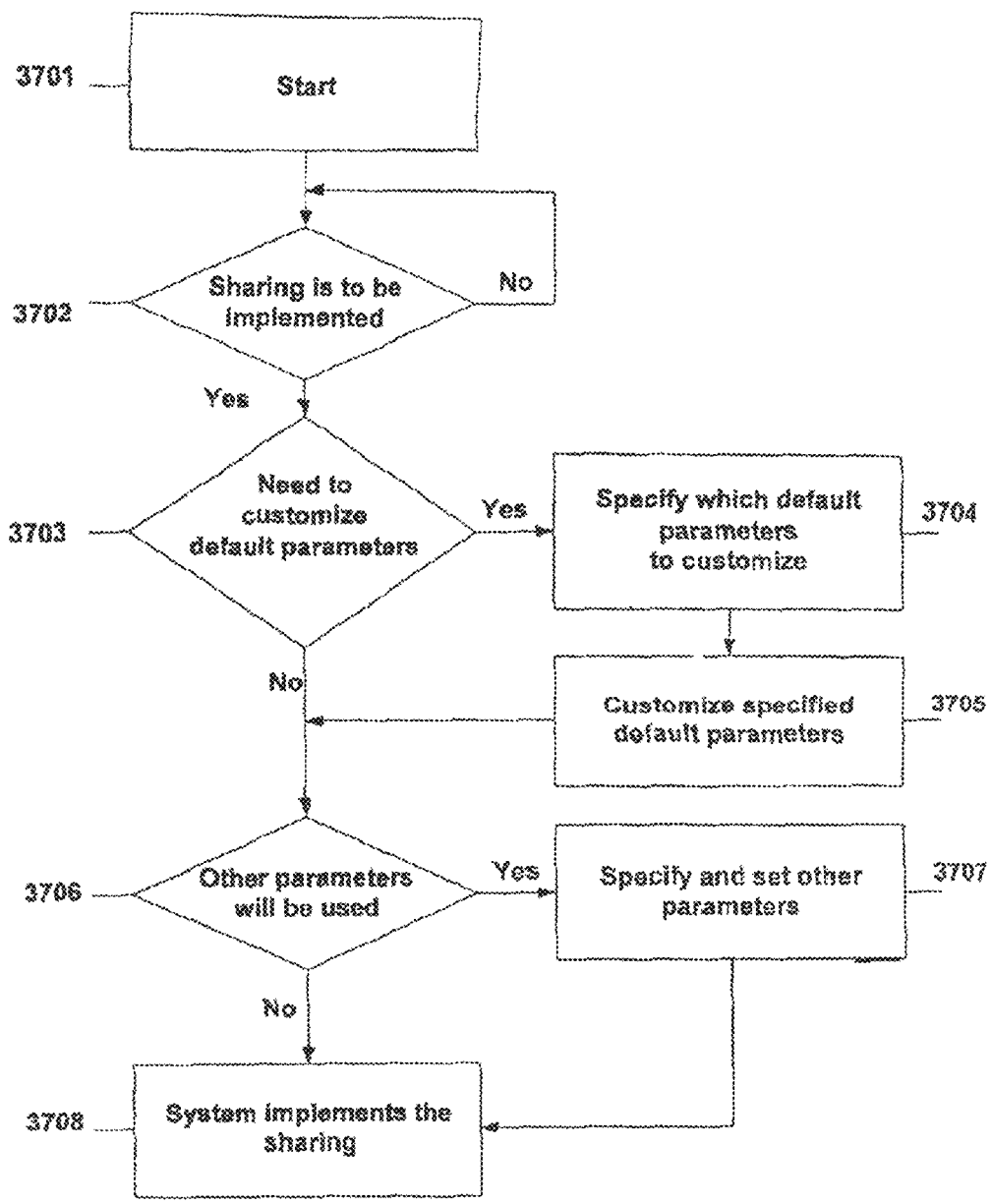
FIG. 37 is a flowchart illustrating the process of setting parameters for controlling application access.

Referring to FIG. 37, once initiated at 3701, the system tests, at 3702, whether sharing is to be implemented. If sharing is to be implemented, the user then determines, at 3703 whether any default parameters will be customized. If none are to be customized, the user proceeds to 3706, otherwise the user specifies and customizes those parameters at 3705. The user then determines whether any other parameters need to be specified at 3706. If yes, the user specifies and sets those parameters at 3707 after which the system implements the sharing mode at 3708. If no parameters are to be specified at 3706 the system proceeds to implement the sharing mode at 3708.

The application access identifier can be generated automatically by the system based on the identity of receiver, or can be generated using user specified information at the time of generation. In either instance, it is then sent to the recipients by the system. The sender of the identifier will be able to see what identifiers he sent and can dynamically change access of a recipient by modifying parameters associated with the identifier. The system will selectively create application views and displays based on these parameters. Such a per-user customization will provide a subset of shared application functionality to such a user.

The user can specify application access parameters or use default parameters (which can be further overwritten). Some or all of the parameters can have a default value on a per user basis. The system will create an access identifier and will store the following parameters associated with the identifier. In a typical implementation, the system parameters which are used are:

For how long the identifier is valid?
Which users can use the identifier?
Does the identifier usage requires further information? such password and/or user ID?
What information is accessible?
information slices;
view groups and views;
columns within the view;
chart/graph type available;
capability to make transactions;
What content is displayed?
Sensitive content can be "blacked-out"
What kind of interaction is allowed:
for example, moving columns, sorting, etc.
Is data sharing or view sharing implemented?
What components of the application display are shared?
Can further sharing of the application be allowed?

The system will keep a history of sharing and can provide a user with the choice of previously selected used parameters.

In other aspects of the invention, a number of implementations and uses of the inventive architecture are described below.

In one particular embodiment, the system can be deployed locally and the shared application is implemented as a local application with a graphical user interface (GUI). This configuration of the software allows a bi-directional interaction between in-house (local) applications and Internet/Intranet (web-based) applications where any operation in one program is automatically reflected in another program through the use of shared views. For example, sorting or moving a column by a first in-house user of a group, will result in an updated (sorted/moved) display on the web-based application of a second user of the group, and vice versa. Further, when the user using web-based application accesses a new application display which has not yet been viewed by the local user, it will cause a new window to pop up on the local user's screen. Also, in another example, when the user using a web-based application, changes an information slice (such as a portfolio which he is viewing in the case of a financial application), the result will be displayed in the local application, thus showing that information slice (portfolio) to the local user.

This application display methodology can be advantageous for users who want to control proprietary data and applications locally, and at the same time, have the flexibility of interactively remotely accessing the data through the network in exactly same way as though they were local.

Figure 13:
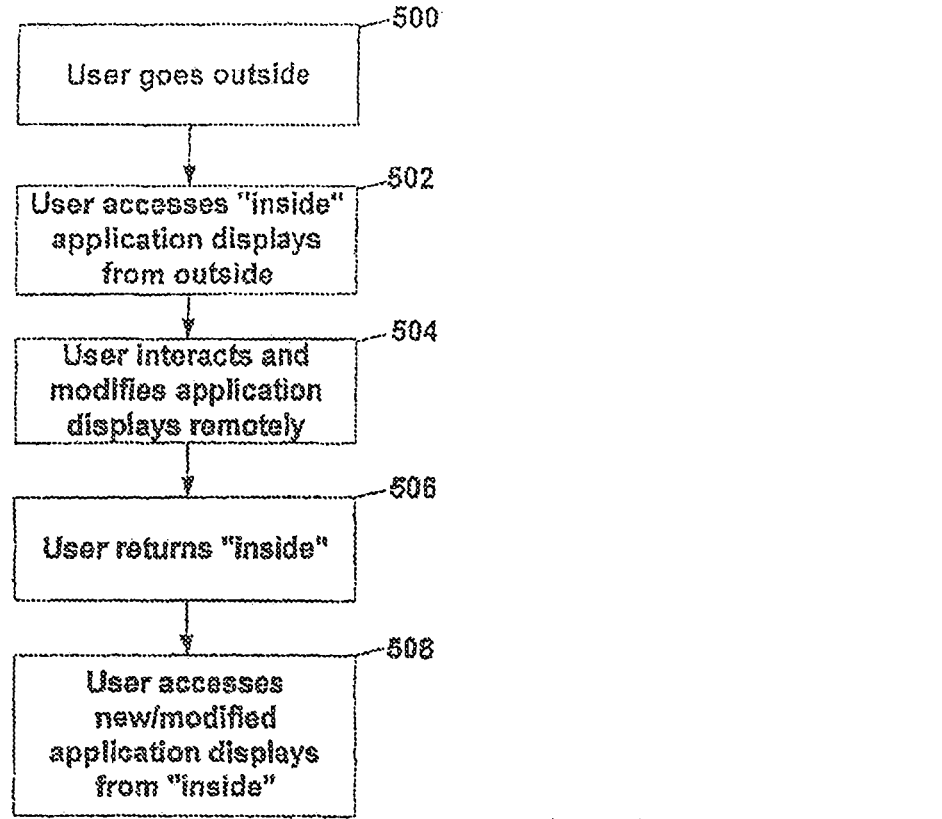
FIG. 13 is a flow chart illustrating a particular implementation scenario shared application display methodology.

The system thus also provides a message sharing platform. Referring to FIG. 13, as one example, users can go to an outside meeting (step 500) and yet access all of the application views which are available on the corresponding local application, in the same way that it existed, at his computer, when he left it. (step 502). Further, he can access the views, interactively, from any computer with internet access and without any setup delay. In addition, the user can interact and modify the views from the remote location, (step 504), and when the user returns from the meeting (step 506) he will find, at his display device, the views he was watching before he left and/or any new/modified views created during his outside visit (step 508).

In another example, the user can monitor from home any of his peers and can selectively look at any of the application displays of his peers in the real-time. This is accomplished because the ViewServer keeps information regarding the views which were accessed and used. Essentially then, the methodology of the invention, using this structure, provides the capability of sharing interactive real-time application views from any location at any time.

In a similar manner, two or more web-based applications can interact through shared application displays in a shared application/ViewServer architecture (FIG. 2) and where the shared application/ViewServer can be either a local application or a server application.

Figure 14:
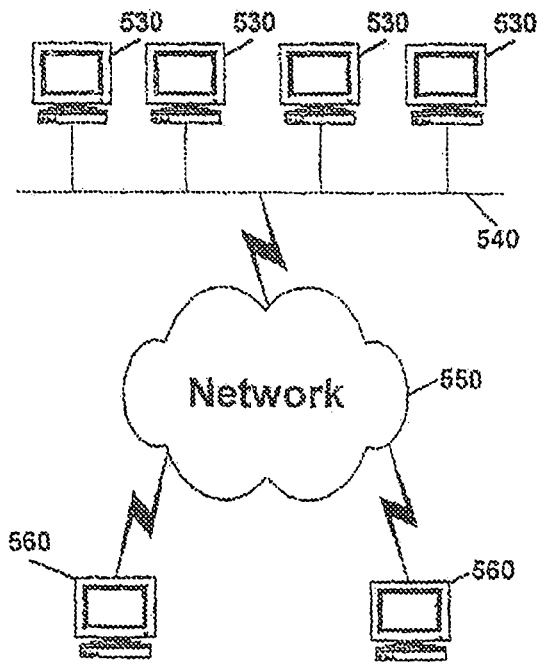
FIG. 14 is an alternate architecture for implementing the invention.

Accordingly, a typical architecture for implementing shared views and maintaining the applications "in-house" is illustrated in FIG. 14. In accordance with this architectural aspect of the invention, a plurality of local computing devices 530 connect to a private network or intranet 540 and run the applications "locally". There is provided a connection between the private network (for example a local area network or virtual private network) and the public network (for example the Internet or intranet) 550. Remote computing devices 560 connect over the public network to the private network 540. In a similar way if network 550 represents an intranet then local users can access and share other local user applications of others. Another example is a one-to-many sharing interaction where the user runs his local application on his device (which can be, for example, a computer, laptop or wireless PDA) and can share the application with other users through the network. This way the user is in complete control of the application sharing because it resides on his device and he can, at any point of time, physically disconnect other users or terminate the program.

Figure 33:
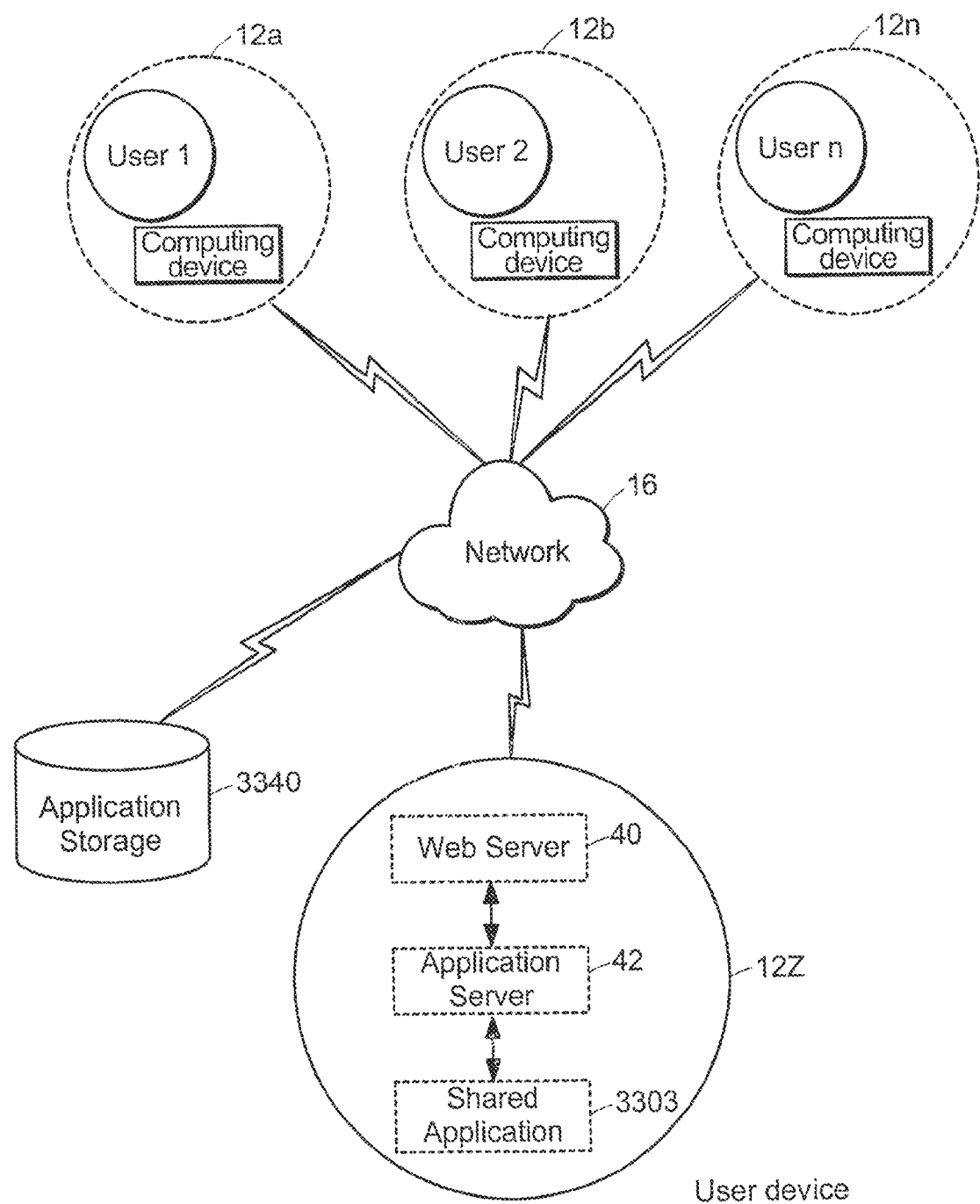
FIG. 33 is a one-to-many sharing of a local application through the network.
Figure 34:
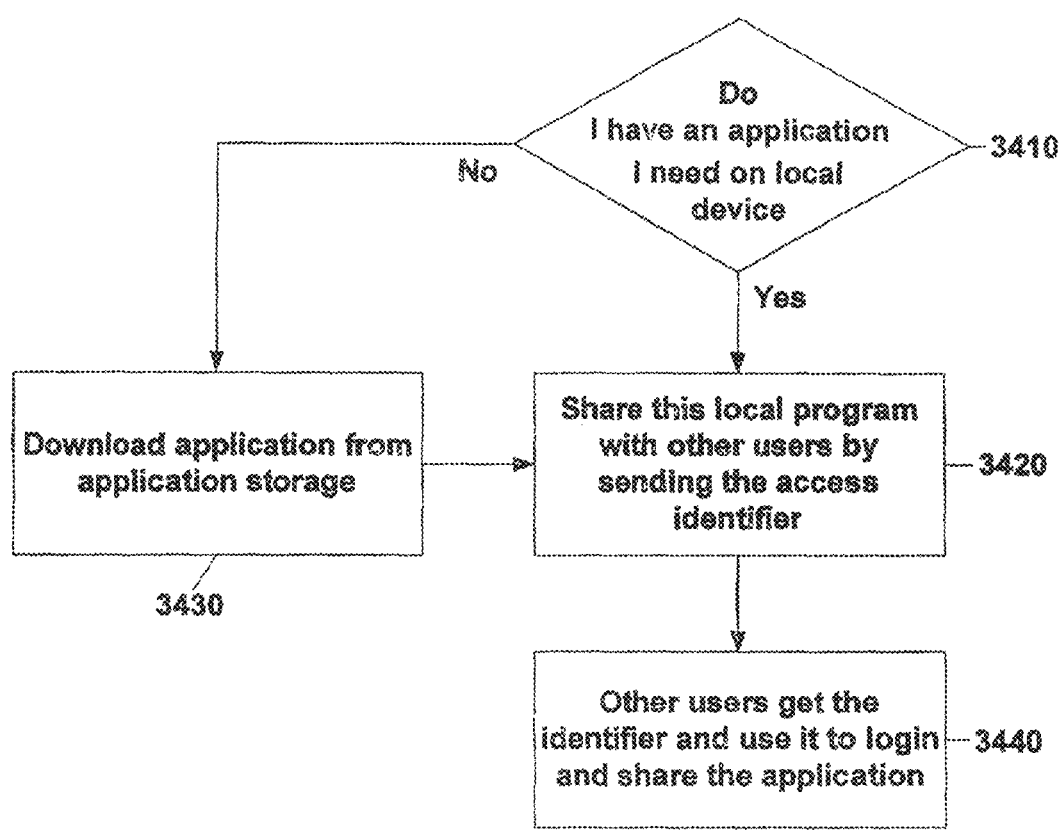
FIG. 34 is a flowchart illustrating application sharing by downloading a shared application (in whole or in part) to the local device for further sharing.

Referring to FIG. 33, an operation according to one embodiment of the invention, a user device 12Z, in this particular embodiment, will have a web server 40, an ApplicationServer 42 as well as a shared application 3303. In the case that the application is not initially located on the user device (such Java applet or C# based program, for example), as tested at 3410 (FIG. 34), it can be downloaded with associated resources at 3430 from other locations such as application storage 3340. Once the application is on the user device, the user can send a message to other users 12-12n at 3440 which will contain an identifier for the sharing access. The sharing users will utilize this identifier at 3440 to login to the user device through the web server and share the application. In some embodiments of this aspect of the invention, depending upon the nature of the shared application and the network 16, the Web Server and ApplicationServer may not be needed.

Interactive Table

HTML is a widely used standard but it does not have the built-in facilities to interactively manipulate table content especially when this content is dynamically updated. According to the invention, therefore, column, row, and cell interactivity can be provided to manipulate the table content. For convenience, most of the interactivity and manipulations described here relate to columns of a table, however they are equally applicable to manipulations and interactivity among the rows of a table. Many of the manipulation herein described can also be advantageously applied to non-HTML tables.

Column Operations

As illustrated in FIG. 3, there are included in the display various control "buttons." In this embodiment, selecting a control button will visually mark it and deselecting it will remove the visual marking of the control button. In addition, when there is only one control of particular type that can be selected at a time in a given table, selecting another control of the same type will deselect the previous control.

Such control will be called uni-column control. For example, selecting a column to move can be applied only to one column at a time.

On the other hand, a column filter can be applied to multiple columns and as such it is a multi-column control. Selecting second multi-column control will not deselect a first one. Some of the controls can be configured as either uni-column, or multi-column, for example column sort. Multi-column controls will have in addition to controls associated with columns, a per table control which allows selecting/deselecting all the operation that apply to a selected controls of that type.

There are a few practical reasons, for having such a control. First, it allows deselect all the operations of particular type within one action, without the need to individually deselect controls in each selected column. Second, after deselection, it will allow selection of all previously unselected controls at once, thus keeping a history of last multi-column selection of that type.

Also, the table will keep a history of multi-column operations, thus allowing the user to easily choose from previous operations. For each selected multi-column control of particular type, an associated per-table control of that type will be presented in a per table control panel. This is illustrated in FIG. 45G and FIG. 45H.

Buttons 62a, 62b, . . . , 62m, in this embodiment, for example, when clicked upon, will automatically enable a rearrangement of the views, so that the column clicked upon is sorted and visually marked, and presented either in ascending (sort up) or descending (sort down) order. The marked column control button can be visually marked (such as enlarged, and/or highlighted or otherwise distinguished). Any of the columns can be selected and will control the reorientation of each of the rows into an order according to that column.

In addition, an additional control button such as a button 62x separate from the table (as illustrated) can be used to lock the particular sort selected (sort lock), no matter to which of the columns the sort relates. Alternatively, a lock button can be displayed adjacent to an actuated button 62a, 62b . . . , 62m. The sort lock control button will appear only after a sort was performed in the table. Once locked, that order will be maintained across the entire table and the rows rearranged if updated data requires such a rearrangement in rows. The sort can be implemented to automatically take place as the data is dynamically updated. Note that in accordance with this embodiment of the invention, only one column can be selected at a time to control the sort operation. To indicate such a sort lock, the sort lock control button will be visually marked (such as highlighted and/or enlarged) in the column, that was lock sorted. Actuating that control button, deselects the sort lock function, leaving the visual appearance of that button in its normal state. Further, selecting the sort control button in any other column, while one is already activated, will deselect the previous sort lock, and enable a new sort lock associated with the newly sorted column.

Figures 46A, 46B, 46C:
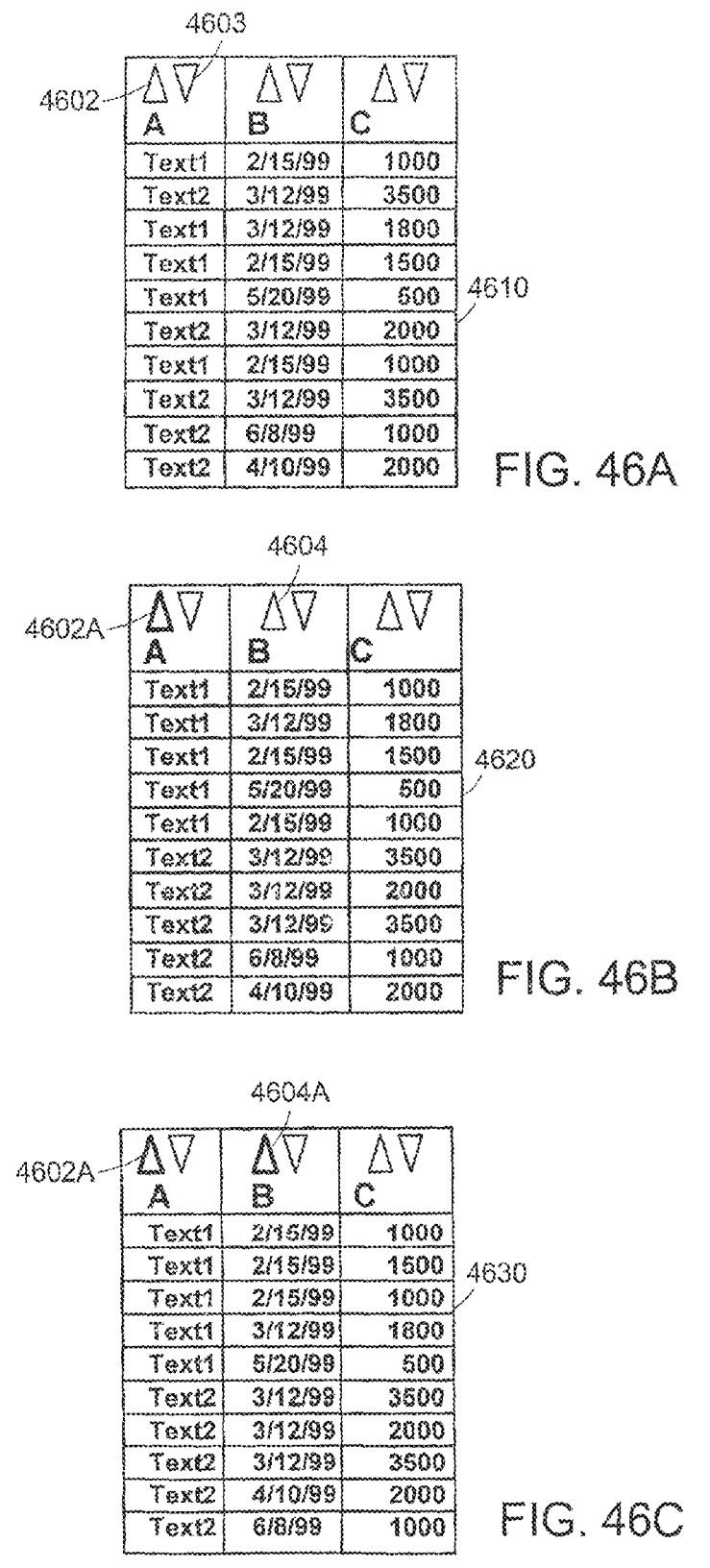

Alternative embodiment of the invention is multi-column sort, and multi-column sort lock/unlock. For example, as shown in FIG. 46A table 4610 presented, having three columns A (alphanumeric column), B (date column, where format used is Month/Day/Year) and numeric column C. Each of the columns has associated sort controls, such as sort ascending control 4602 and sort descending control 4603 in column A. Selecting control 4602 in FIG. 46A sorts table 4610 by ascending order of column A resulting in table 4620, while visually marking control 4602A, as shown in FIG. 46B. Selecting control 4604 in FIG. 46B sorts table 4620 by ascending order of column A and then ascending order of column B, resulting in table 4630, while visually marking controls 4602A and 4604A, as shown in FIG. 46C. Selecting control 4606 in FIG. 46C sorts table 4620 by ascending order of column A, then ascending order of column B and then ascending order of column C, resulting in table 4640, while visually marking controls 4602A, 4604A and 4606A, as shown in FIG. 46D. In one embodiment, the sort order among the columns in the multi-column sort, is established by the relative positions of the columns. For example, moving column B in FIG. 46D to the first column, moves column A to the second column, and the sort among the columns is done in the following order: first by ascending order of column B, then by ascending order of column A and then by ascending order of column C, resulting in table 4650, as shown in FIG. 46E. Selecting sort descending control 4608 in column C, results in table 4660, as shown in FIG. 46F, where visually marking is removed from control 4606A (indicated at 4606) and visually marking control is added to control 4608 as indicated at 4608A. Multi-column sort can be also sort locked, resulting in dynamically keeping the established sort order while data in the table is dynamically updated. Multi-column sort lock control will be typically located in per-table control bar described earlier.

In the preferred embodiment of the invention, the user action and its parameters are passed to and maintained on the ViewServer. For example, sort order will be maintained on the ViewServer, so that the columns will be resorted upon the presentation to the user as the data changes. This allows for the same sort order to be maintained even where the user logs out from one location and logs in from a separate location. This advantageously saves the user from needing to repeat the steps which relate to his preferred "view" of the data as the user may move from one location and log on at another.

In addition, other, or hidden, control buttons can be displayed to scroll and move columns to the left and/or right. Accordingly, in one general embodiment of the invention, one can use a "control button" such as the control button 63 illustrated in FIG. 3 to open up, or activate, a new series of control buttons, like control buttons 65, which, when clicked upon, selects a column and enables that column to be moved to the left or the right one or more columns. For example, one of the previously hidden control buttons, when clicked upon, can open up a series of buttons (like button 65), or those buttons 65 can be displayed by default. Then, the first button clicked identifies a column to be moved while a second button clicked identifies where to move the column.

The data can then be rearranged in the view. Also, in this manner, the data presentation can be flexibly altered, in an automatic "click and drag" or other manner to move related column data so that it is adjacent to each other. Also, in this manner, different views of the data can be automatically obtained, in real time, to enable view analysis and/or otherwise help the decision process. To accomplish the new view, the requested "button" click is sent by the user's browser back through the network 16 to the system 18 where the new view and page can be assembled and obtained.

For example, according to one embodiment of the invention, each column can have a Control Button to select the column to be controlled, and MoveTo (<- ->) Buttons (such as buttons 630, 632 to be described later), and Sort Up/Lock/Down buttons. Clicking on the Sort button will rearrange the view so that the column clicked upon is presented either in ascending or descending order. If the Control Button in the column is clicked on, then that column will be identified visually as the selected column and will cause the display of MoveTo buttons on all the columns except the selected column. A TableView Control Button, when clicked, shows the Column Control Button and Column MoveTo (<- ->) Buttons. If the ColumnMoveTo Button of a column is clicked, this column will be moved (if possible) one column to the right if the -> button clicked, or one column to the left if the <- button was clicked. If the Column Control Button is clicked, the subsequent clicking of a <- or -< button on a different column causes the selected column to move accordingly to the left or the right of the clicked on column. Also, according to another embodiment of the invention, each column can have a Control Button that allows the user to hide that column, as well as button(s) to reveal adjacent hidden columns.

Figure 16:
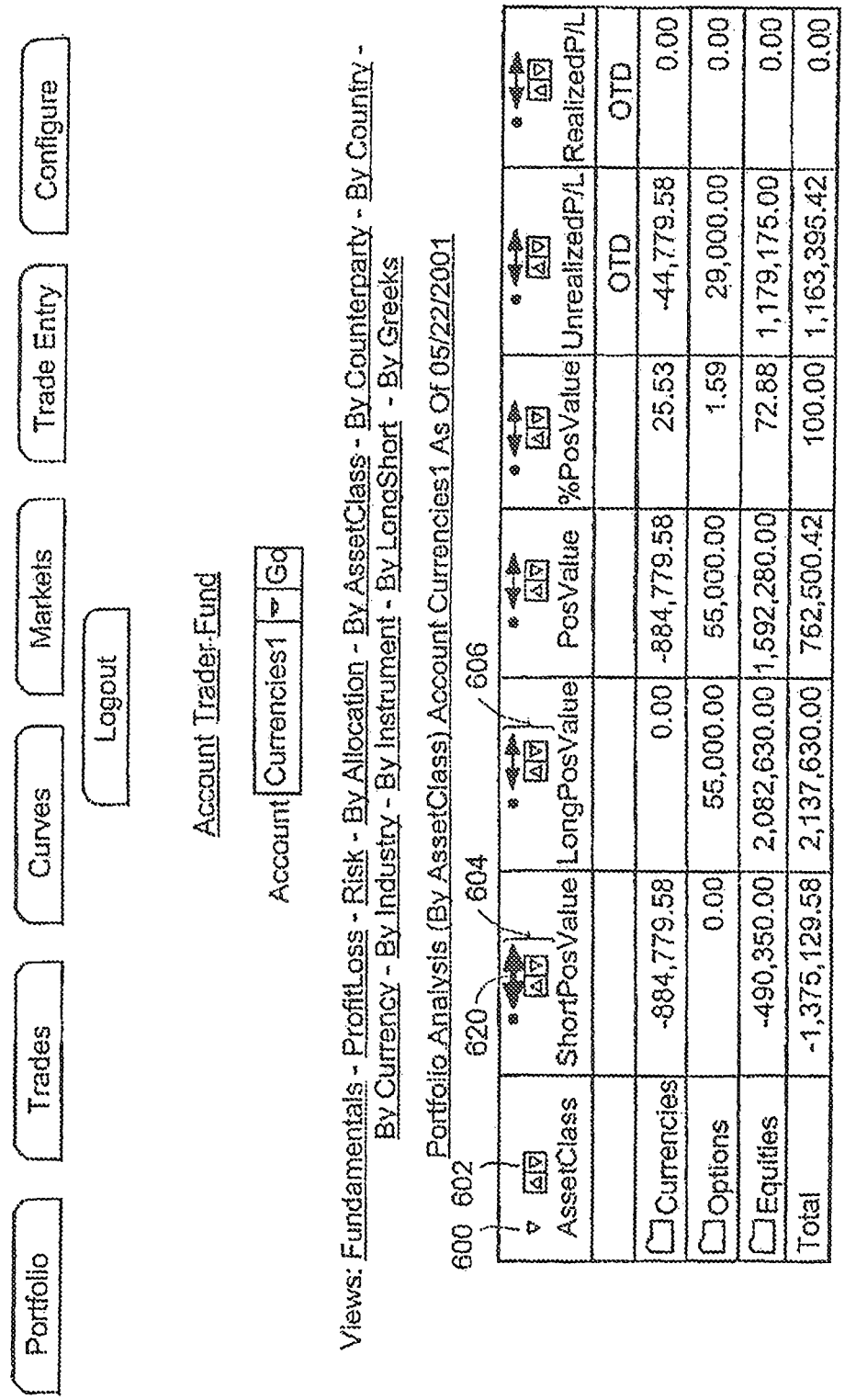

In a particularly preferred embodiment of the invention, referring to FIG. 15, the GUI presentation has a column control actuation button 600. This mechanism can turn on (cause to be displayed) "column controls" in the column headers. (FIG. 16). These controls 602, 604, 606, . . . can be added or removed by actuating the column control actuation button 600. Thus when this control is turned on, as in FIG. 16, on, the columns will have controls 602, 604, 606, . . . in the headers, and when the control 600 is turned off (FIG. 15), the column controls 602, 604, 606, . . . will disappear. In this way, the system preserves space on the user screen and does not show the control buttons when they are not needed. Thus, the system avoids cluttering the screen, yet provides the flexibility to add the controls with one actuation. (For simplicity, in the figures, upon activation of button 600 only those controls needed to understand the figures have been illustrated. It is to be understood that in actual system, all of the control buttons that were configured to be displayed, will be presented.)

Figure 47:
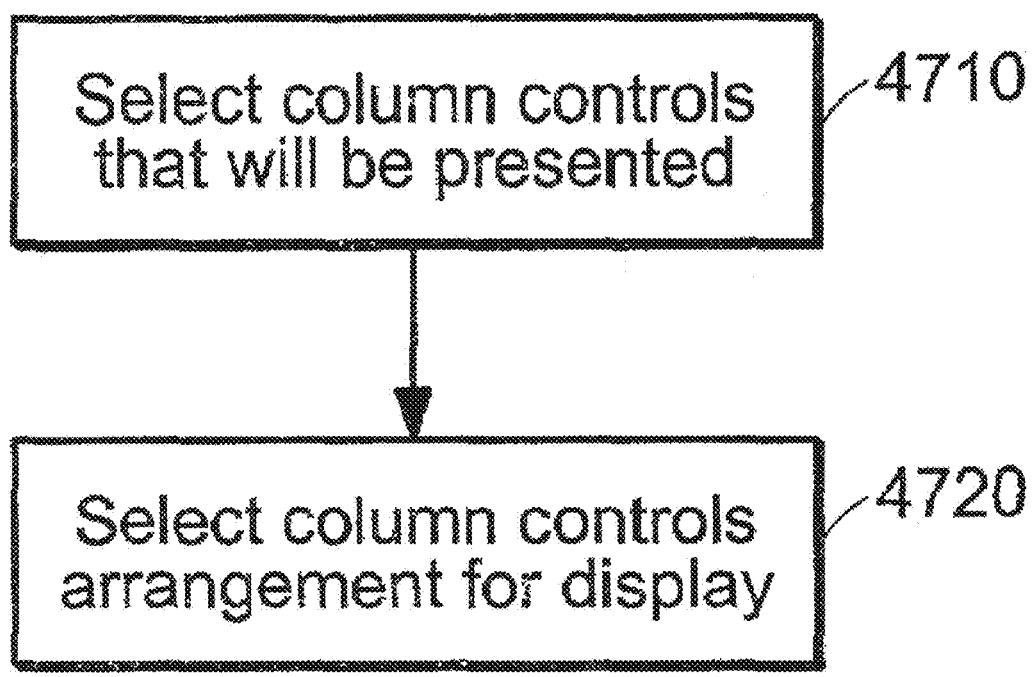
FIG. 47 is a flowchart illustrating column control bar operations.

The column controls of FIG. 16 allow the user to rapidly and effectively perform a sophisticated manipulation of columns, such as column sort, sort lock, move, hide and reveal, aggregation, filtering, charting and more. These controls allow direct manipulation of information without displaying any additional screens, so that the user can continuously watch the current view. The system will also have a column control bar, which, as shown in FIG. 47, provides the ability to selectively indicate which of the column controls will appear (at 4710), and in what arrangement (at 4720), when the column controls are displayed.

Once the control button 600 is in its "on" state (FIG. 16), several operations can be implemented. In one such operation, the move select <-> button 620 indicates a column to move. Clicking on the <-> button will select the column for a move and the selected button will be visually marked (for example enlarged). All of the columns, except the selected column will show "now Move To <.vertline. .vertline.>" arrows 630, 632 (FIG. 17).

In another aspect, either of the <.vertline. .vertline.> buttons 630, 632 will move the selected column respectively to the left/right of the clicked column. Thus, in FIG. 17, button 640 was selected, with the result shown in FIG. 18. Further, clicking the <-> button 620 on the selected column will deselect it, and the visually marking of the button 620 will be removed and the "move to" controls 630, 632 in FIG. 17 in all other columns will disappear. Clicking the <-> on any other column will deselect the previous column as the column to move and will select the "other" column as the column to move.

In addition, one of the column control buttons "–" is used to hide that column. Selecting the "–" control will cause that column to disappear from the table. Such a "hidden" column will be indicated by a newly appearing "+" button in the column that was adjacent to the "hidden" column. Selecting the "+" button will "reveal" the "hidden" column. It is possible that a given column will have more then one "+" which will indicate there are multiple hidden columns adjacent to that column. The user can selectively "reveal" a specific column whose identity can be displayed while rolling a mouse over the "+" buttons.

Aggregation

Referring to FIG. 40A, other controls for effecting other manipulations of the table can be made visible by clicking on button 600. The control buttons {'4001, as shown at FIG. 40A, are used for preset or dynamic aggregation of the table by the content of the associated column when selected. Beside a preset aggregation table, where the aggregation criteria are fixed, the table can be dynamically aggregated by any column in the table. When a column is selected for aggregation by activating '{', the aggregate control 4001 will be visually marked (for example enlarged and/or highlighted) to indicate the selection, as shown at 4002 (FIG. 40B). If that column was not a first column, the aggregated column will become the first column. In the newly created aggregated table, only the numeric data columns that can be aggregated will be presented. When aggregated view 4020 is drilled down upon, by activating a folder-like control 4003A, for a row 4006 in the aggregated column, the resulting detail table 4040 (FIG. 40D) for that row will present all of the columns of data from the original table 4010. The original table 4010 will again be displayed after deselecting the selected '{' control 4002. Alternatively, selecting aggregation of a different column, for example column D in table 4020 will display a new aggregated table 4050 (FIG. 40E). In both cases, the visually marking of previously selected control 4002 will be removed. There can be at least two types of aggregation: basic aggregation and parameterized aggregation (for example, range aggregation where aggregation is performed based on specified ranges). Basic aggregation uses solely a column content to group the information. For example, in FIG. 40A, basic aggregation is applied to column B in the table 4010.

As a result, a new table 4020 is generated containing only the aggregated column B and derived numeric columns, such as shown in columns in C and D. The column B becomes a first column. Original column A, which contained text information is not included in table view 4020. In FIG. 40B, five aggregated groups are created in column B labeled 500, 700, 800, 850 and 1100, and contain folder-like controls 4003. An aggregation control 4002 in column B visually indicates that aggregation is performed using that column.

Correspondingly, the content of a selected row in column C in table 4020 is the result of straight addition of the values in column C for the rows having a value in column B of table 4010 equal to the value in column B of the selected row in table 4020. Further manipulation of the resulting aggregated columns, using a selected function, is possible. For example, in FIG. 40C an averaging function is applied to the underlying data of column C resulting in average values as illustrated in column C avg. For example, the value of C avg in the row corresponding to the folder labeled 1100 of FIG. 40C is an average value of the values in column C in the rows of FIG. 40A, which contain value 1100 in column B. As noted above, other functions can be applied to the underlying data of FIG. 40A.

Referring now to FIG. 41A, a range aggregation of column information is illustrated, applying for convenience the same table illustrated in FIG. 40A. The aggregation criteria applied to column B in FIG. 41 A, rather then selecting single cell values, selects a range of column cell values and aggregates the data associated with the rows grouped by the selected criteria. For example, aggregating a column B in FIG. 41A using a range of 250, for example, as illustrated, using a base level of 0, will result in a table 4120 as shown in FIG. 41B. Applying an averaging function to the underlying data in column C, in FIG. 41B, results in the illustrated table 4130 of FIG. 41C.

The parameters for parameterized aggregation can be automatically presented based on raw column type (such as string, numeric, date), the semantics of that column (for example—column name), the view, and the user's previously selected parameters for that column.

Figures 49, 50:
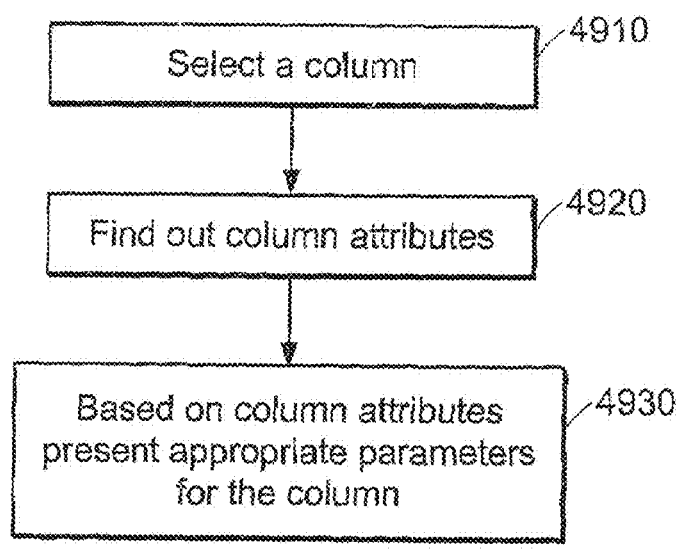
FIG. 49 is flowchart illustrating providing parameters for table columns.
FIG. 50 illustrates an aggregation control panel according to one aspect of the invention.

In operation, referring to FIG. 40 or FIG. 41, the user initiates the aggregation operation by clicking on the '{' control. The system, if so configured, can perform, for example, in response to single action, an immediate default aggregation (for example a basic aggregation, or the aggregation performed last time). If a parameterized aggregation is performed in a non default mode, the system displays an aggregation control panel 5010 in any of a number of convenient display formats, for example a pop up window, or in a designated area appearing above the table, as shown in FIG. 50. Deselecting column aggregation, will remove column aggregation panel, if it was displayed.

In the aggregation control panel display, aggregation criteria will be presented and will be context sensitive (either one or a combination of per column data type, column semantics, per view, per user). For example, if the aggregated column represents dates, and parameterized aggregation is selected, the displayed criteria could present a choice of aggregating the data by week, month, quarter, year or another increment to be used for aggregation (for example, aggregate by each consecutive 3 days). In the case of text columns in a parameterized aggregation, the displayed criteria could be a choice of regular expressions. In addition, the context sensitive history of a user's previous selections can be displayed. That history is dependent at least on the column and/or the aggregation type selected. The user can choose additional aggregation parameters from the aggregation control panel. Upon selection, a table corresponding, for example, to FIGS. 40B or 41B, is presented for view.

Filtering

Referring to FIGS. 42A-C, in addition to the controls already described, another column control '*' 4201 is used for dynamic filtering of the table by the content of selected column. The table rows can be dynamically filtered by any column or columns in the table. A column is selected for filtering by activating the '*' filtering control, and will be visually marked (for example an enlarged or highlighted '*' 4202) to indicate the selection. In the newly created filtered table 4220, only the rows that match the filter criteria in the filtered column or columns will be displayed. As a result, the totals in the columns, where totals are computed, can be affected. The effect of column filtering will be reversed after deselecting the selected '*' control in the column, and the visual marking of previously selected control 4202 will be removed. In the case where the table is already aggregated, the rows of the table underlying the aggregated table are those that filtered.

Figure 51A:
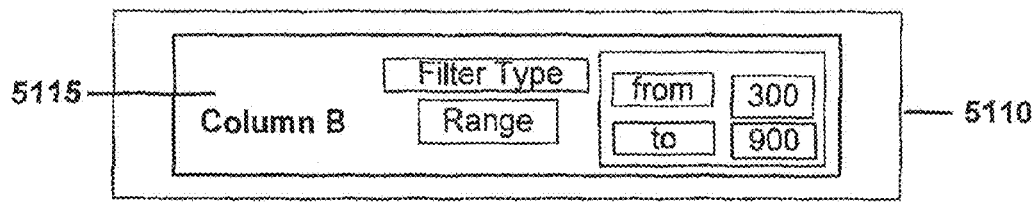
FIGS. 51A and 51B illustrate filter control panels according to an aspect of the invention.
Figure 51B:
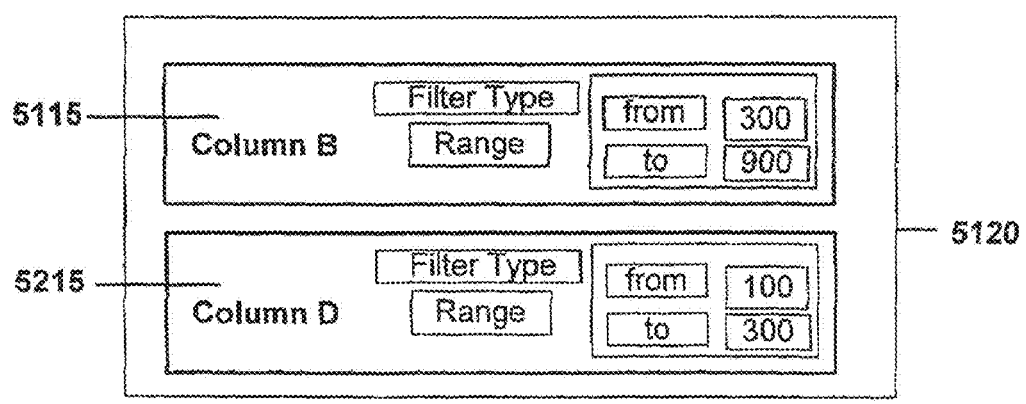

For example, in FIG. 42A filtering is applied to column B by selecting control button '*' 4201 in that column. As illustrated in FIG. 51A, a filter control panel 5110 appears, for example as a pop-up window or displayed above the table. The user sets the filter criteria for that column, for example, a range between 300 and 900 (as shown in FIG. 51A, the filter control panel 5110 at this point presents filter criteria 5115 for column B) and applies it. As a result, a new table 4220, as shown in FIG. 42B, is displayed. Subsequently, activating a filter control in a different column will display new filter criteria in the filter control panel 5120 for each column to be filtered. Setting the filter in the range between 100 and 300 in column D (as shown in FIG. 51B, a filter control panel 5120 at this point presents filter criteria 5115 for column B and filter criteria 5215 for column D) results in the table 4230 as shown in FIG. 42C.

Filter criteria presented in the control panel will be context sensitive (either one or a combination of column data type, column semantics(for example—column name), view and user history). For example, if the filtered column represents dates, the criteria presented could be a choice of start date and end date, or criteria including only rows whose date is within a specified number of date units (for example, filter from today going forward a week). In the case of text columns, the filter criteria could present a choice of regular expressions. Upon activating a filter in the filter control panel, the selected filter criteria will be applied to the table. In addition, the context sensitive history of a user's previous selections can be displayed. That history is dependent on the column to which the filtering is applied. The user can choose additional parameters from the filtering control panel. In both cases of aggregation and filtering, the user can be visually presented with indications as to the nature of the information presented. For example, the title of the view will indicate if the view is aggregated and/or filtered and will provide the corresponding details.

Charting

Figure 19:
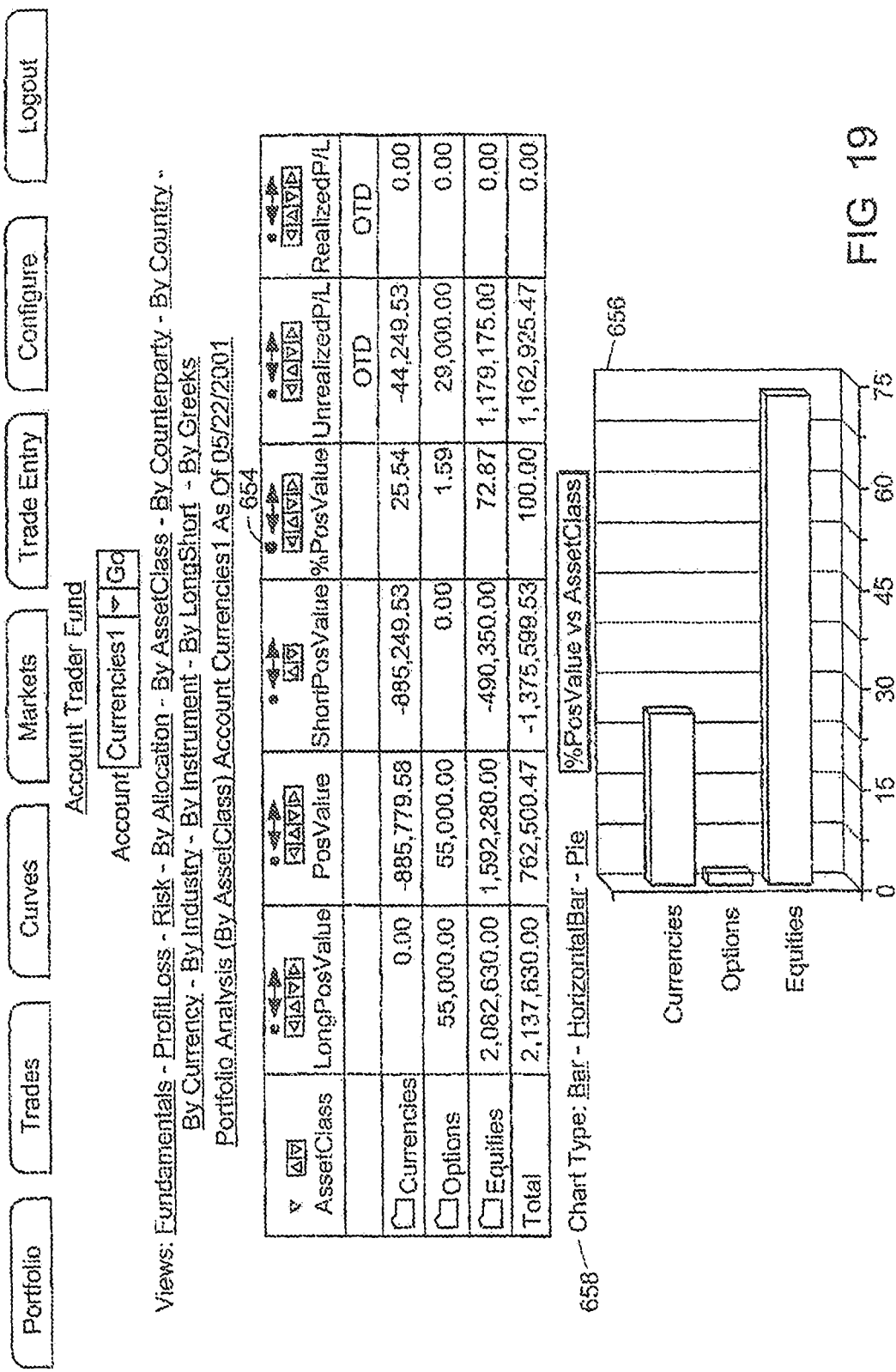

Referring again to FIGS. 18 and 19, the column header can also have a control button "o" 650 (FIG. 18) to indicate charting. Clicking on this button, will cause the system to present a graph/chart 656 (FIG. 19) for the selected column. The column is visually marked in the column header by having a larger "O" button 654 (FIG. 19). Clicking on the "O" button 654 will deselect the charted column reverting control button "O" to its original size and will close the display chart/graph for this column.

Charting/graphing can be enabled for one column at a time, or for multiple columns (either real columns or proxy columns). A proxy column is one not fully revealed in the selected, displayed column. In the case of uni-column charting/graphing control, selecting the control will result in displaying one chart/graph at a time for the associated table. In the case of multiple column charting/graphing, the system will display a chart/graph of each of the plural selected columns separately, or combine them in one chart/graph, if possible, depending for example, on data and/or chart/graph type. Each of the charts has separate controls for further customization, for example a chart type control 658.

For example, referring to FIG. 45A, charting/graphing is applied to column B by selecting control 'o' 4501 in that column of table 4510. As a result, a chart 4525 is displayed together with a table 4510, where chart/graph control 4502 is visually marked, as shown in FIG. 45B. If charting/graphing is set for uni-column operation, then selecting charting/graphing control 4503 in column D in FIG. 45B, will result as shown in FIG. 45C, in a table 4510, where chart/graph for column B is replaced by chart/graph 4535, where control 4504 is visually marked, and the visual marking of control 4501 is removed.

Figure 45D:
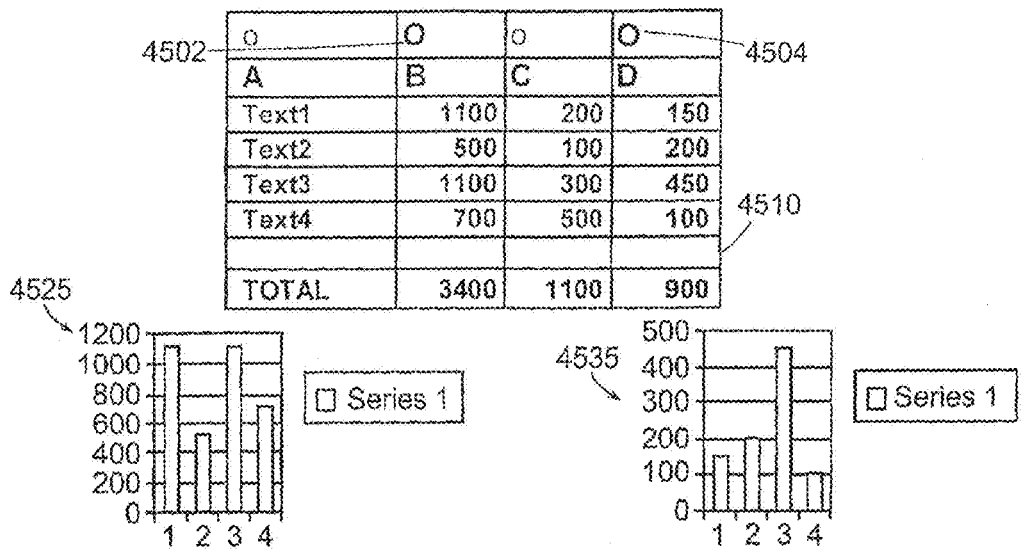
Figure 45E:
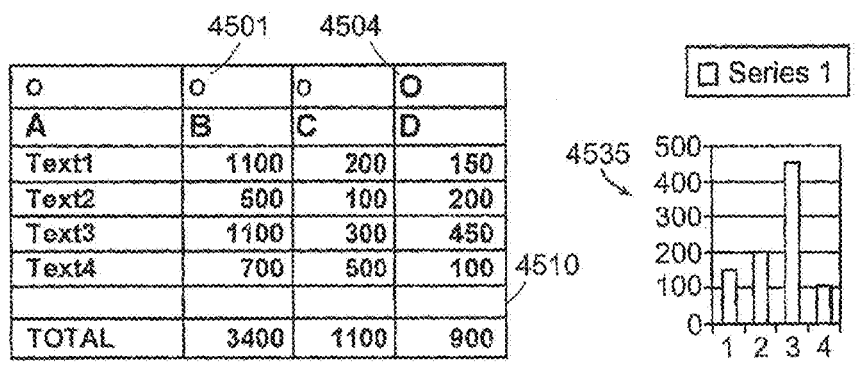

If charting/graphing is set, by the user or system, for multi-column operation with a separate chart/graph display for each column, then selecting charting/graphing control 4503 in column D in FIG. 45B, will result, as shown in FIG. 45D, in a table 4510, where both control 4502 and control 4504 are visually marked, and chart/graph 4535 is displayed along with chart/graph 4525. Further clicking on control 4502 in column B in FIG. 45D will deselect the chart/graph for that column, and will result, as shown in FIG. 45E, in a table 4510 where the visual marking is removed from control 4501, and only graph/chart 4535 is displayed.

Figure 45F:
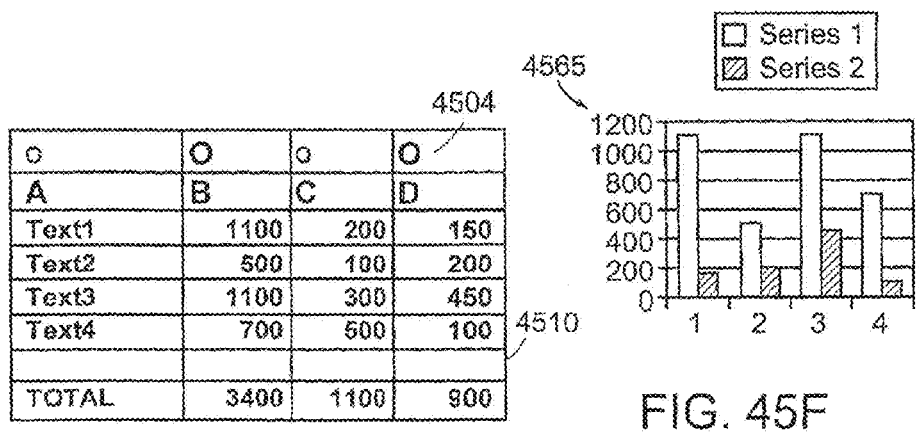
Figure 45G:
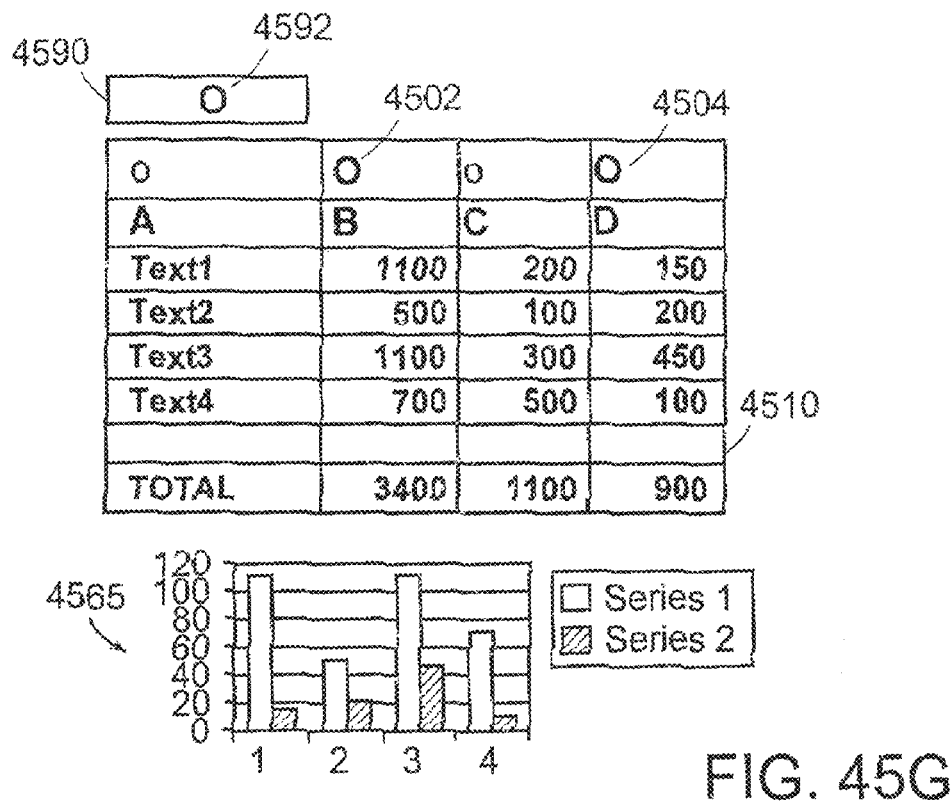
Figure 45H:
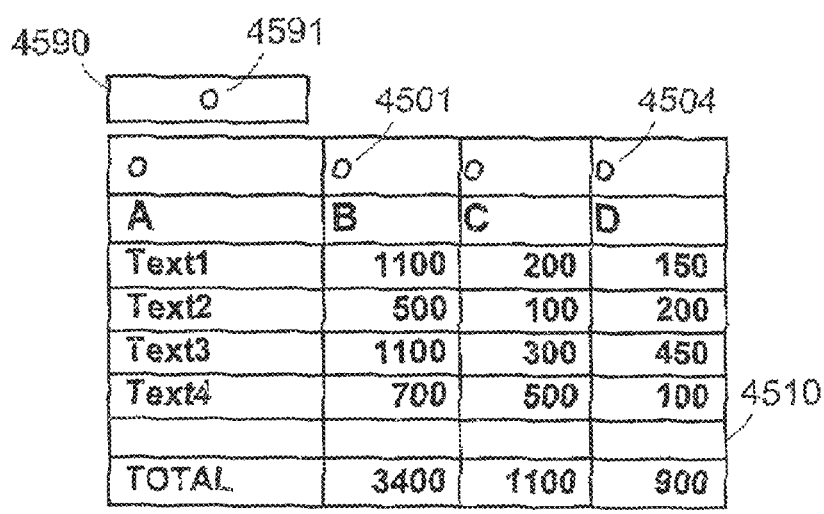

If charting/graphing is set for multi-column operation, where the data is combined in one chart/graph, then selecting charting/graphing control 4503 in column D in FIG. 45B, will result, as shown in FIG. 45F, in table 4510, where both chart/graph controls 4502 and 4504 are visually marked, and a combined chart/graph 4565 for displaying the data of both columns B and D.

Shown in FIG. 45G, are table 4510, the combined chart 4565 of columns B and D, visually marked chart/graph controls 4502 and 4504, a control panel 4590 for the table, and chart/graph "undo" column control 4592 for the table. Selecting control 4592 in FIG. 45G, results, as shown in FIG. 45H, in table 4510 without removing chart/graph 4565, and with the visual marking from controls 4591, 4501 and 4503 removed. If, control 4591 in FIG. 45H is selected, it will result in displaying the combined chart/graph for columns B and D (the "undoing" of the last operation) as shown in FIG. 45G. In the case where table data is continuously updated, (for example, using the adaptive pull mechanism in the case of an HTML based application) the associated charts/graphs are updated accordingly.

The appropriate graph/chart type can be automatically chosen based on the view, the column and the data, if the system is set up for automatic selection. For example, if the data is negative, a horizontal bar graph can be used, and if the view is an aggregated view, a pie chart can be displayed. Otherwise, the system will present the default or most recently used chart/graph type, and provide the capability to select from other chart types, as shown for example, in FIG. 19, chart 656.

The invention also provides a view column control follow-up feature, which allows for the relevant column control information and related presentation to propagate from one view to another view, such as, for example, propagating from aggregate view to detail view, or propagating among different views in the same view group.

The view column control follow-up can be provided for both multi-column and uni-column controls, as long as the data in the followed-up view can be presented in a non-conflicting manner. For example, a column sort lock and column charts that are presented in aggregated view can be automatically presented in a detail view. (For an aggregated view, which has presented chart/graphs, the drill down can be performed using a chart/graph or using folder-like control 4003A in aggregated rows in the table). As a result, the detailed view will be sorted in the same order as aggregated view, and charts presented in the aggregate view will be presented in detail view.

Similarly, all the described controls in the columns can be applied to the rows as well, in which case full symmetry is applied where rows will be substituted by columns, and vice versa. The table, if appropriate, will have a selection mechanism to decide if it is column controlled or alternatively row controlled.

A table, according to the invention, has the capability of dynamically adding columns from an available database of virtual columns or removing columns from the table. That capability, combined with dynamic aggregation by any column and filtering by any column combination (that is, by more than one column) provides a very flexible method for data searching and presentation.

A table's columns can thus be of two types: regular and virtual. Regular columns are ones that appear in the tables, either visible or not (hidden). The virtual columns are ones that can be added to the table, either as a regular column or a proxy column. A proxy column is a column to whose content, column manipulation can be applied, thereby potentially changing the displayed data in the table or in a view related to the table, but without displaying the actual data of the proxy column. A virtual column can be selected from the virtual database using a list, a browsing mechanism or another convenient method. The user can decide how to use the virtual column (either as real or proxy column).

A preferred embodiment, according to this aspect of the invention, for a proxy column features a column header for a regular column, which contains all the column controls. Furthermore, the selected column can be instantiated as a new column in the table. In addition, the list of columns can be provided dynamically, based on available database information and may be presented as a combination of column type, column semantics and user preferences. Further, if a column can be parameterized, appropriate parameter choices for instantiated column will be provided. Referring to FIG. 49, for example, if the column is P&L (profit and loss), choices of time horizon will be provided, such as daily, weekly, monthly, quarterly and yearly, as well as potentially an optional parameter, if it is realized or unrealized.

Figures 43A, 43B, 43C, 43D:
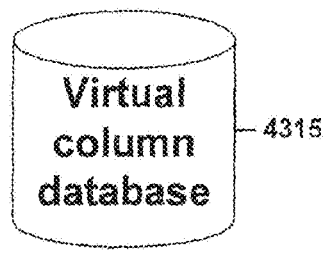
FIGS. 43A-I are diagrams showing a virtual column operations in a table.
Figure 43E:
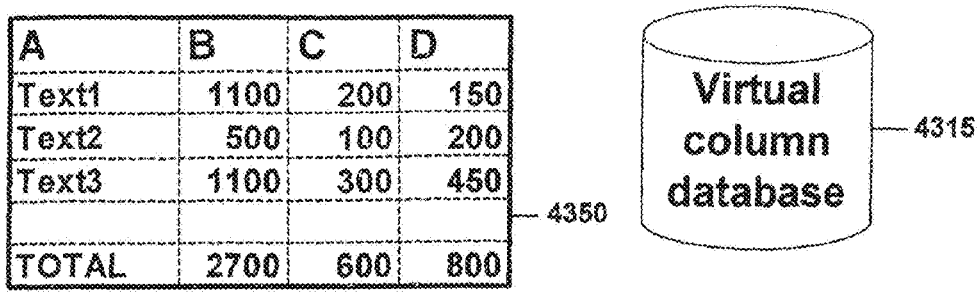

For example, a proxy column can be sorted upon, potentially changing the order of the table rows; or a proxy column can be charted without affecting the display of the table. As an example, in FIG. 43A, a table 4310 and a virtual column database 4315 are illustrated. Selecting a column M from the database 4315 and adding it to the table 4310 results in table 4320, as shown in FIG. 43B, with column M being added to the table as regular column.

Figure 43F:
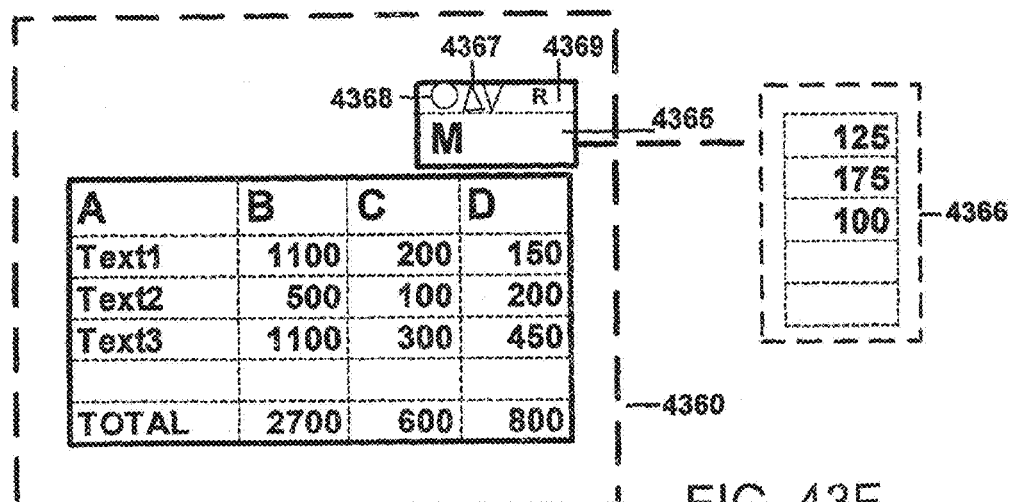
Figure 43G:
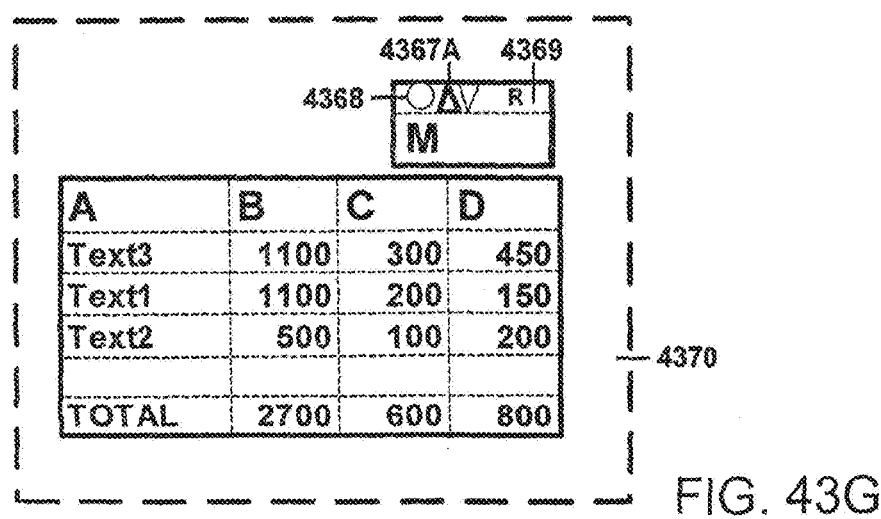

All displayed regular columns can become virtual. FIG. 43C illustrates a table 4330 with a 'V' control 4332 in the table headers, which were for example activated by using control actuation button 600. Activating the 'V' control in column C will remove this column from the table 4330, resulting in table 4340 as shown in FIG. 43D, although the column is still available for all purpose in the virtual column database 4315. The use of the virtual columns is illustrated in FIGS. 43E-I. The column M is added, as a result of user selection, as a proxy column to the table 4350 (FIG. 43E) from the virtual column database 4315. The resulting table 4360 is shown in FIG. 43F, where 4365 represents a proxy column M. (Note that the content of the proxy column is not displayed, whereas the content is displayed when the virtual column is selected as real column, and therefore added to a table, as in FIG. 43B.) Sorting table 4360 by ascending value content of column M (which has values of 125 for row 1, 175 for row 2, and 100 for row 3 as shown in column content 4366) by activating a sort ascending control 4367 in the proxy column header results in the table 4370 shown in FIG. 43G, where control 4367A is visually marked.

Figures 43H, 43I:
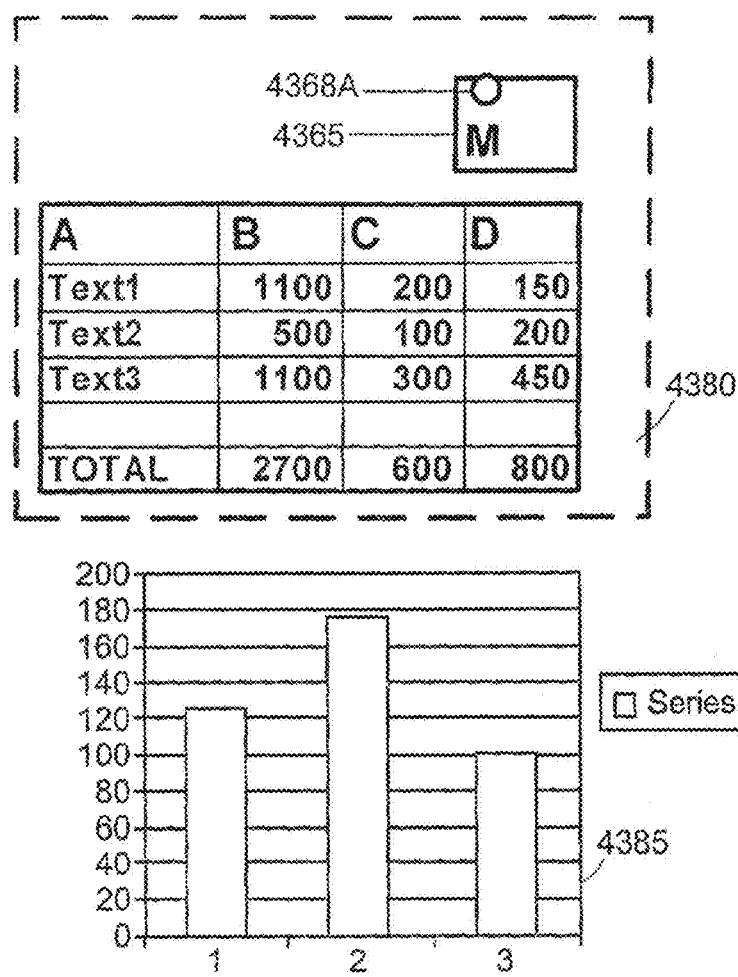

Activating a graph control 4368 in proxy column 4365 in a table 4360 results in table 4380, where control 4368A is visually marked and graph 4385 is shown in FIG. 43H. Activating an 'R' control 4369 in proxy column 4365 in table 4360 will make the column a regular column M in table 4390, as illustrated in FIG. 43I.

Override Feature (Cell Operation)

Figure 52:
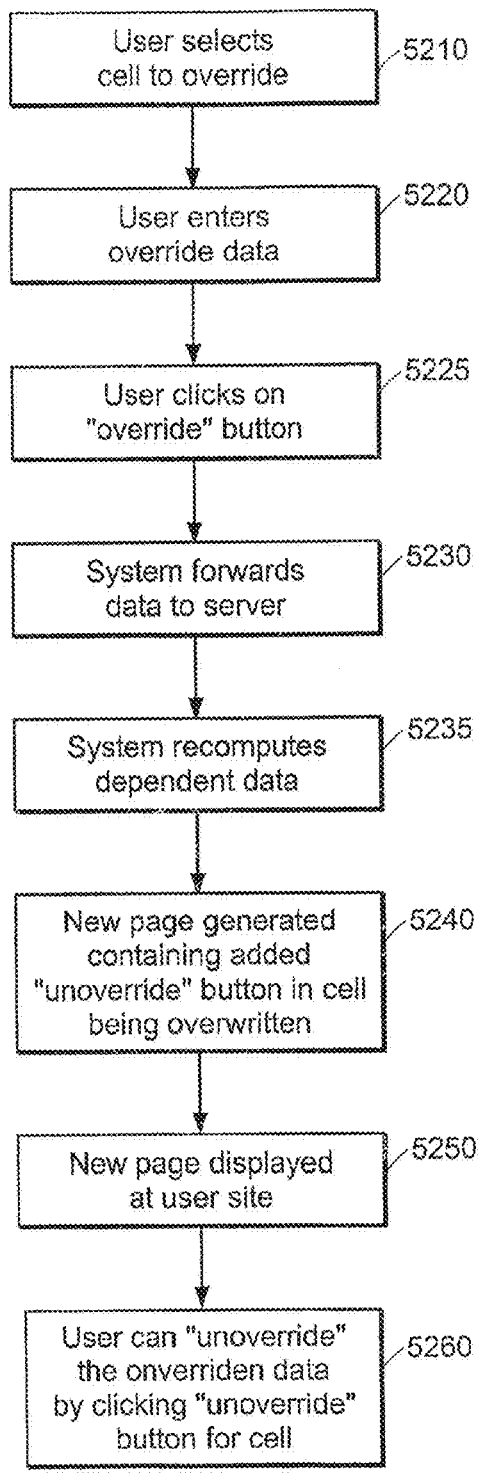
FIG. 52 is a flowchart of the override function.

Referring to FIG. 4, and the flow chart of FIG. 52, in another aspect of the invention, a display of a so-called "override" is presented in tabular form 74. In accordance with this aspect of the invention, the system, for example, but not necessarily, in real time, provides for overriding the data provided by the system with user-generated data. Accordingly, referring to FIG. 4, the tabular representation 74 includes a so-called "override" section illustratively shown as the last column under "local price." (Other columns could be identified as "overrideable" as well, provided, in accordance with the system, their data can be overwritten.) In this section, the user selects the cell(s) to override (step 5210) and can enter price data (step 5220), which is to override the actual price provided by the data in the system 18. In operation, the view may present, for a cell, a display of a text field 77a and an override button 76 (x). Upon "clicking" on the override button "x," (at step 5225) after entering the override data in the text field (here 25), the user's system will forward the override data through the network (step 5230), for example the web, to the system 18 where it will be used to recalculate all of the other dependent data in the system (step 5235) either locally or globally as determined by the user system. A new page display will then be generated (step 5240) containing an added unoverride button 77 in the cell being overridden, and provided to the user for display by the web server 40 (step 5250). (Each of the users that will have access to the effects of the overridden data, will see the changes according to system operation.) In this configuration, the user can thereafter "unoverride" the overridden data (step 5260) by clicking on the unoverride button 77 (which conditionally appears only in an overridden cell) and the system 18 will then reverse the overridden data with associated system provided data if such data exists, and will recalculate all of the data with such system provided data. The resulting revised display will then reflect the system provided value for any of the data, which has been "unoverrode." Further, it is important to recognize that the system provided data may be dynamically changing or at least updated from the time of the override.

Accordingly, the system thus provides an operational flexibility unavailable previously and enables the real-time data presentation to be overridden in any and all of the processed displays presented by the system, and then "unoverridden".

Row Operations

Figure 8:
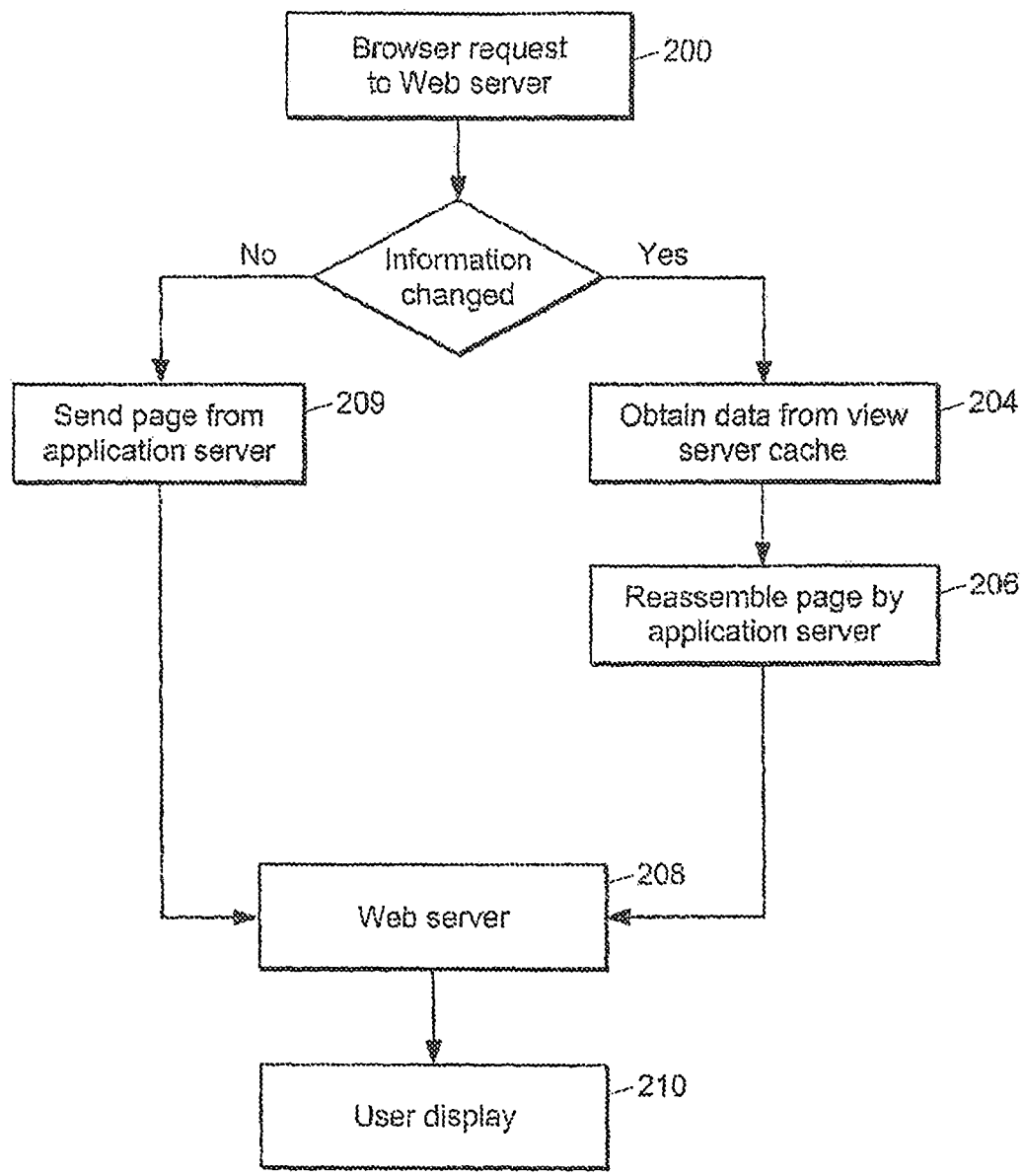
FIG. 8 is a more detailed flow chart description of system operation in accordance with the invention.
Figure 8A:
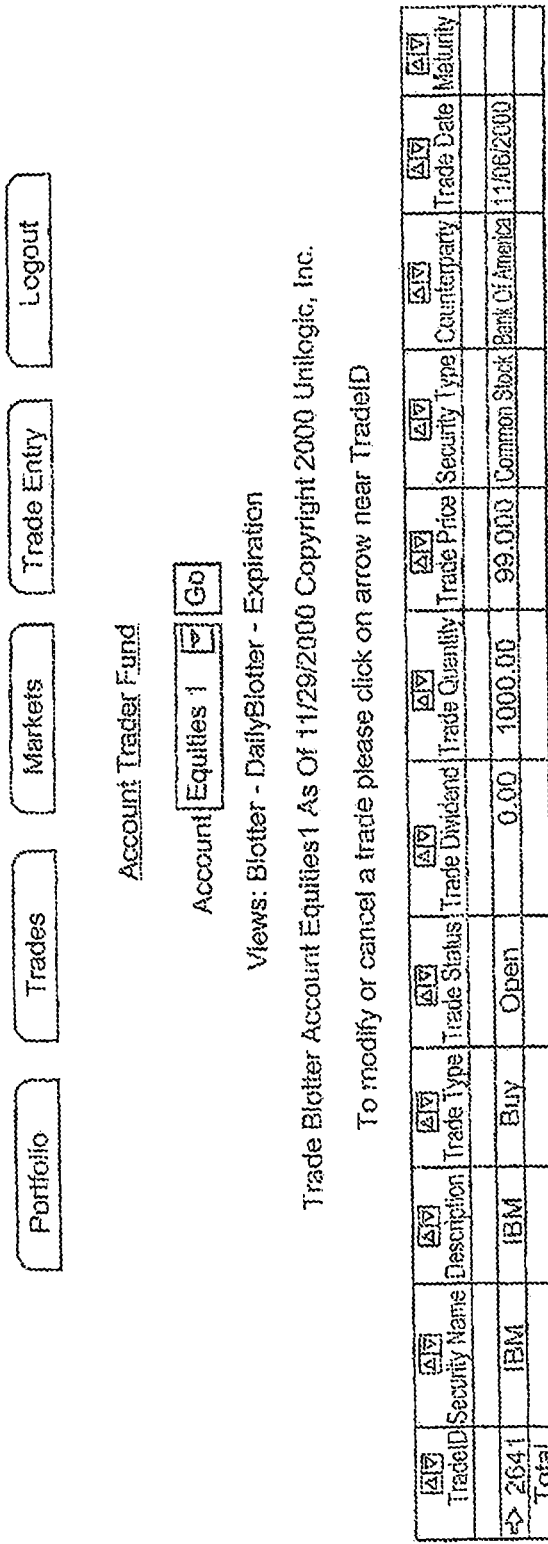
FIG. 8A is a third screen shot illustrating a tabular presentation of data in which a selected trade can be modified or cancelled.

While the description herein has concentrated upon column manipulations and activities, as noted above, the same tools and functions could be equally applied to rows of a table. Further, however, the user has a capability in accordance with the invention to select a row, for example, by selecting a symbol, and to indicate for the selected row various operations similar to, but different than, those described above. Referring now to FIG. 8A, in one aspect, a user can modify or edit some of the row information by displaying the original screen where the row is defined, and effecting the modification. For example, a trade can be modified by clicking on the "Modify trade" control button 800. This causes a new screen to open (FIG. 8B), and the user either modifies 802, or cancels the trade, 803, causing a new window to open. After the user confirms that the trade is to be modified by clicking on the "yes" button 900 (FIG. 9), the system displays, referring to FIG. 10, the detailed data for that selected trade entry. The user can modify this trade entry as desired, and when done, the modified trade will replace the original trade in the user display (FIG. 8A) as well as in the system 18 storage and memory.

Figure 11:
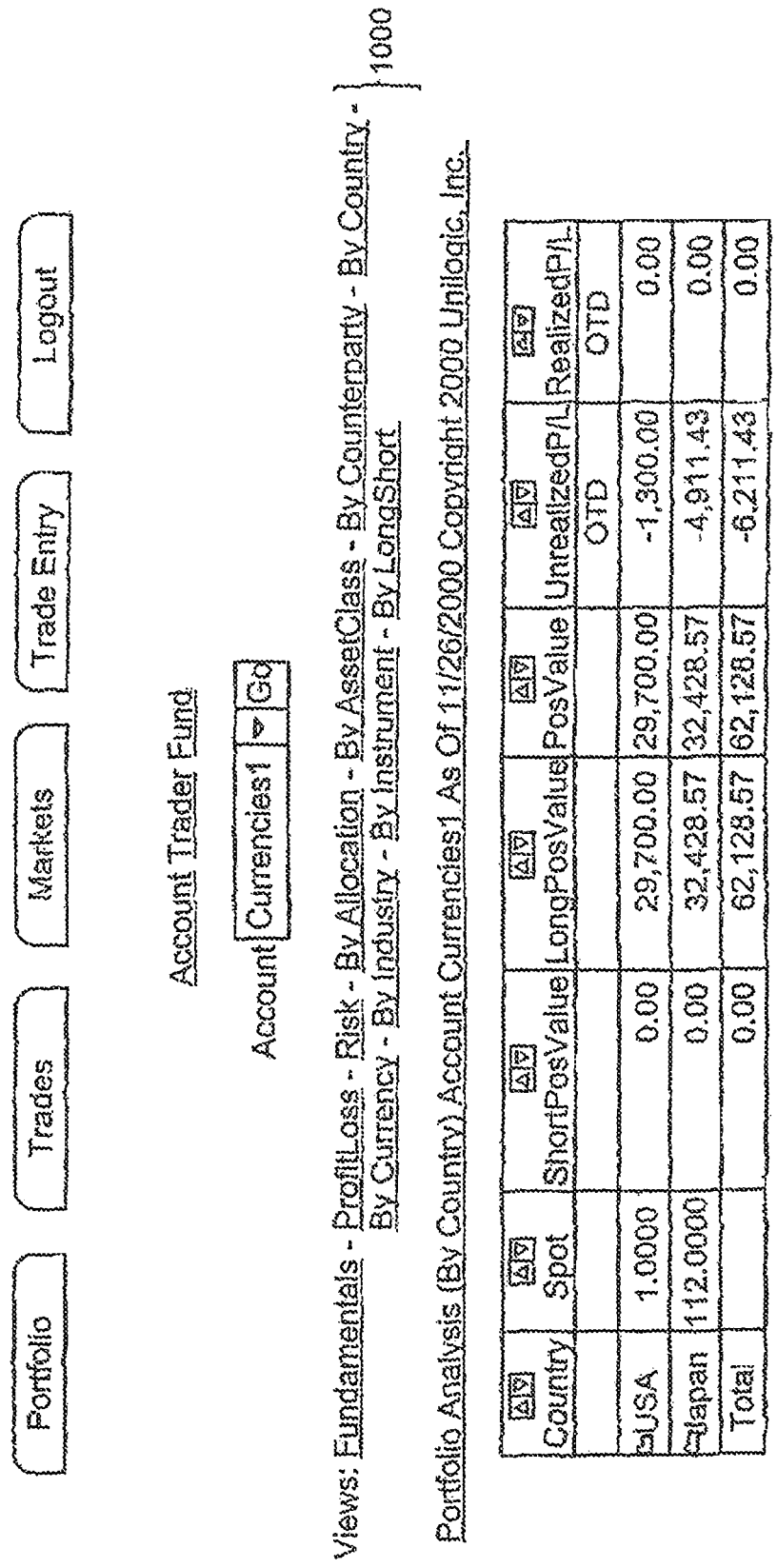
FIG. 11 is a screen shot illustrating a tabular presentation of data aggregated by country.

In another aspect of the invention, the user can require and display, for portfolio analysis, aggregated data (as described above) collected by any of a variety of characteristics, for example, by country as illustrated in FIG. 11. Alternative aggregated views can be provided to present the data, as noted in line 1000, by allocation, by asset class, by currency, by industry etc. These views, while accessed by the user, will be kept in the ViewServer cache 70 for display by the ApplicationServer 42 through the web server 40. When the aggregated symbol is clicked upon, a more detailed presentation, as shown in the display detail drill down table of FIG. 12, will be displayed.

Adaptive Pull

In accordance with another aspect of the invention, as noted above, the metadata is preferably provided with the retimed web page to automatically refresh the display at a periodic rate. When a refresh is requested by the browser, at 200, referring to FIG. 8, the ApplicationServer 42 inquires of the system, at 202, whether any of the data and/or presentation has changed, and if any has changed, that update data is available at 204 in ViewServer cache 70. Cache 70 is constantly being updated, asynchronously, as new data is acquired by the system, or as data is rearranged. The page is then reassembled and passed through the ApplicationServer at 206, to the web server at 208, and then to the user browser for eventual display at 210. This is a simple process for "HTML" pages.

If no change has been made in the data and/or presentation, then there is no need to provide a further update and the same page can be used at 209.

The system can automatically provide for a dynamically changing repetition rate for the refresh depending upon parameters set in accordance with the system operation. Thus, refresh can occur much more quickly when changes have been requested to be made to the display at the user system, but updates can be made much less frequently when, for example, further user requests have not taken place, for example, for ten minutes, or when the markets have closed. Other use parameters can also be provided to control the rate of refresh of the display, such as tabular display 72. For the financial markets, this can be depend upon the instruments being displayed, the time of day, the nature of the market, whether this is a new view or a new page (the system will automatically display a default view of the page when entered the first time), etc.

Alternative Data Sources

The ViewTOTAL data sources and processing servers are dependent on the task at hand and can vary. One useful embodiment is to load a table (or table like data) into ViewTOTAL from an external data source, for example, a spreadsheet, and allow it to be manipulated through controls provided in the interactive table described above. It can also share the resulting interaction with other users in the network. Another useful interaction is to load information into ViewServer from the web page by parsing it. The resulting information can be presented separately of the original page, or it may be displayed within a page which emulates the original page where a new table is substituted by the interactive table.

Figures 1, 48:
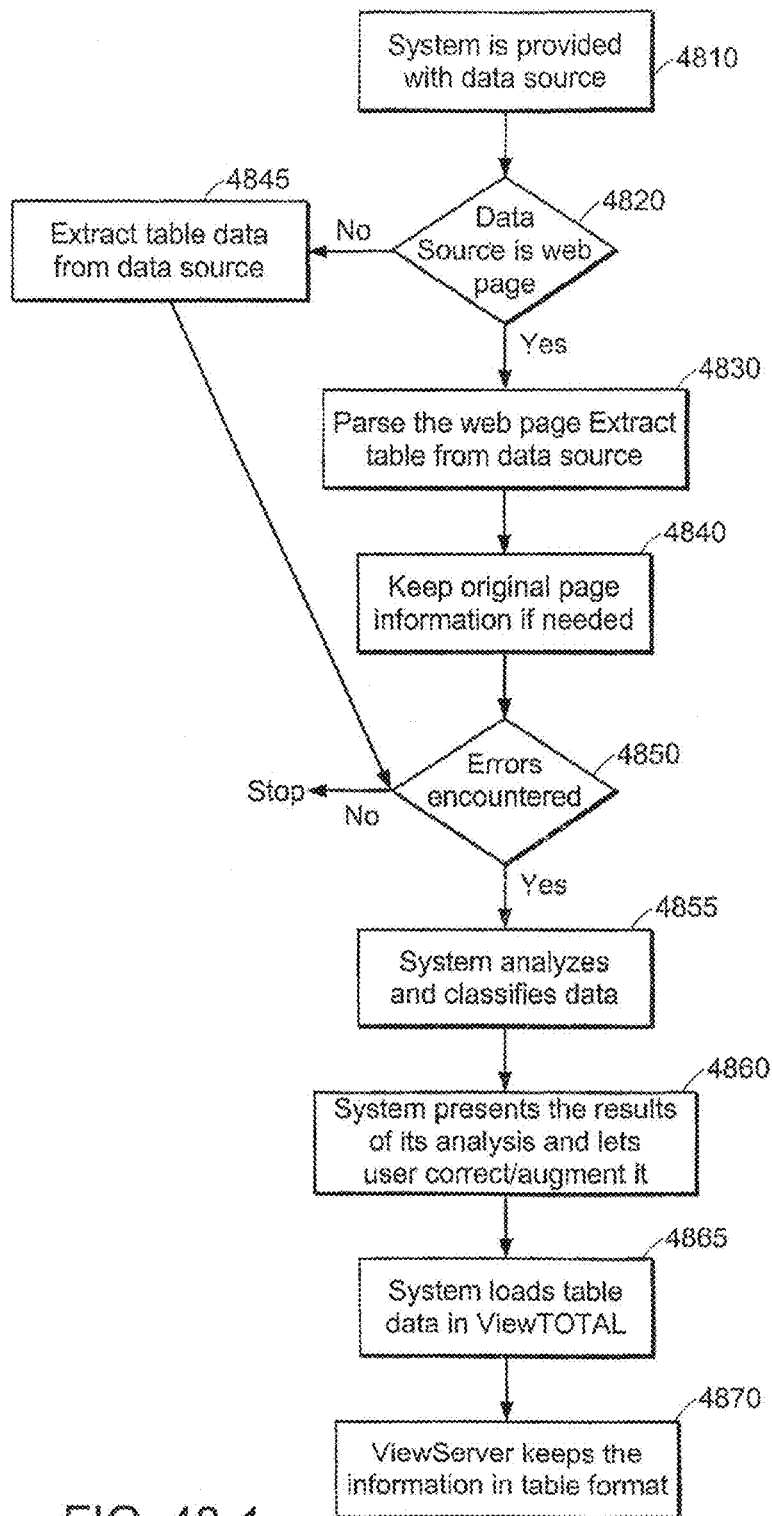
Figures 2, 48:
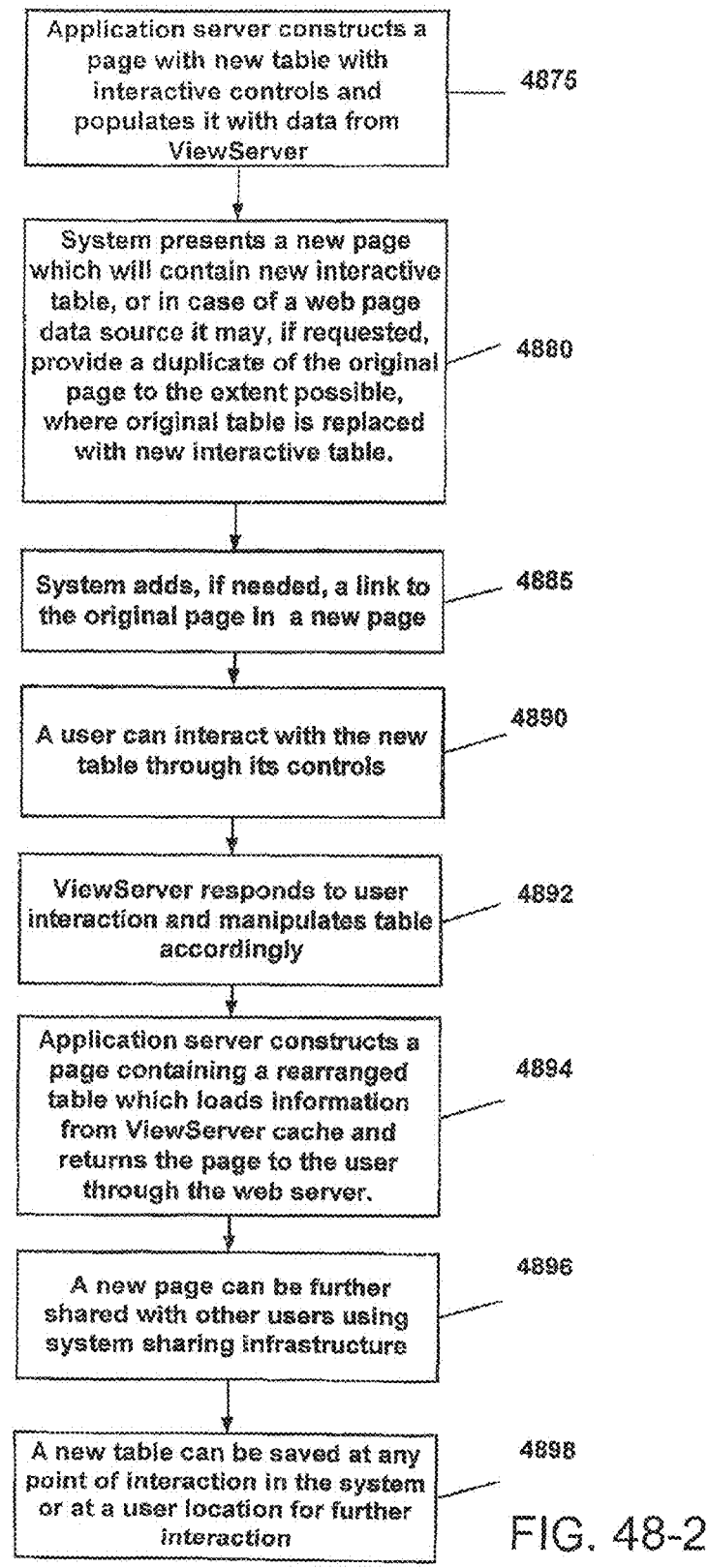

For example, the system can parse data from a data source (for example, a file, a database, a web page, etc.) and load it in ViewTOTAL for further interaction and sharing. Referring to FIG. 48, the system is provided, manually or automatically, with a data source (step 4810). If the data source is a web page address (URL), tested at 4820, the system parses the page and extracts table or table-like information from the page (step 4830). The system also maintains the original page information for further possible page duplication (step 4840). If the data source was not a web page address, the system extracts the data form the non web page data sources at 4845. If no errors occur, tested at 4850, the system attempts to analyze and classify the data at 4855. One example of the results of the system analysis is to identify a data column type.

The results of the analysis can them be presented to the user for correction or augmentation (step 4860). The system then loads the extracted table data information into the ViewTOTAL through the DataServer, populating other servers, for example ViewServer and the AnalyticalServer, caches. This is indicated at 4865. The ViewServer maintains the information in a table format (step 4870), and the ApplicationServer constructs a new page with a new table having interactive controls and populates the new table with the table data information from the ViewServer (step 4875). The system then presents the new page which will contain the new interactive table, where, in the case of a web page data source, it can, if requested, provide a duplicate of the original page to the extent possible, where the original table is replaced with the new interactive table (step 4880). In a particular aspect of the invention, the new page can contain a link to the original page (step 4885).

The user can then interact with the new table through its controls which communicate with the ViewServer (through the web server and Application Server as described above) (step 4890). The ViewServer responds to the user interaction as described hereinbefore and manipulates the table accordingly (step 4892). The ApplicationServer can construct the page containing a pre-arranged table which load information from the ViewServer cache and returns the page to the user through the web server (step 4894). The new page can be further shared among other users using the system sharing infrastructure as described in more detail elsewhere (step 4896). Finally, a new table cam be saved at any point of the interaction with the user in the system or at the user location for yet further interaction (step 4898).

Client-based Programs

In an alternate embodiment of the invention, client-based programs (such as Java applets, C# programs, or local programs) can be employed to download, through the web, the necessary information, preferably on a real-time basis, to update the user view. In this aspect of the invention, the client-based programs are created so that most of the program effort takes place at the servers of system 18 while a relatively "thin" program is downloaded to the user's browser, or deployed on the user's computing devices. The refresh of data at the user display takes place, incrementally and dynamically, preferably in real time. The client-based program reads the display configuration from the server and dynamically creates appropriate view groups. One program can flexibly present any view groups, and any views within a view group, as well as any columns in the case of a table based configuration. Preferably, the user display changes occur in a minimum number of elements such as, in the case of tables, symbols, fields and cells as opposed to full pages in the case of HTML. Symbols (and hence rows) and fields (and hence columns) can be dynamically added and deleted as well as cells being dynamically updated. The program can deal with visual representation and interaction without necessarily fully "understanding" the content meaning.

Thus, according to this aspect of the invention, it is only necessary to use the "thin" client-based program since in this embodiment much of the available information or data is handled at the server. This results in a real time dynamic update of the information on display at the user's site.

One Click Failover

Figure 5A:
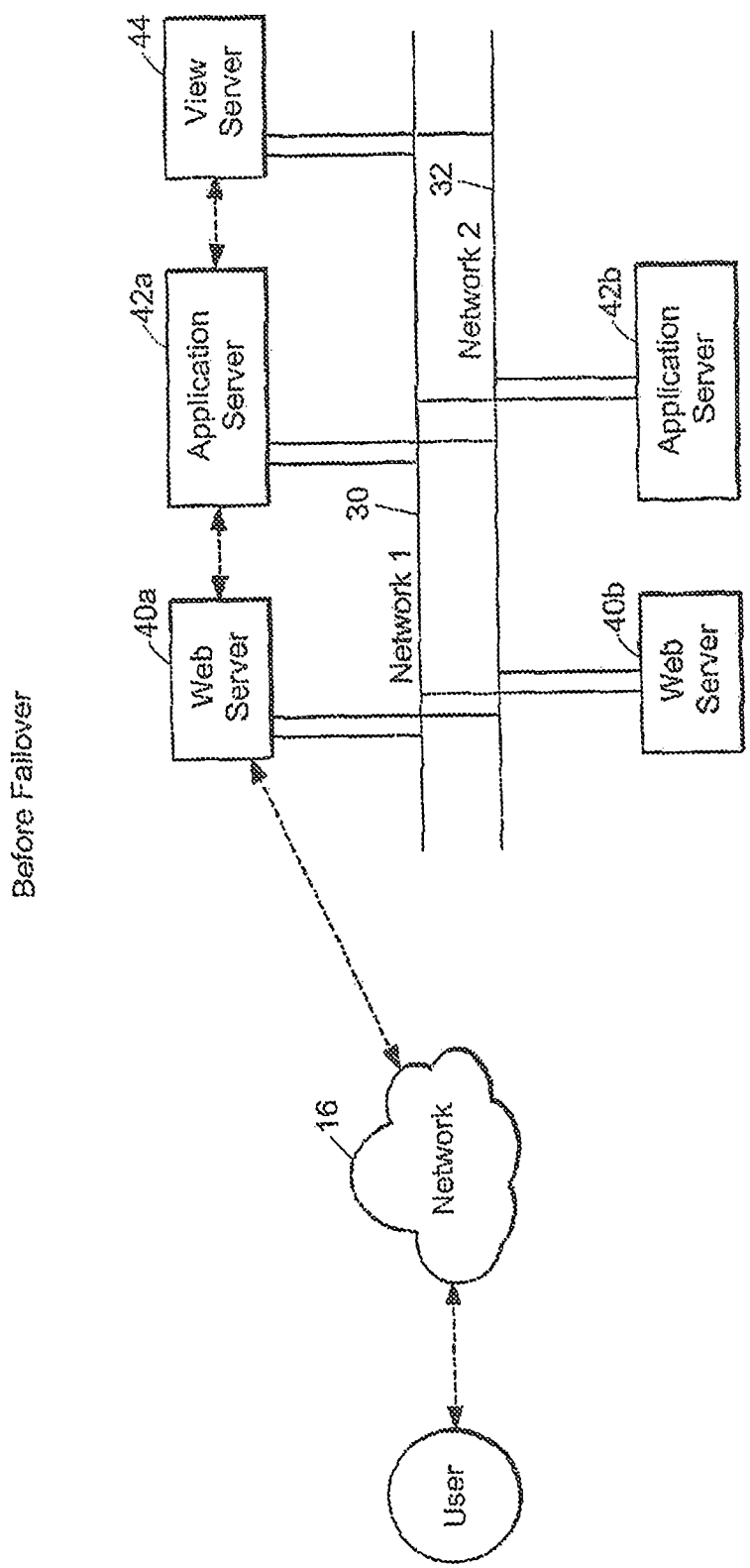
FIGS. 5A and 5B a yet further detailed diagram of the overall server architecture in accordance with the failover mode of the invention.
Figure 5B:
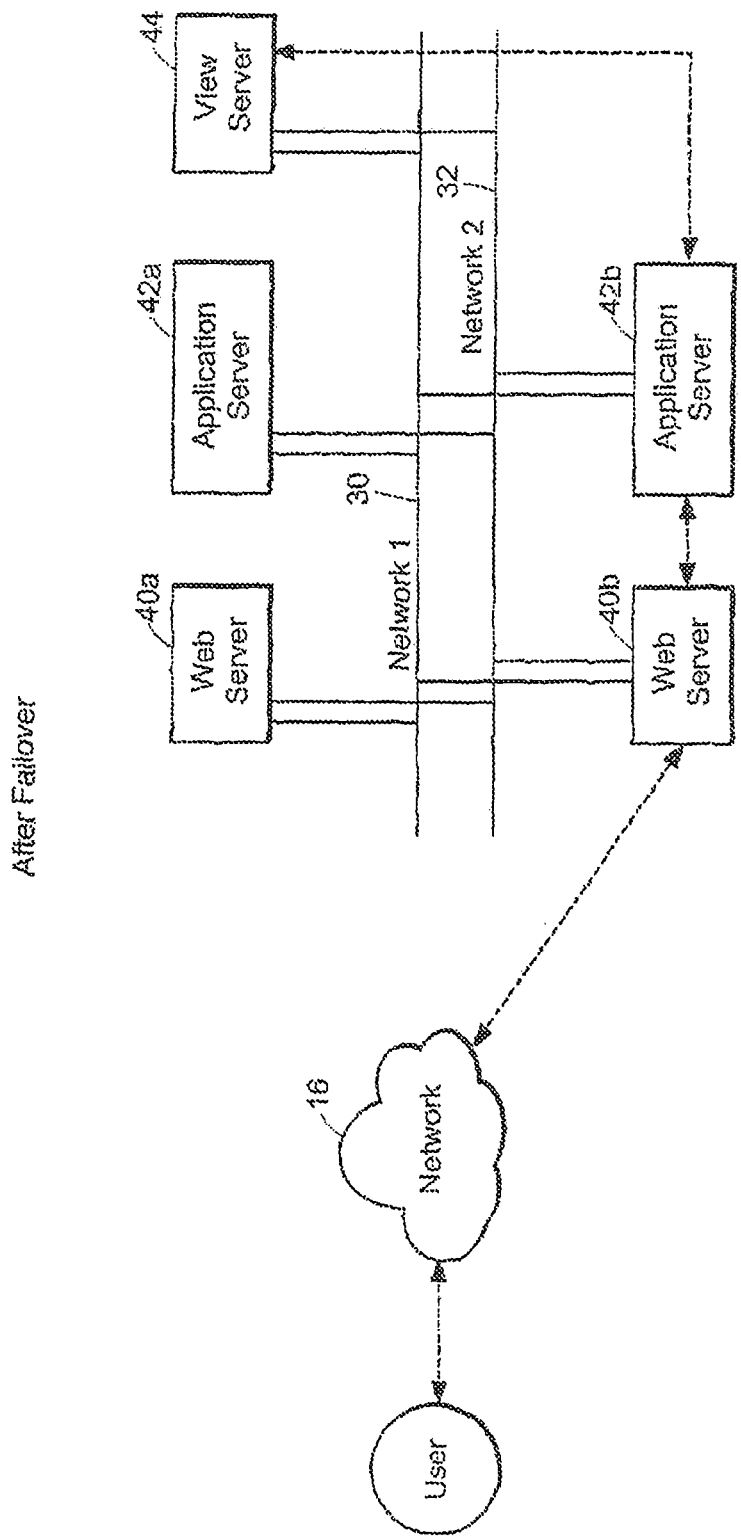

In yet another aspect of the invention, the display includes a "failover button", which can be used in those instances where, for some reason, the system 18 is unable (or is slow, for example) to provide the display updates. In this embodiment of the invention, referring to FIGS. 5A and 5B, clicking on the failover button enables the system to access an alternate web server 40*b* connected to communication private networks 30, 32 to access an alternate ApplicationServer 42*b*. The alternate ApplicationServer 42*b*, as illustrated in FIG. 5B, then accesses the original ViewServer for the user, which maintained the display view parameters previously used to create the display seen by the user, and delivers it to the user browser, for example, through a faster route. If the original ViewServer were also unavailable, an alternate server would pick up the views recently accessed by this user. The ApplicationServer is thus able to update the previous display view, which is cached at the ViewServer, and delivers it through the web server 40*b*, to the Internet and then to the user, thus enabling a reliable and redundant connection to the data even if, for example, the web server 40*a* and/or ApplicationServer 42*a*, originally being employed, were to fail or slow down. This operation is illustrated in FIG. 5A, the "before failover mode" configuration and FIG. 5B the "after failover mode" configuration. Importantly, it is the user who, in this embodiment, initiates the transfer upon recognizing the inability to obtain further updates or other views from the system 18 using the path originally assigned to it.

The link to the failover server will be generated by the current ApplicationServer with the name of the failover server, with an encrypted user identification (such as an access identifier or user name and password), timestamp (if the button is pressed after certain time period it will not be allowed to login for security reasons) as well as other parameters such as view name. The failover server will log in the user, connect to the ViewServer and display the specified view and as such it will provide "hot recovery." Thus, for example, before failover, a page can have associated with it "failover" buttons (and written in the pages) as follows:

| Button1 | Button2 | FailoverButton |
|---|---|---|
| [http://serverA ..] | [http://serverA ..] .. | [http://serverB ..] |

After failover, the displayed page can contain the alternate failover identifications:

| Button1 | Button2 | FailoverButton |
|---|---|---|
| [http://serverB ..] | [http://serverB ..] .. | [http://serverA ..] or |
| Button1 | Button2 | Fail overButton |
| [http://serverB ..] | [http://serverB ..] .. | [http://serverC ..] | if more than 2 web servers are available for further redundancy.

General Look and Feel

Figure 6:
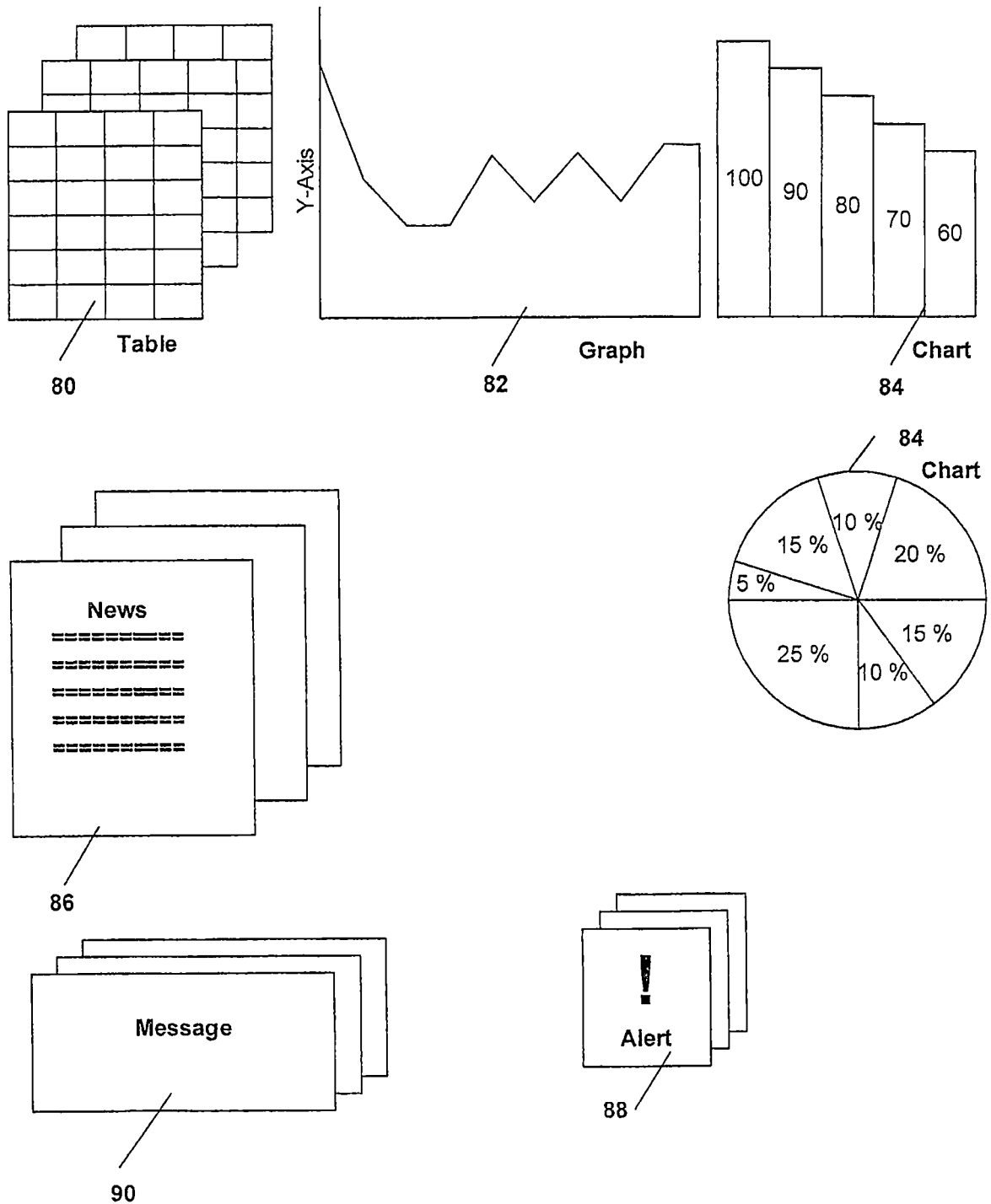
FIG. 6 is a representation illustrating user display options.

Referring to FIG. 6, at the user/browser site, many different type displays can and are provided by the system 18. As noted above, in connection with FIGS. 3 and 4, various tables 80 can be provided to illustrate the data being requested. But in addition, graphs 82, charts 84, news text 86 and various Alert information, either in the form tables, texts, graphs, charts, or other indicia, can be provided and displayed to the user. In particular, when using, for example, the tables provided in FIG. 3, color can be indicative of changes in value from a previous update, or from an update within the previous, for example, ten minutes. Thus, red can, for example, be used to indicate values in any cell that have decreased in value while green might be used to represent values that have increased in value. This easy visual indication of changes in various portions of the table provide the user with an immediate advantageous secondary source of visual indication to enable quick understanding and mental analysis of the display being presented. This is particularly useful where the display is both involved and complex.

Referring to FIG. 6, each of the graphs, charts, and other presentations, etc. have a defined configuration. In accordance with a preferred embodiment of the invention, each user has his own preferred configuration for the graphs, tables, etc. The server maintains the configuration information for the user and provides to the user the information as the user has previously designated. In addition, as illustrated in, for example, FIG. 3, many of the application presentations have a structure in which they provide a View Group 800 such as the group's portfolio, trades, markets, trade entry, and log out (FIG. 3), and within the View Groups, views which include the interactive views 60.

The ViewServer will keep configuration data on a per user basis, identifying what View Groups 800 and Views 60 the user sees, as well as parameters for Tables (for example, which column to show and in what order) and Charts (for example, a default chart type). By clicking on User View Group, the application shows a list of Views for this group. By Clicking on the View, the application shows the presented data on one or more tables or charts or on a combination of them. Note also that certain views, like tables and charts, typically display dynamically changing information.

Referring to FIGS. 20A-D each page will have different display areas such as Display Browse Controls (View Group controls, View controls, View Slice controls), TableView, ChartView, AlertView, NewsView, MessageView etc. Each of those and other display areas can be hidden or revealed by display area control actuation buttons, such as buttons 1800, 1801, 1802. Selecting such a control button on the visible area will make this area disappear. Selecting it again will make this area reappear. Selecting button 1800 in FIG. 20A will cause the page view to change and look like FIG. 20B. Selecting button 1802 in FIG. 20B will cause the page view to change and look like FIG. 20C Selecting button 1802 in FIG. 20C will cause page view to change and look like FIG. 20D (the same view as FIG. 20B).

As noted above, to display data updates on the user screen, the ViewServer will refresh the page using the "refresh" meta tag embedded in the page HTML. The direction of the data change in the data preferably is provided by a color change, for example green to indicate an increase in value and red to indicate the decrease in value.

The user will have an interface to create new views from virtual columns. In addition the user can specify, other attributes such as filters, aggregations, e.t.c. At any point of time the view can be reconfigured, named and saved with its attributes. Also, the user will have an interface to create a ViewGroup and add/remove views, name and save View-Groups, as well as create application displays by choosing ViewGroups. As such, the user has a full interactive capability to create his own configurable applications, which can be reconfigured further later.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Additions, subtractions, and modifications of the disclosed preferred embodiments of the invention will be apparent to those of skill in this field and are within the scope of the following claims.

What is claimed is:

1. A system, comprising one or more server computers configured to execute instructions that cause the system to perform a method comprising steps of:
   maintaining particular content in both:
      a persistent storage, and
      a particular memory cache that resides on a particular server computer of the one or more server computers;
   maintaining given content in both:
      the persistent storage, and
      a given memory cache that resides on a given server computer of the one or more server computers;
   receiving, over a network from a first application that is associated with a first user, data that indicates a particular expression of interest in being notified about updates to the particular content;
   receiving a particular update to the particular content, wherein the particular update includes first information;
   adding the first information to the particular memory cache and the persistent storage;
   based, at least in part, on the particular expression of interest, transmitting over the network particular information to the first application to cause display of the particular information in a first application display of the first application, wherein the particular information includes a particular link;
   receiving, over the network from the first application, data that indicates a given expression of interest in being notified about updates to the given content;
   receiving a given update to the given content, wherein the given update includes second information;
   adding the second information to the given memory cache and the persistent storage;
   while the second information is concurrently maintained in the persistent storage and in the given memory cache, retrieving at least a portion of the second information from the given memory cache without accessing the persistent storage and based, at least in part, on the given expression of interest, transmitting over the network given information to the first application to cause display of the given information in the first application display, wherein the given information includes the at least a portion of the second information;
   wherein the given information is concurrently displayed with the particular information in the first application display; and in response to receiving, over the network from the first application, an indication caused by activation of the particular link performing steps of:
    while the first information is concurrently maintained in the persistent storage and in the particular memory cache, retrieving at least a portion of the first information from the particular memory cache without accessing the persistent storage; and
    transmitting over the network the at least a portion of the first information to the first application to cause display of the at least a portion of the first information in the first application.

2. The system of claim 1 wherein the step of adding the first information to the particular memory cache is performed in response to receiving the particular update.

3. The system of claim 1 wherein maintaining the particular content in the persistent storage comprising maintaining the particular content in a database on the persistent storage.

4. The system of claim 1 wherein the first information includes a first text.

5. The system of claim 1 wherein the first information includes a first image.

6. The system of claim 5 wherein the first image includes a chart or graph.

7. The system of claim 1 wherein the particular link enables the first application to update the particular content.

8. The system of claim 1 wherein the first application is associated with the first user at least in that information that uniquely identifies the first user is used to login to the first application.

9. The system of claim 1 wherein:
the particular content includes a table view that contains numeric information;
the particular update causes recalculation of the numeric information; and
the particular link provides access to the table view.

10. The system of claim 1 wherein:
the particular content comprises a particular view that includes a plurality of fields;
the particular update is associated with one or more changes to data of at least one field from the plurality of fields;
the particular information comprises a description of the one or more changes; and
the particular link provides access to the particular view.

11. The system of claim 1 wherein:
the given content comprises a given view that includes a plurality of fields;
the given update is associated with one or more changes to data of at least one field from the plurality of fields; and
the second information comprises the one or more changes to the data.

12. A method comprising: performing, by one or more server computers:
receiving, over a network from a first application that is associated with a first user, data that indicates a particular expression of interest in being notified about updates to particular content;
receiving, over the network from the first application, data that indicates a given expression of interest in being notified about updates to given content;
receiving a particular update to the particular content, wherein the particular update includes first information;
storing the first information in a persistent storage;
storing the first information in a memory cache;
receiving a given update to the given content, wherein the given update includes second information;
while the first information is concurrently maintained in the persistent storage and in the memory cache, performing the steps of:
    storing the second information in the persistent storage; and
    updating the memory cache with the second information to store the second information in the memory cache;
without accessing the persistent storage, transmitting, at least a portion of the first information and at least a portion of the second information from the memory cache to a first process;
assembling and formatting for display, by the first process, content of a first application view, to include content of a particular view and content of a given view, wherein the content of the particular view includes the at least a portion of the first information and the content of the given view includes the at least a portion of the second information;
transmitting, from the first process to a second process, the content of the first application view;
transmitting, from the second process, over the network, the content of the first application view to the first application to enable display of the first application view in a first application display of the first application, wherein the first application view concurrently includes the particular view and the given view;
wherein the at least a portion of the first information is transmitted to the first application based, at least in part, on the particular expression of interest; and
wherein the at least a portion of the second information is transmitted to the first application based, at least in part, on the given expression of interest.

13. The method of claim 12 wherein the first information includes a text.

14. The method of claim 12 wherein the first information includes news information received over the network from a data source that is remote relative to the one or more server computers.

15. A system, comprising the one or more server computers configured to execute instructions that cause the system to perform the method recited in claim 12.

16. A non-transitory computer readable storage medium storing one or more programs configured to be executed by the one or more server computers, the one or more programs comprising instructions to perform the method recited in claim 12.

17. A method comprising:
performing, by one or more server computers:
maintaining particular content that is accessible over a network;
maintaining given content that is accessible over the network;
receiving, over the network from a first application that is associated with a first user, data that indicates a particular expression of interest in being notified about updates to the particular content;
receiving a particular update to the particular content, wherein the particular update includes first information;
storing the first information in a persistent storage;
storing the first information in a first memory cache;
based, at least in part, on the particular expression of interest, transmitting over the network particular information to the first application to cause display of the particular information in a first application display of the first application, wherein the particular information includes a particular link;

receiving, over the network from the first application, data that indicates a given expression of interest in being notified about updates to the given content;

receiving a given update to the given content, wherein the given update includes second information;

based, at least in part, on the given expression of interest, transmitting over the network given information to the first application to cause display of the given information in the first application display, wherein the given information includes at least a portion of the second information;

wherein the given information is concurrently displayed with the particular information in the first application display; and in response to receiving, over the network from the first application, an indication caused by activation of the particular link performing steps of:

while the first information is concurrently maintained in the persistent storage and in the first memory cache, retrieving at least a portion of the first information from the first memory cache without accessing the persistent storage; and transmitting over the network the at least a portion of the first information to the first application to cause display of the at least a portion of the first information in the first application.

18. The method of claim 17 further comprising:
storing the second information in the persistent storage;
storing the second information in a second memory cache; and
while the second information is concurrently maintained in the persistent storage and in the second memory cache, prior to the step of transmitting over the network the given information to the first application, retrieving the at least a portion of the second information from the second memory cache without accessing the persistent storage.

19. The method of claim 17 wherein:
the particular content includes a table view that contains numeric information;
the particular update causes recalculation of the numeric information; and
the particular link provides access to the table view.

20. A system, comprising the one or more server computers configured to execute instructions that cause the system to perform the method recited in claim 17.

21. A non-transitory computer readable storage medium storing one or more programs configured to be executed by the one or more server computers, the one or more programs comprising instructions to perform the method recited in claim 17.

22. The method of claim 17 wherein:
the particular content comprises a particular view that includes a plurality of fields;
the particular update is associated with one or more changes to data of at least one field from the plurality of fields;
the particular information comprises a description of the particular update; and
the particular link provides access to the particular view.

23. The method of claim 22 wherein maintaining the particular content in the persistent storage comprising maintaining the particular content in a database on the persistent storage; and
the method further comprising:
maintaining the plurality of fields in a data record in the database; and
storing the particular update in the database.

24. A method comprising:
performing, by one or more server computers:
maintaining particular content in both:
a persistent storage, and
a particular memory cache that resides on a particular server computer of the one or more server computers;
maintaining given content in both:
the persistent storage, and
a given memory cache that resides on a given server computer of the one or more server computers;
receiving, over a network from a first application that is associated with a first user, data that indicates a particular expression of interest in being notified about updates to the particular content;
receiving a particular update to the particular content, wherein the particular update includes first information;
adding the first information to the particular memory cache and the persistent storage;
based, at least in part, on the particular expression of interest, transmitting over the network particular information to the first application to cause display of the particular information in a first application display of the first application, wherein the particular information includes a particular link;
receiving, over the network from the first application, data that indicates a given expression of interest in being notified about updates to the given content;
receiving a given update to the given content, wherein the given update includes second information;
adding the second information to the given memory cache and the persistent storage;
while the second information is concurrently maintained in the persistent storage and in the given memory cache, retrieving at least a portion of the second information from the given memory cache without accessing the persistent storage and based, at least in part, on the given expression of interest, transmitting over the network given information to the first application to cause display of the given information in the first application display, wherein the given information includes the at least a portion of the second information;
wherein the given information is concurrently displayed with the particular information in the first application display; and
in response to receiving, over the network from the first application, an indication caused by activation of the particular link performing steps of:
while the first information is concurrently maintained in the persistent storage and in the particular memory cache, retrieving at least a portion of the first information from the particular memory cache without accessing the persistent storage; and
transmitting over the network the at least a portion of the first information to the first application to cause display of the at least a portion of the first information in the first application.

25. A non-transitory computer readable storage medium storing one or more programs configured to be executed by one or more server computers, the one or more programs comprising instructions to perform a method comprising:
   maintaining particular content in both:
      a persistent storage, and
      a particular memory cache that resides on a particular server computer of the one or more server computers;
   maintaining given content in both:
      the persistent storage, and
      a given memory cache that resides on a given server computer of the one or more server computers;
   receiving, over a network from a first application that is associated with a first user, data that indicates a particular expression of interest in being notified about updates to the particular content;
   receiving a particular update to the particular content, wherein the particular update includes first information;
   adding the first information to the particular memory cache and the persistent storage;
   based, at least in part, on the particular expression of interest, transmitting over the network particular information to the first application to cause display of the particular information in a first application display of the first application, wherein the particular information includes a particular link;
   receiving, over the network from the first application, data that indicates a given expression of interest in being notified about updates to the given content;
   receiving a given update to the given content, wherein the given update includes second information;
   adding the second information to the given memory cache and the persistent storage;
   while the second information is concurrently maintained in the persistent storage and in the given memory cache, retrieving at least a portion of the second information from the given memory cache without accessing the persistent storage and based, at least in part, on the given expression of interest, transmitting over the network given information to the first application to cause display of the given information in the first application display, wherein the given information includes the at least a portion of the second information;
   wherein the given information is concurrently displayed with the particular information in the first application display; and
   in response to receiving, over the network from the first application, an indication caused by activation of the particular link performing steps of:
      while the first information is concurrently maintained in the persistent storage and in the particular memory cache, retrieving at least a portion of the first information from the particular memory cache without accessing the persistent storage; and
      transmitting over the network the at least a portion of the first information to the first application to cause display of the at least a portion of the first information in the first application.

* * * * *